United States Patent
Al Ghazo et al.

(10) Patent No.: US 12,309,188 B1
(45) Date of Patent: May 20, 2025

(54) CYBERSECURITY ALGORITHMS AND TOOLS FOR SUPERVISORY CONTROL AND DATA ACQUISITION AND INDUSTRIAL CONTROL SYSTEMS

(71) Applicant: Iowa State University Research Foundation, Inc., Ames, IA (US)

(72) Inventors: Alaa Al Ghazo, Port Jefferson, NY (US); Ratnesh Kumar, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 840 days.

(21) Appl. No.: 17/301,606

(22) Filed: Apr. 8, 2021

Related U.S. Application Data

(60) Provisional application No. 63/007,173, filed on Apr. 8, 2020.

(51) Int. Cl.
*H04L 9/40* (2022.01)
*G06N 7/01* (2023.01)
(Continued)

(52) U.S. Cl.
CPC ........... *H04L 63/1433* (2013.01); *G06N 7/01* (2023.01); *H04L 41/14* (2013.01);
(Continued)

(58) Field of Classification Search
CPC ............. H04L 63/1433; H04L 63/1425; H04L 63/1441; H04L 41/14; H04L 69/22; G06N 7/01
See application file for complete search history.

(56) References Cited

U.S. PATENT DOCUMENTS 6,654,802 B1    11/2003   Oliva et al.
2017/0286690 A1*  10/2017  Chari ................ G06F 21/577
(Continued)

OTHER PUBLICATIONS

A. T. Al Ghazo and R. Kumar, "ICS/SCADA Device Recognition: A Hybrid Communication-Patterns and Passive-Fingerprinting Approach," 2019 IFIP/IEEE Symposium on Integrated Network and Service Management (IM), Arlington, VA, USA, Publication date of Apr. 1, 2019, pp. 19-24. (Year: 2019).*

(Continued)

*Primary Examiner* — Joseph P Hirl
*Assistant Examiner* — Thomas A Gyorfi
(74) *Attorney, Agent, or Firm* — McKee, Voorhees & Sease, PLC

(57) ABSTRACT

A hybrid approach involving the mix of communication patterns and passive fingerprinting is used to identify unknown device types, manufacturers, and models of devices of digital control systems. ANDVI implementation maps the identified devices to their known vulnerabilities. According to one example, to identify how interdependence among existing atomic vulnerabilities may be exploited by an adversary to stitch together an attack that can compromise the system, model-checking based A2G2V is employed. According to another example, an A2G2V algorithm uses existing model-checking tools, an architecture description tool, and code to generate an attack-graph that enumerates the set of all possible sequences in which atomic-level vulnerabilities can be exploited to compromise system security. In yet another example, identification of label-cuts within an attack-graph automatically identifies a set of critical-attacks that, when blocked, renders the system secure. A linear complexity approximation utilizing SCCs helps identify the minimum label-cut representing a critical-attacks set.

20 Claims, 18 Drawing Sheets

(51) Int. Cl.
    *H04L 41/14* (2022.01)
    *H04L 69/22* (2022.01)
(52) U.S. Cl.
    CPC ...... *H04L 63/1425* (2013.01); *H04L 63/1441* (2013.01); *H04L 69/22* (2013.01)

(56) References Cited

U.S. PATENT DOCUMENTS

2018/0048550 A1  2/2018  Beyah et al.
2020/0099704 A1* 3/2020  Lee .................... H04L 63/1416

OTHER PUBLICATIONS

Barrère, Martín, et al. "Identifying security-critical cyber-physical components in industrial control systems." arXiv preprint arXiv: 1905.04796 (16 pages). (Year: 2019).*
Cover sheet for Al Ghazo reference (2 pages) (Year: 2019).*
Martin Barrere et al. "Assessing Cyber-Physical Security in Industrial Control Systems" 6th International Symposium for ICS & SCADA Cyber Security Research 2019 (ICS-CSR), Sep. 10-12, 2019 (pp. 49-58) (Year: 2019).*
Aleroud et al., "Queryable Semantics to Detect Cyber-Attacks: A Flow-Based Detection Approach," IEEE Trans. Syst., Man, Cybern., Syst., vol. 48, No. 2, pp. 207-223, 2018.
Alhomidi et al., "Finding the Minimum Cut Set in Attack Graphs Using Genetic Algorithms," 2013 International Conference on Computer Applications Technology (ICCAT), IEEE, pp. 1-6, 2013.
Ammann et al., "A host-based approach to network attack chaining analysis," Computer Security Applications Conference, 21st Annual, pp. 1-10, 2005.
Ammann et al., "Scalable, Graph-Based Network Vulnerability Analysis," Proceedings of the 9th ACM Conference on Computer and Communications Security, ACM, pp. 217-224, 2002.
Baiardi et al., "Hierarchical, Model-Based Risk Management of Critical Infrastructures," Reliability Engineering & System Safety, vol. 94, No. 9, pp. 1403-1415, 2009.
Bangemann et al., "State of the Art in Industrial Automation," Industrial Cloud-Based Cyber-Physical Systems, Springer, 27 pages, 2014.
Bodenheim et al., "Evaluation of the Ability of the Shodan Search Engine to Identify Internet-Facing Industrial Control Devices," International Journal of Critical Infrastructure Protection, vol. 7, No. 2, pp. 114-123, 2014.
Cardenas et al., "Challenges for Securing Cyber Physical Systems," Workshop on future directions in cyber-physical systems security, pp. 1-4, 2009.
Caselli et al., "On the Feasibility of Device Fingerprinting in Industrial Control Systems," International Workshop on Critical Information Infrastructures Security, Springer, 12 pages, 2013.
Chai et al., "Social Network Analysis of the Vulnerabilities of Interdependent Critical Infrastructures," International journal of critical infrastructures, vol. 4, No. 3, pp. 256-273, 2008.
Chittester et al., "Risks of Terrorism to Information Technology and to Critical Interdependent Infrastructures," J Homel Secur Emerg Manag, vol. 1, No. 4, Article 402, pp. 1-22, 2004.
Cho et al., "Cyberphysical Security and Dependability Analysis of Digital Control Systems in Nuclear Power Plants," IEEE Transactions on Systems, Man, and Cybernetics: Systems, vol. 46, No. 3, pp. 356-369, 2016.
CVE, "Siemens Common Vulnerabilities," https://cve.mitre.org/cgi-bin/cvekey. cgi?keyword=siemens, accessed: May 25, 2018, pp. 1-27, 2018.
Dutta, et al., "Labeled Cuts in Graphs," Theoretical Computer Science, vol. 648, pp. 34-39, 2016.
Francois et al., "PTF: Passive Temporal Fingerprinting," in 12th IFIP/IEEE International Symposium on Integrated Network Management (IM 2011) and Workshops, IEEE, pp. 289-296, 2011.

Gacek et al., "The JKind Model Checker," http://loonwerks.com/tools/jkind.html, accessed: Jan. 11, 2018, pp. 1-7, 2016.
Gadyatskaya, "How to Generate Security Cameras: Towards Defence Generation for Socio-Technical Systems," International Workshop on Graphical Models for Security, Springer, pp. 50-65, 2015.
Ghazo et al., "ICS/SCADA Device Recognition: A Hybrid Communication-Patterns and Passive-Fingerprinting Approach," 2019 IFIP/IEEE Symposium on Integrated Network and Service Management (IM), pp. 19-24, 2019.
Ghazo et al., "A2G2V: Automatic Attack Graph Generation and Visualization and Its Applications to Computer and SCADA Networks," IEEE Transactions on Systems, Man, and Cybernetics: Systems, pp. 1-11, 2019.
Ghazo et al., "Identification of Critical-Attacks Set in an Attack-Graph," 2019 IEEE 10th Annual Ubiquitous Computing, Electronics Mobile Communication Conference (UEMCON), pp. 1-7, 2019.
Gillmann, "0/1-polytopes: Typical and Extremal Properties," pp. 1-131, 2007.
Gordeychik et al., "SCADA Strange Love or: How I Learned to Start Worrying and Love Nuclear plants," http://scadastrangelove.blogspot.ru/2012/11/plcscan.html, pp. 1-74, 2013.
Haidar et al., "Vulnerability Assessment of Power System Using Various Vulnerability Indices," 4th Student Conference on Research and Development, SCOReD 2006, IEEE, pp. 224-229, 2006.
Hassanzadeh et al., "Towards Effective Security Control Assignment in the Industrial Internet of Things," Internet of Things (WF-IoT), 2015 IEEE 2nd World Forum, pp. 795-800, 2015.
Hassin et al., "Approximation Algorithms and Hardness Results for Labeled Connectivity Problems," Journal of Combinatorial Optimization, vol. 14, No. 4, pp. 437-453, 2007.
Henry et al., "A Comprehensive Network Security Risk Model for Process Control Networks," Risk Analysis, vol. 29, No. 2, pp. 223-248 2009.
Henry et al., "Evaluating the Risk of Cyber Attacks on SCADA Systems Via Petri Net Analysis with Application to Hazardous Liquid Loading Operations," Technologies for Homeland Security, HST'09 IEEE Conference, pp. 607-614, 2009.
Hewett et al., "Cyber-Security Analysis of Smart Grid SCADA Systems with Game Models," Proceedings of the 9th Annual Cyber and Information Security Research Conference, ACM, pp. 109-112, 2014.
Hong et al., "Scalable Attack Representation Model Using Logic Reduction Techniques," Trust, Security and Privacy in Computing and Communications (TrustCom), 2013 12th IEEE International Conference, IEEE, pp. 404-411, 2013.
Huang et al., "Cyber-Physical System Security for Networked Industrial Processes," International Journal of Automation and Computing, vol. 12, No. 6, pp. 567-578, 2015.
Yardley, ICS PCAPs, https://github.com/ITI/ICS-Security-Tools/tree/master/pcaps, accessed: Sep. 4, 2018, pp. 1-3, 2018.
N. ICS-Cert, ICS-Cert Year in Review, pp. 1-9, 2015.
PLCopen, "International Standard IEC 61131 Applies to Programmable Controllers (PLC)", http://www.plcopen.org/pages/tc1_standards/iec61131-1/, accessed: Sep. 4, 2018, pp. 1-4, 2018.
I. E. C. (IEC), "IEC 62264-2 Enterprise-Control System Integration," http://www. plcopen.org/pages/tc1_standards/iec61131-1/, accessed: Sep. 4, 2018, pp. 1-21, 2018.
Ingols et al., "Practical Attack Graph Generation for Network Defense," Computer Security Applications Conference, ACSAC 06 22nd Annual, IEEE, pp. 121-130, 2006.
Ivanova et al., "Transforming Graphical System Models to Graphical Attack Models," International Workshop on Graphical Models for Security, Springer, pp. 82-96, 2015.
Jeon et al., "Passive Fingerprinting of SCADA in Critical Infrastructure Network Without Deep Packet Inspection," arXiv preprint arXiv:1608.07679, pp. 1-8, 2016.
Jha et al., "Two Formal Analyses of Attack Graphs," Computer Security Foundations Workshop, Proceedings. 15th IEEE, pp. 49-63, 2002.
Kaynar, "A Taxonomy for Attack Graph Generation and Usage in Network Security," J. Inf. Security Appl., vol. 29, pp. 27-56, 2016.

(56) References Cited

OTHER PUBLICATIONS

Kaynar et al., "Distributed Attack Graph Generation," IEEE Transactions on Dependable and Secure Computing, vol. 13, No. 5, pp. 519-532, 2016.
Keliris et al., "Remote Field Device Fingerprinting Using Device-Specific Modbus Information," 2016 IEEE 59th International Midwest Symposium on Circuits and Systems (MWSCAS), IEEE, pp. 1-4, 2016.
Kiravuo et al., "Peeking Under the Skirts of a Nation: Finding ICS Vulnerabilities in the Critical Digital Infrastructure," European Conference on Cyber Warfare and Security, Academic Conferences International Limited, pp. 137-144, 2015.
Kriaa et al., "Modeling the Stuxnet Attack with BDMP: Towards More Formal Risk Assessments," Risk and Security of Internet and Systems (CRISIS), 2012 7th International Conference on, IEEE, pp. 1-8, 2012.
Lemay et al., "Adversary-Driven State-Based System Security Evaluation," Proceedings of the 6th International Workshop on Security Measurements and Metrics, ACM, pp. 1-8, 2010.
Ma et al., "A Scalable, Bidirectional-Based Search Strategy to Generate Attack Graphs," Computer and Information Technology (CIT), 2010 IEEE 10th International Conference, IEEE, pp. 2976-2981, 2010.
"Masters-Thesis-Ellipsoid," https://github.com/mrflory/masters-thesis-ellipsoid, accessed: Sep. 18, 2019, pp. 1-11, 2019.
Mcqueen et al., "Quantitative Cyber Risk Reduction Estimation Methodology for a Small SCADA Control System," System Sciences, HICSS'06, Proceedings of the 39th Annual Hawaii International Conference on System Sciences, IEEE, vol. 9, pp. 1-12, 2006.
Nash, Geoff, "Modbus Register Mapping for the PLC IO Interface for GE Genius IO," M. T. LLC, https://www.mynah.com/content/ge-legacy-rio-interface-module-memory-map, Accessed: Oct. 17, 2019, pp. 1-41, 2017.
NCCIC/ICS-CERT, "Year in Review 2016 Incident Response Pie Charts," https://uscert.cisa.gov/sites/default/files/Annual_Reports/Year_in_Review_FY2016_IR_Pie_Chart_S508C.pdf., pp. 1-24, 2016.
Hansson, Netresec, "Capture Files from 4sics Geek Lounge," https://www.netresec.com/ index.ashx?page=PCAP4SICS, accessed: Sep. 4, 2018, pp. 1-2, 2018.
Kaspersky et al., "Year in Review 2016 Incident Response Pie Charts," https://uscert.cisa.gov/sites/default/files/Annual_Reports/Year_in_Review_FY2016_IR_Pie_Chart_S508C.pdf., pp. 1-2, 2016.
NCCIC, D. of Homeland Security, "ICS-CERT," https://search.usa.gov/search?utf8=US-cert-ics&sort_by=&query=siemens, accessed: May 25, 2018, pp. 1-2, 2018.
Noel et al., "Efficient Minimum-Cost Network Hardening Via Exploit Dependency Graphs," 19th Annual Computer Security Applications Conference, 2003 Proceedings., IEEE, pp. 86-95, 2003.
Osate, "Open Source AADL Tool Environment for the SAE Architecture Analysis and Design Language (AADL)," Carnegie-Mellon University, http://osate.org/about-osate.html, accessed: Jan. 11, 2018, pp. 1-3, 2018.
Patel et al., "Quantitatively Assessing the Vulnerability of Critical Information Systems: A New Method for Evaluating Security Enhancements," International Journal of Information Management, vol. 28, No. 6, pp. 483-491, 2008.
Permann et al., "Cyber Assessment Methods for SCADA Security," 15th annual joint ISA POWID/EPRI controls and Instrumentation conference, Nashville, TN, pp. 1-13, 2005.
Peterson, Dale, "Cyber Security Audit and Attack Detection Toolkit," Digital Bond Incorporated, Tech. Rep., pp. 1-24, 2012.
Radvanovsky et al., "Project SHINE: What We Discovered and Why You Should Care," 10th Sans ICS Security Summit, Orlando, FL, pp. 1-23, 2015.
Ren et al., "Verification Using Counterexample Fragment Based Specification Relaxation: Case of Modular/Concurrent Linear Hybrid Automata," IET Cyber-Physical Systems: Theory & Applications, vol. 2, No. 2, pp. 65-74, 2017.
Ren et al., "A New Abstraction-Refinement Based Verifier for Modular Linear Hybrid Automata and Its Implementation," Networking, Sensing and Control (ICNSC), 2014 IEEE 11th International Conference, IEEE, pp. 30-35, 2014.
Ritchey et al., "Using Model Checking to Analyze Network Vulnerabilities," Security and Privacy, S&P 2000, Proceedings, 2000 IEEE Symposium, IEEE, pp. 156-165, 2000.
Rockwell Collins and University of Minnesota, "The Assume Guarantee Reasoning Environment," Users Guide, pp. 1-59, 2018.
Sajid et al., "Cloud-Assisted IOT-Based SCADA Systems Security: A Review of the State of the Art and Future Challenges," IEEE Access, vol. 4, pp. 1375-1384, 2016.
Sawilla et al., "Identifying Critical Attack Assets in Dependency Attack Graphs," European Symposium on Research in Computer Security, Springer, pp. 18-34, 2008.
Schneider, "Modbus Protocol and Register Map for Ion Devices," https://www.ccontrol.com/support/dp/ION_Meter_Modbus.pdf, 2011, Accessed: Oct. 17, 2019, pp. 1-86.
Schnoebelen, "The Complexity of Temporal Logic Model Checking," Advances in modal logic, vol. 4, pp. 393-436, 2002.
Sheyner et al., "Tools for Generating and Analyzing Attack Graphs," International Symposium on Formal Methods for Components and Objects, Springer, pp. 344-371, 2003.
Sheyner, et al., "Automated Generation and Analysis of Attack Graphs," Proceedings 2002 IEEE Symposium on Security and Privacy, IEEE, p. 273-284, 2002.
Shodan, "The Computer Search Engine for Security," Available at: http://www.shodanhq.com/help, pp. 1-85, 2009.
Siemens, "Simatic S7-PLCSIM v5.4 SP8," https://support.industry.siemens.com/ cs/document/109750064/trial-software-simatic-s7-plcsim-v5-4-sp8?dti=0& Ic=en-WW, Accessed: Oct. 22, 2019, pp. 1-82.
Siemens, "S7—Open Modbus / TCP Communication," https://w3.siemens.com/ mcms/topics/en/siplus/ric-telecontrol/Documents/ric-docu/modbus-tcp_ funktionsbeschreibung_en.pdf, Accessed: Oct. 17, 2019, pp. 1-58.
Stouffer et al., "Guide to Industrial Control Systems (ICS) Security," NIST special publication, vol. 800, No. 82, pp. 1-155, 2011.
Trust, "Secure Water Treatment (SWaT) Testbed," https://itrust.sutd.edu.sg/testbeds/ secure-water-treatment-swat/, accessed: Jun. 5, 2018, pp. 1-16, 2018.
Tarjan, Robert, "Depth-First Search and Linear Graph Algorithms," SIAM Journal on Computing, vol. 1, No. 2, pp. 146-160, 1972.
Ten et al., "Cybersecurity for Critical Infrastructures: Attack and Defense Modeling," IEEE Transactions on Systems, Man, and Cybernetics—Part A: Systems and Humans, vol. 40, No. 4, pp. 853-865, 2010.
Wireshark, "Tshark Dump and Analyze Network Traffic," https://www.wireshark.org/ docs/man-pages/tshark.html, Accessed: Sep. 4, 2018, pp. 1-23, 2018.
U. NewsTrack, "Cyber Malfunction Halts Nuclear Plant." link.galegroup.com/apps/ doc/A179774603/BIC1?u=iastumain&xid=42ee4dce, Accessed: May 15, 2017, 1 pg, 2005.
Vigo et al., "Automated Generation of Attack Trees," Computer Security Foundations Symposium (CSF), 2014 IEEE 27th, pp. 337-350, 2014.
Wang et al., "Minimum-Cost Network Hardening Using Attack Graphs," Computer Communications, vol. 29, No. 18, pp. 3812-3824, 2006.
Wireshark, "OUI Lookup Tool," accessed: Sep. 4, 2018, 1 page, 2018.
Yan et al., "A PMU-Based Risk Assessment Framework for Power Control Systems," Power and Energy Society General Meeting (PES), 2013 IEEE, pp. 1-5, 2013.
Zhang et al., "The Label Cut Problem with Respect to Path Length and Label Frequency," Theoretical Computer Science, vol. 648, pp. 72-83, 2016.
Zhang et al., "Approximation and Hardness Results for Label Cut and Related Problems," Journal of Combinatorial Optimization, vol. 21, No. 2, pp. 192-208, 2011.
Zhang et al., "Multimodel-Based Incident Prediction and Risk Assessment in Dynamic Cybersecurity Protection for Industrial

(56) References Cited

OTHER PUBLICATIONS

Control Systems," IEEE Transactions on Systems, Man, and Cybernetics: Systems, vol. 46, No. 10, pp. 1429-1444, 2016.
SAE Int'l., "Architecture Analysis and Design Language" (AADL), AS5506, https:/SAE Int'l., /www.sae.org/standards/content/as5506/, accessed: Jan. 11, 2018, pp. 1-2, 2004.
Song et al., "A Cyber Security Risk Assessment for the Design of I&C Systems in Nuclear Power Plants," Nuclear Engineering and Technology, vol. 44, No. 8, pp. 919-928, 2012.
Wiens, "Nettoplcsim Network Extension for PLCSIM," https://usermanual.wiki/ Document/NetToPLCsimManualen.1468207178/view, Accessed:Oct. 22, 2019, pp. 1-11, 2019.
Woo et al., "A Study on Quantitative Methodology to Assess Cyber Security Risk of SCADA Systems," Advanced Materials Research, vols. 960-961, pp. 1602-1611, 2014.
Jiaxi et al., "Cyber Security Vulnerability Assessment of Power Industry", Power Systems Conference and Exposition, PSCE'06. 2006 IEEE PES, pp. 2200-2205, 2006.
Nelson et al., "Common Cybersecurity Vulnerabilities in Industrial Control Systems," Control Systems Security Program. Washington DC: Department of Homeland Security (DHS), National Cyber Security Division, pp. 1-88, 2011.

\* cited by examiner

2000 ⤹

| n:_det_test_dg.val | 0 | 0 | 0 | 0 | 0 |
|---|---|---|---|---|---|
| Thr_ftpr_01.val | FALSE | FALSE | FALSE | FALSE | TRUE |
| Thr_ftpr_02.val | TRUE | FALSE | FALSE | FALSE | FALSE |
| Thr_ftpr_11.val | FALSE | FALSE | FALSE | FALSE | FALSE |
| Thr_ftpr_12.val | FALSE | FALSE | FALSE | FALSE | FALSE |
| Thr_ftpr_21.val | FALSE | FALSE | FALSE | FALSE | FALSE |
| Thr_ftpr_22.val | FALSE | FALSE | FALSE | FALSE | FALSE |
| Thr_lbo_01.val | FALSE | FALSE | FALSE | FALSE | FALSE |
| Thr_lbo_02.val | FALSE | FALSE | FALSE | TRUE | FALSE |
| Thr_lbo_11.val | FALSE | FALSE | FALSE | FALSE | FALSE |
| Thr_lbo_12.val | FALSE | FALSE | FALSE | FALSE | FALSE |
| Thr_lbo_21.val | FALSE | FALSE | FALSE | FALSE | FALSE |
| Thr_lbo_22.val | FALSE | FALSE | FALSE | FALSE | FALSE |
| Thr_rlog_01.val | FALSE | FALSE | FALSE | FALSE | FALSE |
| Thr_rlog_02.val | FALSE | FALSE | FALSE | FALSE | FALSE |
| Thr_rlog_12.val | FALSE | FALSE | TRUE | FALSE | FALSE |
| Thr_rlog_21.val | FALSE | FALSE | FALSE | FALSE | FALSE |
| Thr_sbo_01.val | FALSE | TRUE | FALSE | FALSE | FALSE |
| Thr_sbo_02.val | FALSE | FALSE | FALSE | FALSE | FALSE |
| Thr_sbo_12.val | FALSE | FALSE | FALSE | FALSE | FALSE |
| Thr_sbo_21.val | FALSE | FALSE | FALSE | FALSE | FALSE |
| test_dg.val | 0 | 0 | 0 | 0 | 0 |
| test_l_1.val | 0 | 2 | 2 | 2 | 2 |
| test_l_2.val | 0 | 0 | 0 | 1 | 2 |
|  |  |  |  |  |  |
| Locals |  |  |  |  |  |
| _GUARANTEE0 | TRUE | TRUE | TRUE | TRUE | FALSE |

→(A)

FIG. 20 assert (CE_3 = ( ( ( ( ( ( ( ( (Thr_ftpr_02.val = false) and (pre (Thr_ftpr_02.val = false) ) ) and (pre (pre (Thr_ftpr_02.val = false) ) ) ) and (pre (pre (pre (Thr_ftpr_02.val =false) ) ) ) ) and (pre (pre (pre (pre (Thr ftpr 02.val =ture) ) ) ) ) ) and ( ( ( ( (Thr_sbo_01.val = false) and (pre (Thr_sbo_01.val = false) ) ) and (pre (pre (Thr_sbo_01.val =false) ) ) ) and (pre (pre (pre (Thr_sbo_01.val - true) ) ) ) ) and (pre (pre (pre (pre (Thr_sbo_01.val =false) ) ) ) ) ) and ( ( ( ( (Thr_rlog_12.val =false ) and (pre (Thr_rlog_12.val = false) ) ) and (pre (pre (Thr_rlog_12.val = true) ) ) ) and (pre (pre (pre (Thr_rlog_12.val = false) ) ) ) ) and (pre (pre (pre (pre (Thr_rlog_12.val =false) ) ) ) ) ) and ( ( ( ( (Thr_lbo_02.val = false ) and (pre (Thr_lbo_02.val = true) ) ) and (pre (pre (Thr_lbo_02.val = false) ) ) ) and (pre (pre (pre (Thr_lbo_02.val = false) ) ) ) ) and (pre (pre (pre (pre (Thr_lbo_02.val = false) ) ) ) ) ) and ( ( ( ( (Thr_ftpr_01.val = true) and (pre (Thr_ftpr_01.val = false) ) ) and (pre (pre (Thr_ftpr_ 01.val = false) ) ) ) and (pre (pre (pre (Thr_ftpr_01.val = false) ) ) ) ) and (pre (pre (pre (pre (Thr_ftpr_01.val = false) ) ) ) ) ) ) ) ) ) ) );

Ⓐ

_GUARANTEE0 = ( (test_1_1.val < 1) or ( (test_1_2.val < 2) or (test_dg.val = 1) ) ) or CE_1 or CE_2 or CE_3;

FIG. 20
(Continued)

CYBERSECURITY ALGORITHMS AND TOOLS FOR SUPERVISORY CONTROL AND DATA ACQUISITION AND INDUSTRIAL CONTROL SYSTEMS

CROSS REFERENCE TO RELATED APPLICATIONS

This application claims priority under 35 U.S.C. § 119 to provisional patent application U.S. Ser. No. 63/007,173, filed Apr. 8, 2020. The provisional patent application is herein incorporated by reference in its entirety, including without limitation, the specification, claims, and abstract, as well as any figures, tables, appendices, or drawings thereof.

GOVERNMENT RIGHTS CLAUSE

This invention was made with Government support under Grant Number CCF1331390 awarded by the National Science Foundation. The government has certain rights in the invention.

FIELD OF THE INVENTION

The present invention relates to methods and systems of providing and/or enhancing cybersecurity in networks and, in particular, in control systems, including at least control systems digitally connected to a non-isolated network, distributed network control systems, supervisory control and data acquisition (SCADA) systems, and/or industrial control systems (ICS).

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Digital control systems touch almost every aspect of present-day life. They can vary in size and scope. They can vary in application and function. Benefits are well-known. However, they all share the risk of vulnerability to cyber-attack or malicious activity. It is therefore a present imperative to develop technical solutions to effectively address these vulnerabilities and the risks they represent.

A variety of digital control systems are utilized in manufacturing or industries. Two examples are supervisory control and data acquisition (SCADA) systems and industrial control system(s) (ICS). SCADA refers to a control system architecture comprising computers, networked data communications and graphical user interfaces (GUIs) for high-level process supervisory management. SCADA can also relate to other peripheral devices or interfaces (e.g., programmable logic controllers (PLC) and discrete proportional-integral-derivative (PID) controllers) to process equipment or machinery. Industrial control system (ICS) refers generally to control systems and associated devices or devices for industrial process control. They can involve a few modular panel-mounted controllers to large interconnected and interactive distributed control systems with many thousands of field connections. In one form, such systems receive data from remote sensors measuring process variables (PVs), compare the collected data with desired setpoints (SPs), and derive command functions which are used to control a process through the final control elements (FCEs), such as control valves.

SCADA systems/ICS used to be on isolated networks. However, due to the increase in popularity and advancements of wireless networking and cloud technologies, SCADA systems/ICS have begun to expand their connectivity to the cloud. Cloud-computing and the Internet of Things (IoT) revolutions offer increasingly rapid innovation, flexible resources, and help in lowering operating costs. SCADA systems/ICS are thus transitioning to cloud computing and IoT to improve supervisory and control processes by sharing real-time information among machines, manufacturing chains, suppliers, and customers. Since SCADA systems/ICS feature unique cyber and physical interaction and were originally built as isolated systems, connecting them to the internet creates potential security problems. The extent of such connectivity can vary from system to system. Benefits of connecting to the internet/cloud are substantial, but such connectivity also makes those systems vulnerable, for no longer being isolated.

As is well-appreciated by those skilled in this technical art, malicious attacks to such systems can present significant economic risk to stakeholders. But further, in some cases, they can also present risk to human safety. Still further, in some applications, there could be local or even national security risks from disruption or failure of such control systems.

Others have investigated the SCADA/ICS security problem. A risk assessment framework has been designed for GPS-based railway SCADA systems. See Chittester et al. "Risks of Terrorism to Information Technology and to Critical Interdependent Infrastructures," *J Homel Secur Emerg Manag*, vol. 1, no. 4, p. 402, 2004. This framework applies hierarchical holographic modeling (HIIM) where to identify risks it maps the control objectives for information and related technology (CobiT) onto a holographic model. A vulnerability assessment methodology has been suggested for SCADA systems based on professional experience. See Permann et al., "Cyber Assessment Methods for SCADA Security," in 15*th annual joint ISA POWID/EPRI controls and instrumentation conference*, Nashville, TN, 2005. A methodology for quantitative estimation of cyber risk reduction for SCADA system has also been proposed. See McQueen et al., "Quantitative Cyber Risk Reduction Estimation Methodology for a Small SCADA Control System," in System Sciences, 2006. *HICSS'06. Proceedings of the 39th Annual Hawaii International Conference on System Science*, vol. 9, pp. 226-226, IEEE, 2006. To estimate such risk reduction, a cyber-attack directed graph is first generated for both improved and unimproved systems, followed by measuring and analyzing the variation of time needed to compromise each system. Jiaxi et al. studied SCADA system integrated risk assessment and probabilistic assessment in energy management systems and management information systems. See Jiaxi et al., "Vulnerability Assessment of Cyber Security in Power Industry," in *Power Systems Conference and Exposition*, 2006. *PSCE'06*. 2006 *IEEE PES*, pp. 2200-2205, IEEE, 2006. A scenario-based approach to vulnerability assessment is used by the Control Systems Security Center (CSSC) for the National Cybersecurity Division of the Department of Homeland Security. See Gertman et al., "Scenario-Based Approach to Risk Analysis in Support of Cyber Security," tech. rep., American Nuclear Society, 555 North Kensington Avenue, La Grange Park, IL 60526 (United States), 2006. A method for SCADA system security level qualitative assessment has been introduced that helps managers make decisions about implementing security countermeasures. See Patel et al., "Quantitatively Assessing the Vulnerability of Critical Information Systems: A New Method for Evaluating Security Enhancements," International Journal of Information Management, vol. 28, no. 6, pp. 483-491, 2008. A three Petri net model for quantifying the risk of cyber-attacks on SCADA systems, aiming to identify all high-consequence attack states, has also been introduced. See Henry et al., "Evaluating the Risk of Cyber Attacks on SCADA Systems via Petri Net Analysis with Application to Hazardous Liquid Loading Operations," in *Technologies for Homeland Security, 2009. HST'09. IEEE Conference on*, pp. 607-614, IEEE, 2009.

One approach to the vulnerability assessment is to develop an infrastructure hypergraph and an evolution graph, which is a more detailed version of an attack graph. See Baiardi et al., "Hierarchical, Model-Based Risk Management of Critical Infrastructures," Reliability Engineering & System Safety, vol. 94, no. 9, pp. 1403-1415, 2009. Henry et al. introduced a network security risk model, a directed graph representing an attack, whose goal is to aid in the selection of risk management controls by providing a measure of risk and by calculating the measure for a baseline and for a security improved system. See Henry et al., "A Comprehensive Network Security Risk Model for Process Control Networks," *Risk analysis*, vol. 29, no. 2, pp. 223-248, 2009. LeMay et al. introduced the Adversary View Security Evaluation (ADVISE) method that adds the characteristics of an adversary to an attack graph. See "Adversary-Driven State-Based System Security Evaluation," in *Proceedings of the 6th International Workshop on Security Measurements and Metrics*, p. 5, ACM, 2010. The purpose of the ADVISE method is to identify the most likely attack path by using an executable state-based security model to calculate an attack's probability of success. SCADA security frameworks have also been proposed with four-part networks including real-time monitoring, anomaly detection, impact analysis, and mitigation strategies (RAIM). See Ten et al., "Cybersecurity for Critical Infrastructures: Attack and Defense Modeling," *IEEE Transactions on Systems, Man, and Cybernetics—Part A: Systems and Humans*, vol. 40, no. 4, pp. 853-865, 2010. A cybersecurity risk assessment methodology may be able to be applied during the process of instrumentation and control systems design in nuclear power plants to perform vulnerability assessment during both system and component design and equipment supply. See Song et al., "A Cyber Security Risk Assessment for the Design of I&C Systems in Nuclear Power Plants," *Nuclear Engineering and Technology*, vol. 44, no. 8, pp. 919-928, 2012.

With reference to particular examples, Kriaa et al. proposed a Boolean logic driven Markov processes (BDMP) modeling approach that combines fault trees with Markov processes to achieve both qualitative and quantitative vulnerability assessment. See "Modeling the Stuxnet Attack with BDMP: Towards More Formal Risk Assessments," in *Risk and Security of Internet and Systems (CRiSIS), 2012 7th International Conference on*, pp. 1-8, IEEE, 2012. Yan et al. suggested a phasor measurement unit (PMU) based on a risk assessment framework for SCADA systems of power grids. See Yan et al., "A PMU-based risk assessment Framework for Power Control Systems," in *Power and Energy Society General Meeting (PES), 2013 IEEE*, pp. 1-5, IEEE, 2013. The PMU identifies and quantifies vulnerabilities within such systems using a duality element relative fuzzy evaluation method (DERFEM), then generates an attack graph that can be used to find intrusion scenarios. Hewett et al. discussed the application of game theory to cybersecurity analysis of a smart grid SCADA system where they modeled the attacker as a two-player, non-zero sum, noncooperative, sequential, and perfect information game for the SCADA system administrator. See Hewett et al., "Cyber-Security Analysis of Smart Grid SCADA Systems with Game Models," in *Proceedings of the 9th Annual Cyber and Information Security Research Conference*, pp. 109-112, ACM, 2014. Woo et al. suggested a methodology for quantitative assessment of vulnerability assessment in SCADA systems based on optimal power flow and power flow tracing. See Woo et al. "A Study on Quantitative Methodology to Assess Cyber Security Risk of SCADA Systems," *Advanced Materials Research*, 2014.

Only a limited number of studies exist that proposed approaches to identify the SCADA/ICS components. Gordeychik proposed identifying the devices based on specific SCADA protocol functions (e.g., in Modbus protocol there is a function that returns the device information). See Gordeychik, "SCADA Strangelove or: How I Learned to Start Worrying and Love Nuclear Plants," 2013. Such approaches are limited to the specific protocol used, and do not generalize. The SCADA search engine Shodan can discover the devices connected to the Internet and has inspired works to use port scanning methods to identify SCADA devices. See Radvanovsky et al., "Project SHINE: What We Discovered and Why You Should Care," 10*th Sans ICS Security Summit*, Orlando, FL, 2015; and Kiravuo et al., "Peeking Under the Skirts of a Nation: Finding ICS Vulnerabilities in the Critical Digital Infrastructure," in *European Conference on Cyber Warfare and Security*, p. 137, Academic Conferences International Limited, 2015. However, these approaches employ active fingerprinting, and if applied without proper study and preparation, can interrupt and even "freeze" some devices, as mentioned earlier.

A number of solutions to the problems associated with active fingerprinting have been proposed. Some examples related to SCADA systems and ICS include attempts at automated identification of devices involved in a control system to help create a vulnerability solution. Device recognition is a useful first step in vulnerability identification and defense augmentation, but due to the lack of full traceability in case of legacy SCADA systems/ICS, the typical device recognition based on document inspection is not applicable, leading to the possibility of unaccounted security vulnerabilities in such systems. Some of said attempts can be described as follows.

TCP/IP information can be used to construct a device fingerprint. See Frangois et al., "PTF: Passive Temporal Fingerprinting," 12*th IFIP/IEEE International Symposium on Integrated Network Management—IM'*2011, May 2011, Dublin, Ireland. U.S. Pre-grant Pub. No. 2018/0048550A1 to Beyah et al. further demonstrates the device fingerprint can be generated based on the response time, herein incorporated by reference in its entirety. Beyah et al.'s approach is however only device-specific, and not device-model-specific, thus offering limited resolution of devices.

The type of a device based on the ICS/SCADA communication-patterns has been identified but only in two-layer systems. See Jeon et al., "Passive Fingerprinting of SCADA in critical infrastructure network without deep packet inspection," *arXiv preprint arXiv:*1608.07679, 2016. The SCADA/ICS device fingerprinting problem was also considered with the authors exploring existing approaches, without proposing new one(s). See Caselli et al., "On the Feasibility of Device Fingerprinting in Industrial Control Systems," in *International Workshop on Critical Information Infrastructures Security*, pp. 155-166, Springer, 2013. Caselli et al. concluded that current tools are not fully compatible with SCADA/ICS systems.

Bodenheim et al. evaluated the Shodan search engine and concluded that Shodan search engine can be a threat to SCADA/ICS systems as it can identify Internet-facing industrial control devices however failed to propose a mitigation technique to protect from Shodan and did not propose a new device recognition tool. See Bodenheim et al., "Evaluation of the Ability of the Shodan Search Engine to Identify Internet-Facing Industrial Control Devices," *International Journal of Critical Infrastructure Protection*, vol. 7, no. 2, pp. 114-123, 2014.

Some authors focused on attack-graph generation to evaluate the SCADA/ICS system vulnerability. One process calculus based model generates a graph by translating algebraic specifications into formulas, and then by backward chaining those formulas into a formula corresponding to the success of the attacker goal. Vigo et al., "Automated Generation of Attack Trees," in *Computer Security Foundations Symposium (CSF)*, 2014 IEEE 27th, pp. 337-350, IEEE, 2014. Logic programming has been used to construct attack-graphs and has been applied starting from the primary facts until reaching the objective facts. See Hong et al., "Scalable Attack Representation Model Using Logic Reduction Techniques," in *Trust, Security and Privacy in Computing and Communications (TrustCom)*, 2013 12th IEEE International Conference on, pp. 404-411, IEEE, 2013. Generalized stochastic Petri nets have been used to model intrusions into the control networks. See Cho et al., "Cyberphysical Security and Dependability Analysis of Digital Control Systems in Nuclear Power Plants," IEEE Transactions on Systems, Man, and Cybernetics: Systems, vol. 46, no. 3, pp. 356-369, 2016." Attack graphs have been constructed using network connectivity information, wherein an attacker can reach the next desired system location from the current system location if it is adjacent to it, and such a search strategy has been applied recursively until the entire attack graph was constructed. Ivanova et al., "Transforming Graphical System Models to Graphical Attack Models," in *International Workshop on Graphical Models for Security*, pp. 82-96, Springer, 2015. A multilevel Bayesian network has been used to construct an attack-graph by integrating knowledge of attacks, system functions, and hazardous incidents. See "Multimodel-Based Incident Prediction and Risk Assessment in Dynamic Cybersecurity Protection for Industrial Control Systems," *IEEE Transactions on Systems, Man, and Cybernetics: Systems*, vol. 46, no. 10, pp. 1429-1444, 2016. A layered search algorithm, with a bottom layer representing the attacker initial privileges and an upper layer represents new computed privileges after each iteration, has been proposed. See Ammann et al., "Scalable, Graph-Based Network Vulnerability Analysis," in Proceedings of the 9th ACM Conference on Computer and Communications Security, pp. 217-224, ACM, 2002. From these iterations, a "worst-case scenario attack-graph" can be constructed. See Ammann et al., "A Host-Based Approach to Network Attack Chaining Analysis," in *Computer Security Applications Conference*, 21st Annual, pp. 10-pp, IEEE, 2005. Each node represents a network host, and the edges represent the atomic attack that an attacker can use to gain the highest privilege on the next target node (the worst-case attack). The search complexity can be reduced by constructing a reachability matrix using grouped reachability conditions. To eliminate duplication, the algorithm uses pre-stored hashes. See Ingols et al., "Practical Attack Graph Generation for Network Defense," in *Computer Security Applications Conference*, 2006. ACSAC'06. 22nd Annual, pp. 121-130, IEEE, 2006. Ingols et al. also proposed a new attack-graph structure called multiple-prerequisite graphs, where nodes represent the reachability conditions among network hosts.

Ma et al. proposed a bidirectional search method to construct attack-graphs. See Ma et al., "A Scalable, Bidirectional-Based Search Strategy to Generate Attack Graphs," in *Computer and Information Technology (CIT)*, 2010 IEEE 10th International Conference on, pp. 2976-2981, IEEE, 2010. The forward search starts from initial states, while the backward search starts from the goal states. A parallel and distributed memory-based algorithm was introduced that builds vulnerability-based attack graphs on a distributed multi-agent platform. See Kaynar et al., "Distributed Attack Graph Generation," *IEEE Transactions on Dependable and Secure Computing*, vol. 13, no. 5, pp. 519-532, 2016. These approaches work at certain levels of abstraction and may miss finer details of how atomic attacks can be concatenated to compromise a system.

Ritchey et al. considered a model-based approach for attack generation where it generates a single attack path from a single reported counterexample. See Ritchey et al., "Using Model Checking to Analyze Network Vulnerabilities," in *Security and Privacy*, 2000. S&P 2000. Proceedings. 2000 IEEE Symposium on, pp. 156-165, IEEE, 2000. [45] introduced the model-based approach to create an attack-graph for a networked system. The state space of the system was formally modeled, using configuration parameters and attacker privileges. The state transitions represent the atomic attack actions. The approach in limited to the AG(safe) type security property, whose violation corresponds to the reachability unsafe locations in the model. See "Automated Generation and Analysis of Attack Graphs," in *Security and privacy*, 2002. Proceedings. 2002 IEEE Symposium on, pp. 273-284, IEEE, 2002. More general requirements, such as $AG(p \rightarrow AXq)$ that are violated by the reachability of certain paths (rather locations) can exist. Automated generation of possible attacks to help create a vulnerability solution have thus been attempted. For example, attack-sequences in form of counter examples have been generated but are limited to security properties that can be mapped to the reachability of unsafe locations within an underlying model. Sheyner et al. showed nondeterministic polynomial time (NP)-completeness could be achieved and the minimum critical-attacks set found (equivalently: the minimum label cut (MLC)) by reducing the minimum cover problem to it.

Later, it was determined the MLC could be further reduced by reducing the hitting set problem to the MLC and applying a greedy algorithm to the hitting set problem to pick the elements with the highest hits first. See Jha et al., "Two Formal Analyses of Attack Graphs," in *Computer Security Foundations Workshop*, 2002. Proceedings. 15th IEEE, pp. 49-63, IEEE, 2002. It was further discovered a relaxed version of MLC, particularly one that seeks a certain approximation to MLC, itself is NP-complete; even further, an approximation algorithm can be used to find a solution to MLC within a factor of $O(\sqrt{n})$. See Zhang et al., "Approximation and Hardness Results for Label Cut and Related Problems," *Journal of Combinatorial Optimization*, vol. 21, no. 2, pp. 192-208, 2011. Later this discovery was improved upon by proposing an approximating solution to MLC within a factor of $O(n^{2/3})$, and more particularly by computing the minimum polytope corresponding to an approximate hitting. See Dutta et al., "Labeled Cuts in Graphs," *Theoretical Computer Science*, vol. 648, pp. 34-39, 2016.

"Minimum-cost network hardening" is essentially a similar problem of finding the minimum-costing hardening measures of network components, exploring their dependency relations (as in case of an attack graph). See Wang et al., "Minimum-Cost Network Hardening Using Attack Graphs," *Computer Communications*, vol. 29, no. 18, pp. 3812-3824, 2006. Cho et al., see supra, used generalized stochastic Petri nets to quantitatively evaluate the control networks intrusions probability. Defense research and development in Canada has suggested use Google's page-rank based approach for network security, in which the idea was to successively remove the highest page-ranked nodes to maximally decrease the overall connectivity. See Sawilla et al., "Identifying Critical Attack Assets in Dependency Attack Graphs," in *European Symposium on Research in Computer Security*, pp. 18-34, Springer, 2008. A genetic algorithm can find a minimum cut set in dependency attack-graphs, with the cut set representing a set of security countermeasures that prevent attackers from exploiting the underlying vulnerabilities. "Finding the Minimum Cut Set in Attack Graphs Using Genetic Algorithms," in 2013 *International Conference on Computer Applications Technology (ICCAT)*, pp. 1-6, IEEE, 2013. Hassin et al. studied a related problem of finding a minimum label spanning tree and a minimum label path, but those do not necessarily induce a cut. See Hassin et al., "Approximation Algorithms and Hardness Results for Labeled Connectivity Problems," *Journal of Combinatorial Optimization*, vol. 14, no. 4, pp. 437-453, 2007. An exact algorithm to compute an MLC for a special case was suggested where the graph is disjoint undirected graph with label frequency at most 2, in polynomial complexity. See Zhang et al., "The Label Cut Problem with Respect to Path Length and Label Frequency," *Theoretical Computer Science*, vol. 648, pp. 72-83, 2016. Zhang et al. also proposed an approximation algorithm for a more general undirected graph. However, since an attack-graph is a directed graph, the proposed algorithms do not apply to them.

Despite the progress made in this technical field, the inventors have identified there remains room for improvement. For example, examining the state of the art in vulnerability assessment reveals that further improvement and research is required in areas such as overcoming cyber-attacks and failures, reliability improvement, evaluation and validation, and tool support. Vulnerability assessment is also missing a comprehensive method that would cover all stages of the risk management process.

SUMMARY OF THE INVENTION

The following summary(ies), objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be selectively integrated with one another, in full or in part.

According to an aspect of the invention, control system resources such as devices, connectivity, protocols, data, access controls, and trust relations can be identified by recognizing communication patterns and control hierarchy levels associated with devices; certain distinguishable features in communication-packets can be used to recognize the device's manufacturer and model. One example of such an aspect is automated network device and vulnerability identification (ANDVI).

According to another aspect of the invention, global vulnerabilities can be assessed by constructing attack-graphs to enumerate the set of all possible sequences in which atomic-level vulnerabilities can be exploited to compromise system security. One example of such an aspect is an automated attack-graph generator and visualizer (A2G2V). A2G2V can employ a model-checking based algorithm that uses existing model-checking tools, an architecture description tool, and customized code to generate an attack-graph that enumerates the set of all possible sequences in which atomic-level vulnerabilities can be exploited to compromise system security.

According to yet another aspect of the invention, vulnerabilities can be resolved by identifying label-cuts within an attack-graph to automatically identify a set of critical-attacks that, when blocked, render the system secure. One example of such an aspect is an algorithm capable of producing a strongly connected component induced min label cut (SCCi-MLC).

With greater particularity, SCADA systems/ICS are industrial systems that use control devices, network protocols, and graphical user interfaces for gathering and analyzing real-time data. SCADA systems/ICS are utilized to monitor and command a plant or other industrial equipment such as nuclear plants, telecommunications, water and waste control, oil and gas refining, and energy. Today, since cloud computing and the Internet of Things (IoT) revolutions offer increasingly rapid innovation, flexible resources, and help in lowering operating costs, SCADA/ICS are transitioning to cloud computing and IoT to improve supervisory and control processes by sharing real-time information among machines, manufacturing chains, suppliers, and customers. Since SCADA/ICS systems feature unique cyber and physical interaction and were originally built as isolated systems, connecting them to the internet creates potential security problems. The present invention secures said SCADA systems/ICS.

SCADA/ICS systems are installed by third party contractors, maintained by site engineers, and operate for a long time. This makes tracing the documentation of the systems' changes and updates challenging since some of their components' information (type, manufacturer, model, etc.) may not be up-to-date, leading to possibly unaccounted security vulnerabilities in the systems.

To catch any existing vulnerabilities in a SCADA/ICS system, a robust understanding of devices, practices, protocols, and applications is beneficial to be able to enumerate the previously identified vulnerabilities for that set of components and develop the defenses against the potential attacks (such as providing patches to remove the existing vulnerabilities). To develop such desired knowhow of a legacy system, one important prerequisite is the identification of the devices (e.g., Programmable Logic Controller (PLC), Human Machine Interface (HMI)), protocols, and applications/services on the network. This is also referred to as device fingerprinting, and if proper documentations were available, a simple solution could be to refer to those. However, it turns out that in many instances, the documentation and implementation differ owing to the inadequately documented changes and updates, rendering the referral to any such documentation erroneous/incomplete. This situation is also encountered in traditional IT infrastructures, and a typical solution is to resort to network fingerprinting techniques. This can be either active or passive fingerprinting.

Active fingerprinting attempts to identify the devices on the network by actively requesting information from the devices. For example, probing packets may be sent to an IP address and any response analyzed. One may attempt to implement such an active approach for an SCADA/ICS network, but two concerning issues arise. First, the active approach will add to the traffic load of the network. Because most SCADA systems/ICS have congestion constraints with strict latency requirements, their violation may raise certain safety issues. Second, some legacy devices on an SCADA systems/ICS are not designed to robustly support any unsupported packets, and their introduction may set the device into an unpredictable state. These concerns make the active fingerprinting for SCADA systems/ICS circumspect, and so are not preferred by SCADA systems/ICS users, as applying it requires further analysis to assess the impacts on the systems.

Passive fingerprinting uses a network sniffer to capture traffic already generated by the system devices and analyzes this traffic to identify the devices. For passive fingerprinting to function appropriately, it is pertinent to define the distinguishing features in the network traffic to facilitate device identity. IT infrastructure network traffics have known distinguishable features that can be used to identify the network devices. In an SCADA system/ICS, a network does not typically provide explicit signatures for a passive fingerprinting, as its equipment are often simple and unable to offer extra-functional services. The passive fingerprinting task can be approached by first inferring the device type, that can reduce the amount of features needed to identify the devices in the network and thereby improve its accuracy.

As disclosed herein, the communications-pattern can initially be used to identify the device hierarchy level to reveal its type, and then passive fingerprinting can be used for an enhanced device recognition. SCADA systems/ICS have specific network topology requirements, two of which prove very useful. First, each device is only allowed to communicate with preprogrammed devices. Second, the devices follow a chain-of-command based communication pattern to prevent any command conflict. Such topological information about communication can be used to identify the control hierarchy level of a device within that chain-of-command, where the levels of the SCADA/ICS hierarchy help identify a device type (SCADA station, HMI, PLC, etc.).

Accordingly, a two-step hybrid approach that uses both the communication-patterns and device-fingerprints (constructed through passive fingerprinting techniques) can be employed. A two-step algorithm first uses the network traffic to explore the SCADA system/ICS communication patterns and identify the control hierarchy, and next a fingerprint for each device obtained from its communication packets and is compared with the learned ones in the reference database (explained in next sentence) to determine the exact model details of the device.

To learn the reference database, the traffic of a network with known devices is gathered and analyzed to identify the device specific values in certain fields of the communication packets. The reference dataset can represent a variety of SCADA system/ICS devices from different vendors and validates the general application of the present invention.

One of the challenges that any passive device fingerprinting faces is the number of data collection points. Due to the hierarchical nature of the SCADA system, the devices packet only exist between the parents/children devices, and do not extend beyond that level. So, a data collection scheme needs to collect data for each device. In some SCADA systems, routers exist to connect different children devices to their common parent, so a data collection point between the router and the parent device can capture all the required data, reducing the number of data collection points. For this a more in-depth packet inspection is required to fingerprint a device. This in-depth packet can, for example, be described for SCADA systems/ICS utilizing Modbus for device communication, which is one of the most widely used application-layer protocol. Nowadays, the Modbus protocol is integrated with the TCP/IP protocol, i.e., the Modbus packets are encapsulated into the TCP/IP packets. Since the routers are not allowed to modify the TCP/IP data, the Modbus messages are not affected when transmitted over the network even if routers exist in the path between the source and the destination. Using this observation, the present invention in a non-limiting embodiment is thus able to identify SCADA systems/ICS that utilize Modbus-protocol for communication. The fingerprints are created by analyzing the Modbus messages and identifying the read/write register ranges for the unknown devices, which is then compared to the fingerprints in a reference database. SCADA systems/ICS device datasheets include a register map that identifies the read/write registers for each SCADA system/ICS device, and so the reference fingerprints database can be created directly from the manufacturers' datasheets. In another non-limiting embodiment, the device recognition approach can in particular be implemented in Python and integrated with traffic data from a water treatment SCADA system.

ANDVI can be used to map the discovered devices to their known vulnerabilities. To do this, a tool as described herein can extract that information availability in a common vulnerabilities and exposures (CVE) database and a national vulnerability database (NVD). When combined with use of A2G2V, this can map device vulnerabilities to attack graphs of all ways a system-level security property of interest may be compromised. Further, by integrating A2G2V with SCCi-MLC, a minimal set of vulnerabilities can be identified whose mitigation renders the entire system secure.

Attack-graphs are graphical data structures representing all attack scenarios, in the form of sequences of atomic attacks, that an attacker can pursue to compromise a system. Once an attack-graph has been generated for a system, it can be used in understanding the complex system-level vulnerabilities derivable from the atomic component level ones, and thereby in system-level security risk assessment. Note vulnerability assessment is an important research field of its own. Traditionally, attack-graphs are generated manually by a team of experts that analyze the system, but this is tedious and time-consuming, and subject to being error-prone and incomplete. Therefore, an approach that is based on a complete and accurate model and that is automated in generating the attack graph is highly desired.

The vast majority of existing research on attack-graph generation is "non-model-based" and hence cannot be automated. In contrast, the attack graph generation algorithm is model-based, i.e., it utilizes a formal description of the system model (describing architecture and connectivity, components and behaviors, assets, defenses, vulnerabilities, and atomic attacks), as well as of the system-level security properties of interest, along with defining the associated state-space of interest and specifying how that evolves when atomic-attack actions of interest occur, to enable the automatic computing the associated attack-graph. The present disclosure enables the generation of an attack-graph for any security property of interest, including those that may be violated by executing an acyclic path, rather only by reaching a location.

As presented herein, an augmentation of a model-checker for state-space exploration can find all acyclic counterexample-paths where the given specified security properties are violated. A model-checker in general only produces a single counterexample. If executed more than once, the model checker may reproduce the same counterexample.

The algorithm(s) provided herein ensure that a distinct counterexample is generated each time a model-checker is called. To ensure that the same counterexample is not repeated, A2G2V implementation iteratively relaxes the existing specification by disjuncting it with the encoding of the latest counterexample. This ensures that the latest counterexample ends up satisfying the relaxed specification and can no longer act as a counterexample.

A software program, such as the C-program based A2G2V tool described herein, can take as an input the system architecture and the atomic attack behaviors as captured in an architecture description language, such as Architecture Analysis and Design Language (AADL), and an associated annex, such as the Assume Guarantee REasoning Environment (AGREE) annex. The architecture description language is used to formally represent the underlying networked system, whereas its atomic vulnerabilities, their pre- and post-conditions, and security property of interest using the annex. The architecture description language and annex model then translates into a parallel distributed file system (e.g., Lustre) equivalent, to enable further analysis using a model-checker, such as JKind. The A2G2V tool calls the model-checker iteratively, each time with a newly relaxed specification, to generate a new attack sequence in each iteration in the form of a new counterexample. Further, a graphics tool such as Graphviz can be integrated into A2G2V for the visualization of the generated attack graph.

In general, even small systems may have large and complex attack-graphs, and so for system administrators with limits on budgets and resources, securing all vulnerabilities included in an attack-graph might not be desirable. Further, the scale of the attack-graphs make those difficult to fully comprehend through manual inspection. Thus securing an SCADA/ICS system requires an automated tool to help system administrators analyze an attack-graph to identify the minimum defense enactments that can help secure their system in a viable fashion. The present disclosure refers to such minimal set of attacks, a critical attacks-set, mitigating which would render the attack-graph disconnected, and thereby disabling all attack-paths that an adversary may exercise to compromise the given system.

Attack-graphs are directed labeled graphs, where each vertex corresponds to a certain system status including attacker privileges on various devices/assets, each edge represents an atomic attack that an attacker might execute to gain more privileges, and each path from the initial node to a final node represents an attack path an attacker may follow to compromise a system-level security property. The goal for a system administrator then is to find a minimal number of attacks that could be prevented such that no viable path remains from the initial node to a final node. In graph theory this is known as a cut. Since the attack-graph is a directed labeled graph, finding the minimal number of attacks, whose prevention would render the disconnection of the initial node from the final nodes, is an instance of a min label-cut (MLC) that requires finding the minimum number of attack-labels whose edges must be removed from a graph to cut all paths from the initial node to the final nodes. A direct application of the MLC to identify a set of critical attacks is computationally limiting, since MLC is in general an NP-complete problem.

The present invention implements a linear complexity, automated critical-attacks set identification approach, not necessarily minimal, based on the analysis of the attack-graph. The first step within the approach is to compute the strongly connected components (SCCs) of a given attack-graph and use those to generate an abstracted version of the attack-graph, namely, the tree over its SCCs. A subgraph of a directed graph, also called a component, is strongly connected if there is a directed path from any vertex of the component to every other vertex of the component, and where all vertices along the path are within the component. The next step is to employ a backward search over the abstracted attack-graph (a tree over the SCCs), one hop at a step, starting from its terminal node, to iteratively find the set of nodes that can reach the terminal node in an increasing number of steps, and identify the labels of their outgoing edges (each of which form a cut). Finally, the cut can be identified with a minimal number of labels, which is the SCCiMLC.

The SCCiMLC algorithm efficiency can be compared against an exact and an approximation algorithm. For the former, the exact MLC algorithm works only for disjoint undirected graph with label frequency of at most two, to the general labeled graphs. This exact MLC-algorithm searches over the source-to-terminal paths (s-t paths in short). The MLC-algorithm starts by selecting an s-t path and picks the labels included in the path. New s-t paths, whose all labels are not yet among the picked labels, are selected iteratively and those new labels of the path are added to the selected labels, until an MLC results. In addition to this exact algorithm, the SCCiMLC algorithm compares favorably to any state-of-art approximation algorithm, which generally propose only to compute an approximation to an MLC by optimizing over the minimum 0/1-polytope corresponding to an "approximate" hitting set, such as the one disclosed by Dutta et al., supra.

It is a primary object, feature, and/or advantage of the present invention to improve on or overcome the deficiencies in the art.

It is a further object, feature, and/or advantage of the present invention to enhance cybersecurity in digital control systems, including SCADA systems and ICS. For example, more accurate identification of networked devices in these systems can be achieved by improving upon how computerized system devices are digitally "fingerprinted." More particularly, enhanced security in SCADA systems and ICS can (a) automatically identify and store information to discriminate between individual networked devices of a SCADA or ICS system; (b) automatically scan the identified individual devices for security vulnerabilities; (c) automatically scan the SCADA or ICS system for global vulnerabilities; and/or (d) automatically generate a global vulnerability resolution based on steps/features (a)-(c).

In one specific example, a C-program based implementation of A2G2V interfaces with AGREE (for AADL and Annex based modeling and its Lustre translation), iteratively with JKind (for generation of all acyclic counterexamples), and further integration with Graphviz for visualization of the set of all attack sequences in a graph form.

In another specific example, an exact MLC algorithm can be employed. Comparisons can be made amongst the SCCiMLC algorithm performance, the generalized exact algorithm, and a state-of-art approximation algorithm. The SCCiMLC algorithm has the same accuracy as that of the exact algorithm, while the same speed as that of the approximation algorithm, which is greater than sixty-five times faster than the exact algorithm.

It is still yet a further object, feature, and/or advantage of the present invention to describe with architecture description language(s): digitalized aspects of control systems, networked devices in such control systems, the connectivity of said networked devices, and device-level atomic attacks that can threaten operation of or otherwise affect said control systems.

It is still yet a further object, feature, and/or advantage of the present invention to discriminate between them when accessing vulnerabilities, including both fingerprinting devices and discriminating placement of the devices in system control hierarchy.

It is still yet a further object, feature, and/or advantage of the present invention to improve generating a vulnerabilities resolution, such as through the analysis of said attack-graphs and/or identifying the minimal critical atomic attacks that should be prevented in order to secure the control system. An approach can be employed that identifies label-cuts within an attack-graph that, when blocked, renders the system secure. The identification of a minimum label-cut is in general NP-complete, and so to deal with this computational complexity, a linear complexity approximation utilizing strongly-connected-components (SCCs) that identifies a cut possessing a minimum number of labels and representing a critical-attacks set.

It is still yet a further object, feature, and/or advantage of the present invention to provide a model-based automated attack graph generator by way of automated generation of all acyclic counterexamples of a model, such as through relaxing the specification with the encoding of the earlier counterexamples so distinct counterexamples are found in each iteration.

Solutions for the technical problems discussed herein can be used for a wide variety of applications. For example, the systems and methods described herein are adaptable to a wide variety of control systems and a wide variety of communication protocols. In greater particularity, the control system can, in a non-limiting example, comprise a SCADA network for a water treatment cyber-physical system.

It can be beneficial that the means for providing security to control systems be safe, cost effective, efficient, and effective at addressing cybersecurity. For example, security administrators should be enabled to establish appropriate security measurements to secure their control systems within the practical considerations affecting time and cost. Additionally, general security properties should be supported and not just those represented as reachability of certain unsafe states.

Embodiments implemented in accordance with the principles of the present invention can comprise a distinct aesthetic appearance. Ornamental aspects included in such embodiment(s) can help capture a consumer's attention and/or identify a source of origin of a product being sold. Said ornamental aspects will not impede functionality of the present invention.

Methods can be practiced which facilitate use, manufacture, assembly, maintenance, and repair of software applications and systems for control systems that are connected to non-isolated networks which accomplish some or all of the previously stated objectives.

The aforementioned methods and systems can be embodied within computerized devices which accomplish some or all of the previously stated objectives, in addition to improving the overall performance of said computerized devices. For example, computerized devices of sufficient security will be less susceptible to attackers and will thus experience less downtime and/or can slowed and/or compromised operations.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIG. 20 shows an infinite state model checker reported counterexample for the path of the attack-graph of FIG. 19, how the A2G2V algorithm encodes the infinite state model checker output, and how the A2G2V disjuncts the infinite state model checker output with the security property within a parallel distributed file system file automatically.

An artisan of ordinary skill need not view, within isolated figure(s), the near infinite number of distinct permutations of features described in the following detailed description to facilitate an understanding of the present invention.

DETAILED DESCRIPTION OF THE DISCLOSURE

The present invention is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
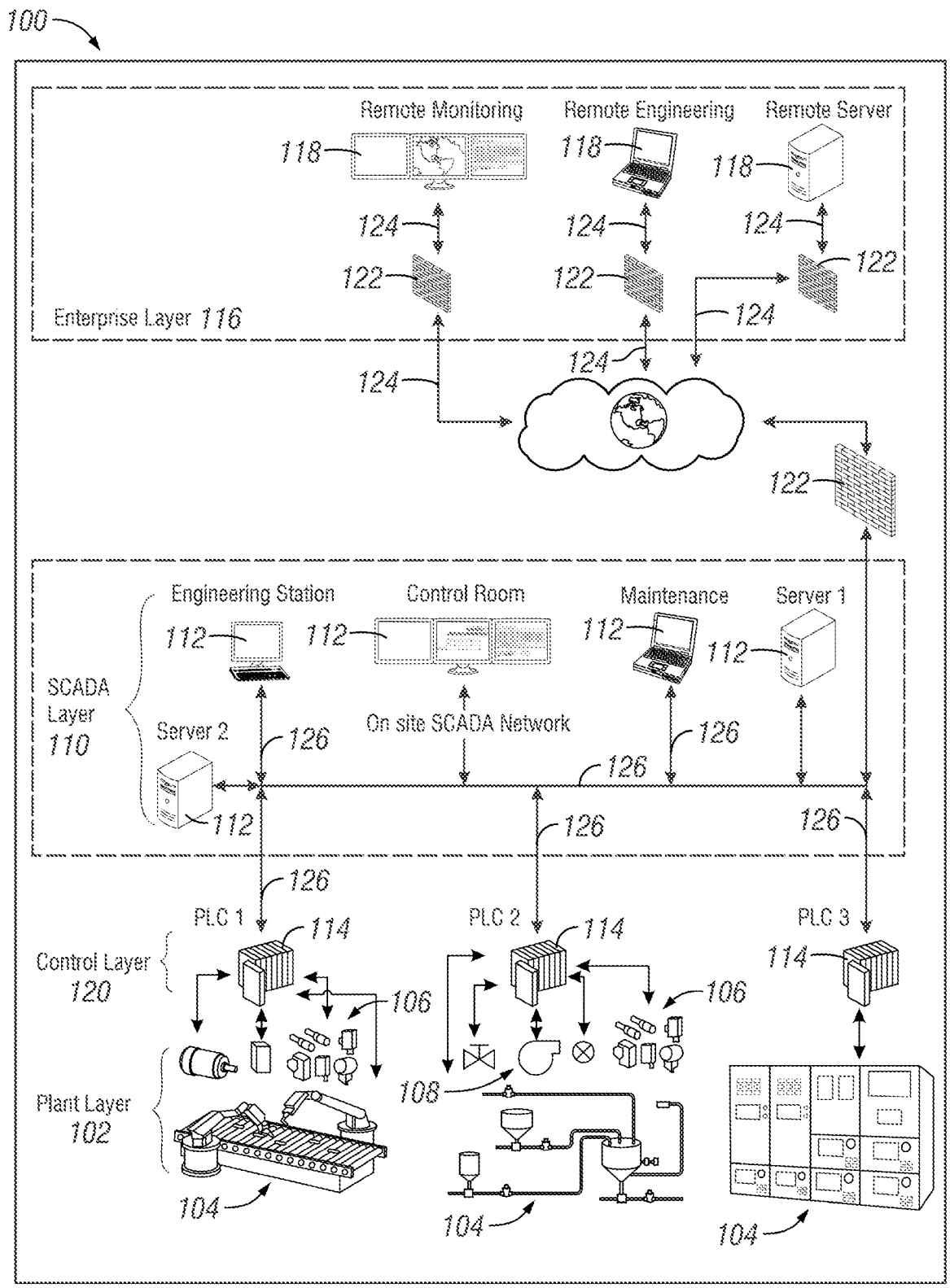
FIG. 1 shows a typical SCADA system/ICS network with at least enterprise, SCADA, and plant layers.

FIG. 1 shows a SCADA system/ICS 100 network. Such a network can be divided into three+ layers: (i) the plant layer 102 that comprises physical components such as machines 104, sensors 106, and actuators 108; (ii) the SCADA layer 110 that contains on-site supervisory devices and/or systems 112 and programmable logic controllers (PLC) 114; and (iii) the enterprise layer 116 that represents remote access devices 118. In some embodiments, the PLCs 114 can alternatively be included in the plant layer 102 or can be classified in a separate, fourth control layer 120.

Over the past few years, SCADA systems/ICS 100 have been subjected to an increasing number of major cyber-attacks, including: Stuxnet, Shamoon, Dragonfly, and Night Dragon. Stuxnet, for example, was designed to compromise PLCs 114 by modifying the behavior of centrifuges used in the enrichment of uranium. Stuxnet would first auto-execute itself on a USB drive, then determine whether the target was running a Siemens PLC. If so, Stuxnet modified the PLC control files and played a recorded measurement in a loop to avoid detection. Shamoon, designed to erase computer hard drives, targeted energy companies in the Middle East. Shamoon first created a system file to execute itself remotely, then collected files and overwrote them either with a JPEG image or 192 kilobyte (kB) blocks of random data. Finally, it reported back to a command and control server. Dragonfly and Night Dragon were intended to target energy suppliers and industrial processes to collect sensitive information. Such nefarious efforts have made it clear that SCADA systems/ICS 100 need enhanced cybersecurity.

Enhancement of SCADA systems/ICS 100 security can be achieved through improvement in three main areas: (1) access control and encryption to prevent unauthorized access to system resources; (2) vulnerability assessment and resolution for identifying security vulnerabilities and mitigate them before an actual attack occurs; and (3) intrusion detection and reconfiguration that continually monitors system activities to detect suspicious behaviors and reorganize the system if an attack is detected. Both access control and vulnerability assessment must be performed during security system design of an SCADA system/ICS 100 before an actual attack occurs, while intrusion detection is an online monitoring activity.

Since security problems in SCADA systems/ICS 100 originate with the connection to the internet and cloud computing, a reader may assume that an information technology (IT) security solution is the only thing required to secure SCADA systems/ICS 100. The truth is, while IT security may resolve some aspects of a security problem, IT security usually will not be able to fully secure SCADA systems/ICS 100 due to differences between SCADA systems/ICS 100 and IT systems.

Security goals of IT systems include confidentiality, integrity, and availability. SCADA systems/ICS 100 security goals can be prioritized based upon application specific needs. For example, in a situation where a major disaster could happen if a system component such as a controller becomes unavailable, possibly leading to serious injury or damage to the environment, SCADA systems/ICS 100 security could prioritize continuous availability of all system components. In some embodiments, the SCADA system/ICS 100 will eliminate the need and/or be completely free from software patching and frequent updates, like those updates used in IT. For example, upgrading an SCADA system/ICS 100 requires a long planning time. Moreover, suspending operation of an industrial computer on a regular basis to install new security patches that themselves may violate control logic is difficult. For example, a nuclear power plant shutdown can be avoided where the computers used to monitor the plant's chemical and diagnostic data are not required to occasionally reboot and/or update software. Were updates and/or reboots required, there is risk the data on the SCADA control system could be reset when the computer reboots and the resulting lack of data could make the safety systems believe there was a drop in level in the water reservoirs that cool the plant's radioactive nuclear fuel rods.

Different layers in SCADA systems/ICS 100 can experience different types of attacks and security solutions, since the communication protocols and the layers' functions are usually not the same as those of IT.

At the enterprise layer 116, the industrial firewall 122 is considered the prime security protection entity. The enterprise layer 116 uses transmission control protocol/internet protocol (TCP/IP) 124, so attacks occurring in the enterprise layer 116 are the same as those in the IT domain, even though some security details might be different. Firewalls 122 usually define zones using rules to restrict accessibility to ports. Industrial firewalls 122 are able to block all inbound network traffic except that explicitly required by operations.

The SCADA/ICS layer 110 is different from that for IT where communication protocols 126 such as PROFINET and POWERLINK are based on industrial Ethernet. The functions of the SCADA/ICS layer 110 are configuring control system parameters and monitoring the overall health of control systems, so security at the SCADA/ICS layer 110 will not be achieved by just applying IT security solutions. Security should instead be implemented to be consistent with the application characteristics. For example, an active protection line of defense can be implemented to control what a user or a device 112 can do and what programs can be executed.

The third+ depicted layers 102, 120 (in some embodiments), includes numerous types of communication protocols 126, like PROFIBUS, controller area network (CAN), RS485, and industrial Ethernet. Since the plant/physical layer 102 is directly connected to the controllers 114, the control layer 120 directly affects the plant/physical layer 102, and feedback from the plant/physical layer 102 affects controller decisions. Security measures must thus have strong adaptability to ensure a plant's ability to continue operating safely even when an attack occurs. Finally, consider the plant/physical layer 102, where security issues can exist due to either direct or indirect attacks. A direct attack is one that happens by physical contact, while an indirect attack is one that can only be launched from the control layer 120 because other layers 110, 116 have no direct access.

Generally, while IT has developed a mature security technology and design principles such as authentication, access control, message integrity, and separation of privilege that may help guard SCADA system/ICS 100 against cyber-attacks, IT researchers have sometimes not considered how attacks affect estimation and control algorithms and how they also can affect the physical world. Studying SCADA/ICS security by itself as a research problem can produce a better understanding of the consequences of an attack on a SCADA system/ICS 100. The present invention thus includes novel attack-detection algorithms to fit into the SCADA/ICS domain and new attack-resilient algorithms and architectures more suited to SCADA/ICS network 100 security.

In summary, the major differences between traditional IT security and SCADA/ICS security are: (i) physical domain dynamics (such as sensor 106/actuator 108/plant behaviors) can be monitored and manipulated to bring down the system: a problem unique to SCADA systems/ICS, because IT systems have no physical domain dynamics; availability is crucial, because loss of availability has greater consequence in SCADA systems/ICS than in typical IT systems, so the burden of ensuring security and resiliency is higher, even though it is also a common concern with IT systems; (ii) due to continuous dynamics, "patching" or "reconfiguration" can be a lot trickier and must be more precisely described, e.g., when one switches a control policy, replaces/adds sensors/actuators, etc., the switch might destabilize the underlying continuous dynamics, so switching from one equilibrium condition to a subsequent equilibrium condition must be navigated carefully while maintaining security; and (iii) from the time of their inception, SCADA systems/ICS have been developed independently of IT systems, so except for the enterprise layer 116, SCADA/ICS systems have evolved their own proprietary protocols 126 such as PROFINET, PROFIBUS, CAN, industrial Ethernet, etc., with their own specialized set of vulnerabilities and fixes, making their security concerns different from the traditional IT systems.

Figure 2:
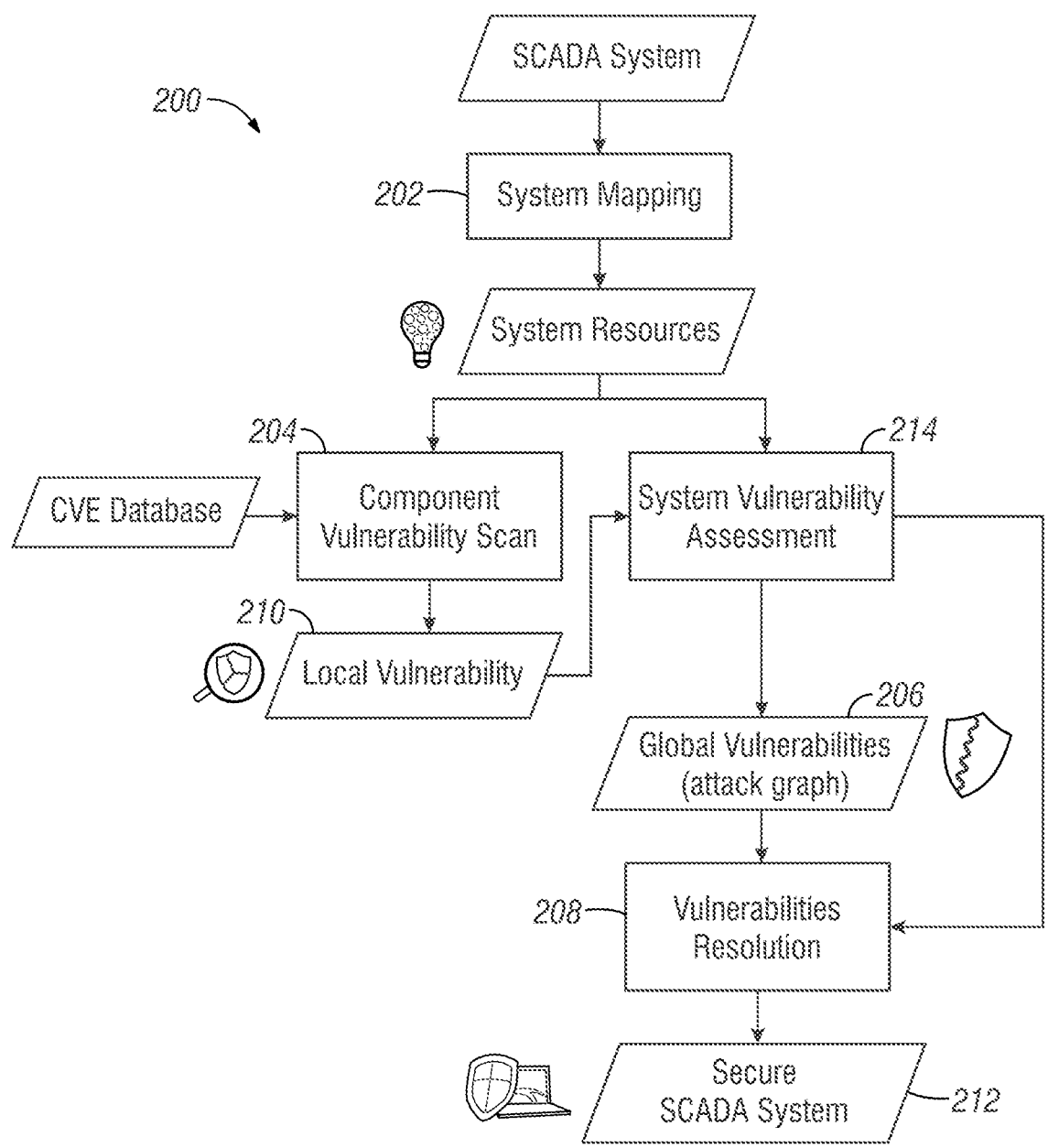
FIG. 2 diagrams a framework for an improved SCADA system, according to some aspects of the present disclosure.

FIG. 2 shows a block diagram of a SCADA/ICS security enhancement framework 200 as a comprehensive solution that covers all aspects of vulnerability assessment. The framework 200 analyzes SCADA systems/ICS 100, discovers vulnerabilities, and introduces resolutions for said vulnerabilities, which enhances the security of the system. The solution consists of several building blocks: system component recognition 202, a component vulnerability scan 204, a global vulnerability assessment 206, and vulnerabilities resolution 208.

Because of the way SCADA systems/ICS 100 are designed, identification and/or properties of some legacy systems, SCADA/ICS network resources within the systems have not always been fully known. Such unknown resources include, but are not limited to, devices 112, 118, connectivity, protocols 124, 126, data, access controls, trust relations. For example, a reserved IP address may be known but not the physical component to which it is connected. When there is an attempt to connect existing systems to the internet and to cloud computing, knowledge of SCADA/ICS network resources is very difficult to achieve practically, because that would require going through all documentation and connections.

During system component recognition 202, ANDVI approach can thus be used to identify the unknown devices' types, manufacturers, and models. Specific algorithm(s), e.g., Algorithm 1 infra, use the communication-patterns of SCADA/ICS devices 112 to recognize the control hierarchy levels of the devices. In conjunction, certain distinguishable features in the communication-packets can be used to recognize the device manufacturer, and model. This hybrid approach can be implemented in an interpreted, high-level and general-purpose programming language, such as Python.

Additionally, a data communications protocol (e.g., Modbus)-data analysis based passive fingerprinting approach can identify SCADA/ICS unknown devices, allow a smaller number of data collection points, and further enhances the applicability of the solution to real-world systems, such as water treatment systems.

Securing cyber-physical systems (CPS), and Internet of things (IoT) systems can be accomplished through identification of how interdependence among existing atomic vulnerabilities may be exploited by an adversary to stitch together an attack that can compromise the system. Therefore, accurate attack-graphs play a significant role in systems security during global vulnerability assessments 206. A manual construction of the attack-graphs is tedious and error-prone.

Attack-graphs based global vulnerabilities scanning and assessment can take effect after and can be based upon employment of the above algorithm(s), e.g., Algorithm 1 infra, as it can be beneficial to first recognize the control hierarchy based upon communication-packet distinguishable features and can vary according to needs or desires.

A model-checking based A2G2V is presented herein. The specific A2G2V algorithm, e.g., Algorithm 2 infra, uses existing model-checking tools, an architecture description tool, and specialized code to generate an attack-graph that enumerates the set of all possible sequences in which atomic-level vulnerabilities can be exploited to compromise system security. The architecture description tool captures a formal representation of the networked system, its atomic vulnerabilities, their pre- and post-conditions, and security property of interest. A model-checker is employed to automatically identify an attack sequence in form of a counterexample. The code is integrated as the model-checker parses counterexamples, encodes the counterexamples for specification relaxation, and iterates until all attack sequences are revealed. Finally, a visualization tool has also been incorporated with A2G2V to generate a graphical representation of the generated attack-graph. The results are illustrated through application to computer as well as control (SCADA) networks.

A vulnerability resolution can take effect after and can be based upon employment of one or more of the aforementioned algorithm(s), e.g. Algorithms 1 or 2 infra, as it can be beneficial to first recognize the control hierarchy based upon communication-packet distinguishable features and can vary according to needs or desires and/or first generate an attack-graph that enumerates the set of all possible sequences in which atomic-level vulnerabilities can be exploited to compromise system security. The vulnerability(ies) resolution 208 uses attack-graphs that have been presented to represent complex attacks scenarios that exploit interdependence among the atomic component/device level vulnerabilities 210 to stitch together the attack-paths that might compromise a security property at the system-level. While such analysis of attack scenarios enables security administrators to establish appropriate security measurements for a secure SCADA system 212, practical considerations on time and cost can pose limit on their ability to address all system-level vulnerabilities at once. One approach for a system vulnerability assessment 214 discussed herein identifies label-cuts within an attack-graph to automatically identify a set of critical-attacks that, when blocked, renders the system secure 212. The identification of a minimal label-cut is in general NP-complete. In order to deal with this computational complexity, a linear complexity approximation, e.g., Algorithms 3-4 infra, utilizes the strongly-connected-components (SCCs) of the given attack graph to generate an abstracted version of the attack-graph, namely, a tree over the SCCs. The linear complexity approximation then uses an iterative backward search over this tree to identify set of backward reachable SCCs, along with their outgoing edges and their labels, to then identify a cut of the tree, possessing a minimum number of labels and representing a critical-attacks set.

Figure 3:
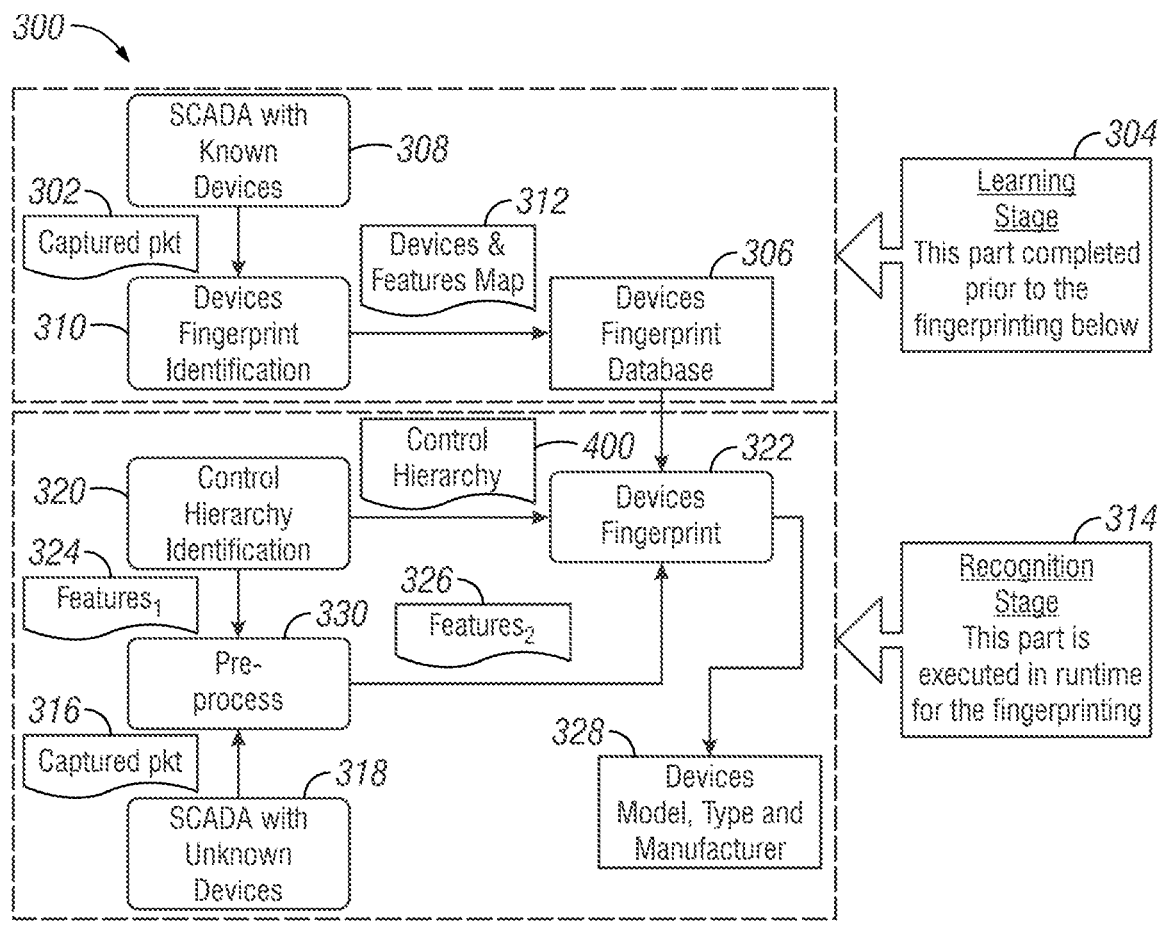
FIG. 3 depicts an architecture of the framework of FIG. 2 for device recognition in the SCADA system network, according to at least some aspects of the present disclosure.

FIG. 3 depicts an architecture of the hybrid approach 300 for device recognition in a SCADA system/ICS 100 network, according to an embodiment of the invention. The approach is based on a communications protocol such as TCP/IP passive fingerprinting where the communication packets are captured for analysis and device recognition. This is a two-stage process: the first stage is a learning stage 304 where a reference fingerprints database 306 is created from an SCADA system/ICS 100 containing a known set of devices 308, using the identified values of certain features 310 in the communication packets of the devices. Creating such a database 306 requires identifying in an identifying step 310 to map 312 the reliable distinguishable features in the captured TCP/IP packets 302 that can be used to generate a distinguishable fingerprint for each device. The second stage is a recognition stage 314 where packets 316 captured from a SCADA system 100 with unknown devices 318 are processed and passed into a two-step algorithm: a control hierarchy identification step 320 and a device fingerprinting step 322.

Figure 4:
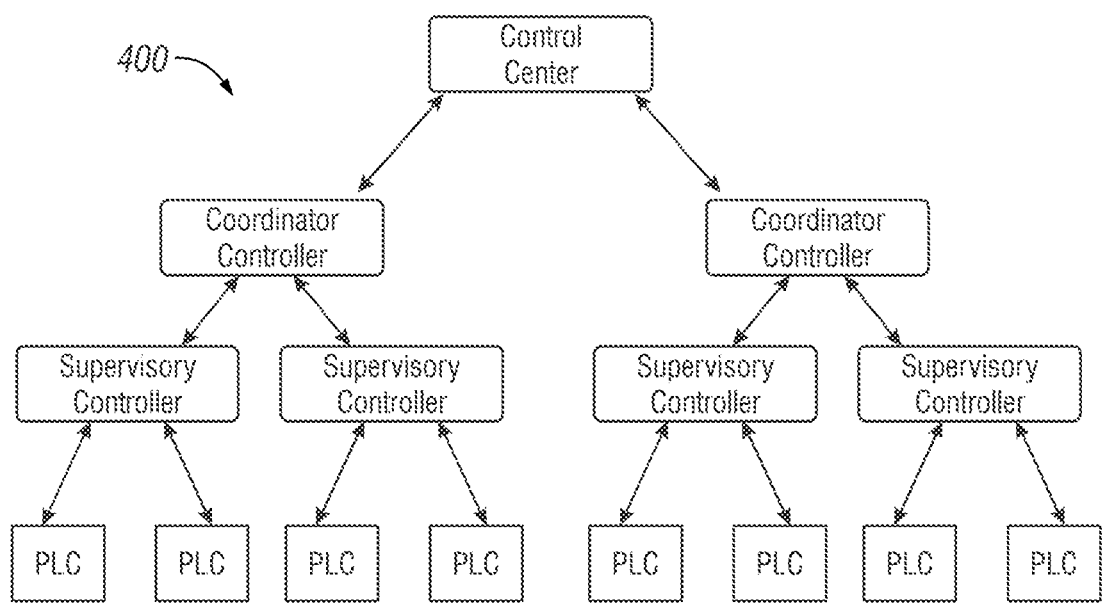
FIG. 4 shows a hierarchical view of the architecture of FIG. 3.

SCADA systems/ICS control hierarchy 400 follows the standard architecture shown in FIG. 4. The hierarchy 400 is imposed to prevent conflicts in the control commands, requiring each node in the system to communicate only with its direct parent, its immediate children, or with nodes at the same level. This characteristic can be used to identify the SCADA/ICS devices' level using a control hierarchy identification algorithm, such as Algorithm 1, infra. Knowing the device control hierarchy level 400 allows inference of the device type. For example, a local controller level can be a PLC, a plant supervisory controller level can be either HMI or SCADA station, and a production coordinator controller level and control center level can be SCADA stations.

The above step of control hierarchy level identification 320 is useful when SCADA system/ICS 100 devices 308, 318 are in the same system 100, are from the same vendors, and use same programmer protocols. In such cases, different types of SCADA systems/ICS devices 308, 318 have similar TCP/IP communication packet features 324, 326 making it challenging to distinguish devices based solely on communication packets. However, by first inferring their control hierarchy 400, a device type can be identified (e.g., PLC or HMI), and this together with the distinguishable features of the communications packets (the second step) then further pinpoints the device.

The packet processing in the recognition stage 314 is simply to extract the features 324, 326 from the TCP/IP packets 316 and store those into two matrices: Features$_1$ 324 and Features$_2$ 326. Features$_1$ 324 can have two columns for each packet 316 and the total number of rows equaling the number of packets captured. Column 1 can record the source of the packet 316 and column 2 records the destination. Features$_2$ 326 has 3 columns for each packet 316 captured, and again the total number of rows is the number of packets 316 captured. Each column records a distinguishable packet feature, described below. To be able to fully recognize all the devices 318, the captured packets 316 preferably span all the devices in the SCADA system/ICS network.

An important aspect in device recognition is to build a reference fingerprints database 306 by analyzing the captured packet 316 from a SCADA system/ICS network, generate a fingerprint, and compare said fingerprint with fingerprints of known devices 308 by identifying the values 502, 504, 506 of certain features 324, 326 in the communication packets 316 that are unique to the devices 318. To identify such distinguishable features 324, 326 in the captured network traffic, FIGS. 5 and 6 examine data generated from several different SCADA/ICS devices, including: Allen Bradley Logix 1765 PLC, Siemens S1200 PLC, Siemens S1500 PLC, Siemens S7 300 PLC, Siemens S7 400, and DirectLogic 205 PLC. TCP/IP packet features 324, 326 can include, but are not limited to: frame length, vendor MAC ID, TCP-segment length, IP identification numbers, total IP packet length, time to live (TTL), and tcp-window size. These seven features are plotted in FIG. 5. Among these seven, three features were found to be unique to a device. These three features are described in bit more detail next.

When a packet 316 is generated, the source of the packet specifies the duration a packet remains valid, called time-to-live, and denoted (TTL). The TTL values for the packets from the same source/model are always the same, and so serve as one distinguishing feature. Another feature that a packet source specifies is the packet ID, that it increases in the same fixed increments, and that increment amount is different for different source/model. Thirdly, each generated packet also specifies the source media access control (MAC) address, in which first four bytes form the vendor ID. The vendor ID in the MAC address can be used to identify the device manufacturer using the databases that enlist the devices' vendors and their MAC vendor IDs, such as the organizationally unique identifier(s) (OUI) Lookup Tool from Wireshark. Generally, vendors use more than one MAC vendor ID, specific to a factory or manufacturing time period. This can be used to further differentiate among the devices from the same vendor.

Figure 5:
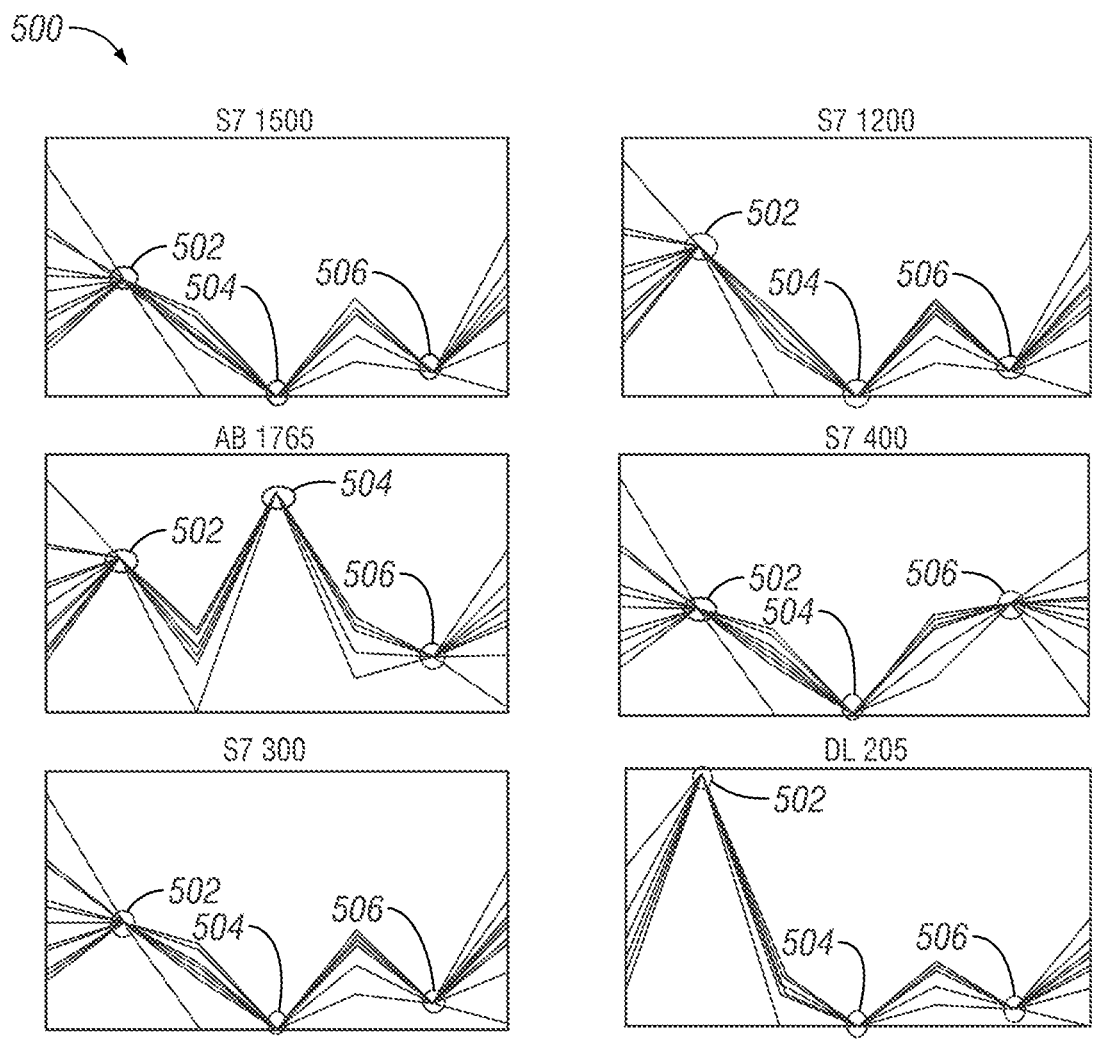
FIG. 5 plots analysis results of packet feature values for the different packets of different devices, where each diagram is for a single device, and in each diagram, the x-axis is discrete corresponding seven features: frame length, vendor MAC ID ($Vendor_{MAC}$), TCP-segment length, IP identification numbers, total IP packet length, time to live (TTL), and tcp-window size, and the y-axis is also discrete showing the values of the packet-features (encoded as numeric values), according to the device recognition framework of FIG. 3.

As shown in FIG. 5, a Siemens S1200 (by Siemens Numerical Control Ltd) versus S1500 (manufactured by Siemens AG); S1200 MAC vendor ID is 001C06 while S1500 MAC vendor ID is 001B1B.

The analysis results of packet feature values 502, 504, 506 for different packets 316, and of different devices, are plotted in FIG. 5, where each diagram is for a single device, and in each diagram, the x-axis is discrete corresponding to the seven features mentioned above, and the y-axis is also discrete showing the values of the packet-features (encoded as numeric values). For example, packets 316 from the device S7 1500 are plotted in the first diagram. It can be seen that several of the SCADA system/ICS packet features from a same device vary from packet-to-packet, except for the three distinguishable features mentioned above that are constant. These three features turn out to be adequate to differentiate among the six different PLCs shown in FIG. 5.

These three features are: time to live (TTL), the difference in the IP.IDs of two consecutive packets (denoted as, $IP.ID_{diff}$), and the vendor MAC ID ($Vendor_{MAC}$). Note given that TTL, $Vendor_{MAC}$, and $IP.ID_{diff}$ can take 255 (1 byte), 4.294×109 (4 bytes), and 65.535×103 (2 bytes), values respectively. Thus, using these 3 features, one can potentially distinguish a total of 255×(4.294×109)×(65.535×103)=7.176×1016 number of devices.

Table 1 summarizes the results from analysis of the communication packets and consolidating those into the 3 distinguishing features TTL, $IP.ID_{diff}$, and $Vendor_{MAC}$, that can be used for look up to identify the device manufacturer and model 328. This table reports the communications-pattern based reference database created during the learning stage of the approach for identifying different SCADA/ICS devices.

TABLE 1

SCADA/ICS Distinguishing Features Summary

| SCADA/ICS device | TTL | $IP.ID_{diff}$ | $Vendor_{MAC}$ |
|---|---|---|---|
| Logix 1765 PLC | 64 | 256 | 001d9c |
| Direct Logic 205 | 32 | 1 | 00E062 |
| S-1200 | 30 | 1 | 001C06 |
| S-1500 | 30 | 1 | 001B1B |
| S7-300 | 30 | 1 | 000e8c |
| S7-400 | 128 | 3 | 000e8c |

Figure 6:
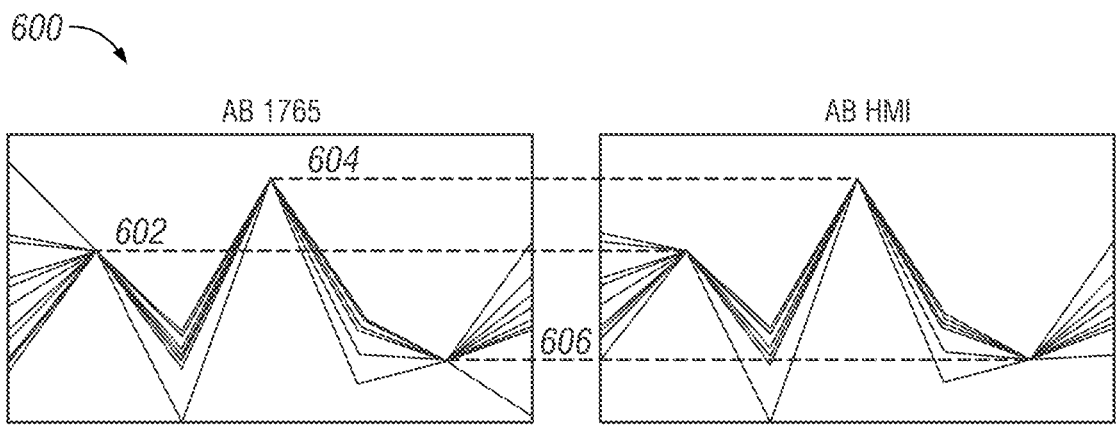
FIG. 6 pairs two exemplary, distinct devices that have a substantially identical set of TTL, the difference in the IP.IDs of two consecutive packets ($IP.ID_{diff}$), $Vendor_{MAC}$, according to the device recognition framework of FIG. 3.

Note while the above three packet features are constant across the packets from the same device, there can still be more than one device with identical set of three features 602, 604, 606. An example pair 600 is the Logix 1765 PLC versus the Allen Bradly HMI; the two devices are identical with respect to the aforementioned three TCP/IP features as shown in FIG. 6. However, such devices are not placed at the same control hierarchy 400, and so the extra information about the control hierarchy 400 is used to further pinpoint a device.

This stage 314 is used to recognize the unknown devices in a SCADA system by monitoring the network communications packets in the run-time, by first deciphering the control hierarchy, and next utilizing the packet features of Table 1 to identify the devices on the network.

To maintain a high level of reliability and safety, the SCADA system/ICS architecture and communication can be configured so as to follow and/or comply with the IEC 61131 and the IEC 62264 standards. Using such standardized control hierarchy 400 architecture as a basis, the SCADA system/ICS device's level can be identified as formulated in Algorithm 1 below.

Algorithm 1 Example of Control Hierarchy Identification Algorithm

1: Input: Set of packets
2: Output: sources S, control levels L, control level mapping C : S → L that maps each source s ∈ S to its control level C(s) ∈ L.
3: main
4: for each source s, add it to a set S, and also construct its destination $D_s$
5: compare $D_s$ for all s ∈ S
6: group sources with same destinations into groups $G_i$'s
7: $\forall_i : G_i \subseteq L_0$ if $\forall j : G_j \not\subset G_i$
8: $\forall_i, \forall_k \geq 0: G_i \subseteq L_{k+1}$ if $(\exists s \in L_k : Ds \subseteq G_i) \land (\not\exists 1 < k : G_i \subseteq L_l)$
9: Terminate when all s ∈ S are mapped to some level k ≥ 0

Algorithm 1 proceeds in bottom-up fashion, by identifying the bottom-most (also, called level-0 or $L_0$) devices of the control hierarchy, and once the devices of a level have been identified, the devices of a next level can be identified as the destinations of the former. To identify the level-0 devices, first the devices with identical destinations are grouped into a same group. Then the level-0 devices correspond to the members of those groups whose destinations are not larger than those of any other groups. Once the level-0 devices are recognized, finding the higher levels is easier: Given level-k devices for some k≥0, their set of destination devices, that do not belong to any lower levels, form the level-(k+1) devices. The algorithm terminates when all the devices are already accounted for in one of the levels.

Figure 7:
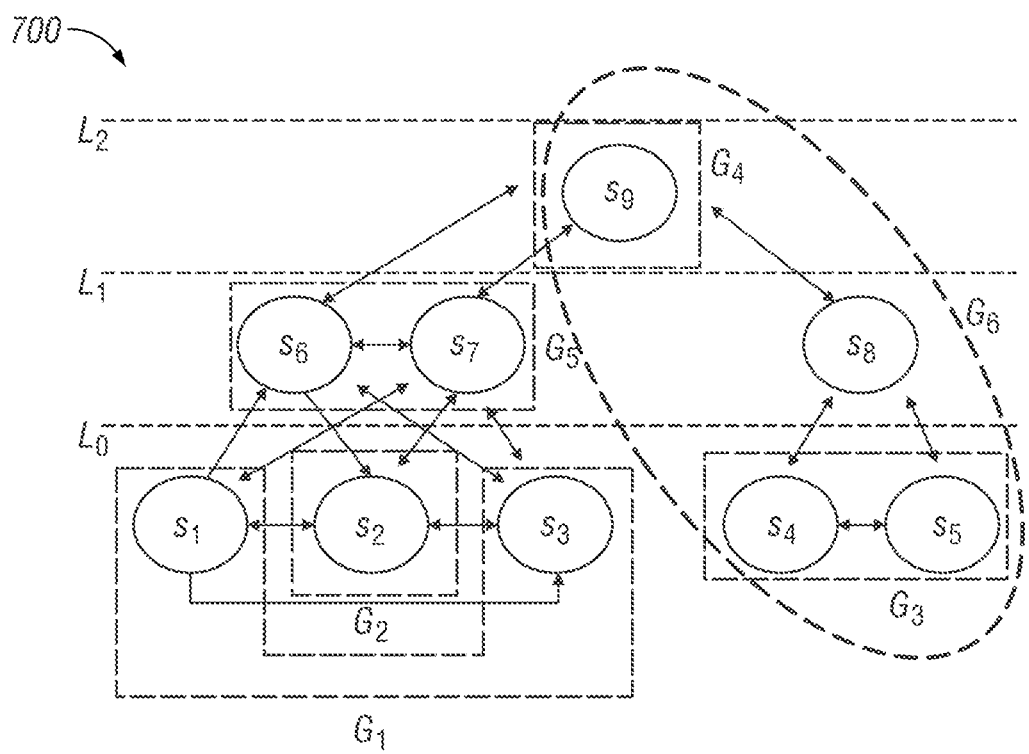
FIG. 7 illustrates a control hierarchy identification example, according to the device recognition framework of FIG. 3.

Here an example 700 in FIG. 7 is used as a running example to illustrate these ideas. Initially, using the Features$_1$ data, that contains the list of all source-destination pairs, it is computed for each source node s, the corresponding set of destination devices $D_s$. In FIG. 7 for example, $D_s1=\{s_1, s_2, s_3, s_6, s_7\}$.

Next, identified are the sources that are at the bottom of the control hierarchy. For this, the sources with identical destinations are grouped together into their own single groups. Then the sources in those groups are in the bottom of control hierarchy if their destinations are no larger than those of any other groups. For example, since $D_s1=D_s3$, grouped are $G_1=\{s_1, s_3\}$. Similarly, $G_2=\{s_2\}$, $G_3=\{s_4, s_5\}$, $G_4=\{s_9\}$, etc. Next, the groups whose destinations are not larger than any of the other groups' destinations are identified. So, for example, the destinations of $G_1$ and $G_2$ are smaller than those of group $G_5=\{s_6, s_7\}$ whose destinations are $D_s6=D_s7=\{s_1, s_2, s_3, s_6, s_7, s_9\}$, whereas the destinations of $G_3$ includes $s_8$ that is not a destination for $G_1$ or $G_2$, etc. Similarly, the destination of $G_3$ namely, $\{s_4, s_5, s_8\}$, are smaller than the destination of $G_6$, namely $\{s_4, s_5, s_8, s_9\}$, etc. With such grouping and destination comparison, the sources in $G_1$, $G_2$, $G_3$, are identified to be the lowest level groups in the control hierarchy, and this is recorded in $L_0 = G_1 \cup G_2 \cup G_3$.

Once the level-k sources in $L_k$ get recorded for any k≥0, the level (k+1) sources in $L_{k+1}$ are identified as the union of those groups which contain a destination of a level-k source, and which do not belong to the level-k or lower. So, for example, $L_1 = G_5 \cup G_6$, and next $L_2 = G_4$. The above steps are formalized in the following algorithm.

Once the control hierarchy levels have been identified at 320 in FIG. 3 using Algorithm 1, the TCP/IP packet features 326 (TTL, $IP.ID_{diff}$, $Vendor_{MAC}$) stored in the Features$_2$ dataset are compared to the reference database 306 to identify the device manufacturer and model.

It should be noted that, because of the hierarchical nature of the SCADA system 100, and since packets 316 generated by the SCADA devices 318 do not travel beyond their parent node level, the data collection needs to be done between the parent/child hierarchy level of each device, to ensure the inclusion of data from all system devices. This also ensures that the data fingerprints considered for device identification, namely, TTL, IP. $ID_{diff}$, $Vendor_{MAC}$, do not undergo alteration in the network.

Figure 8:
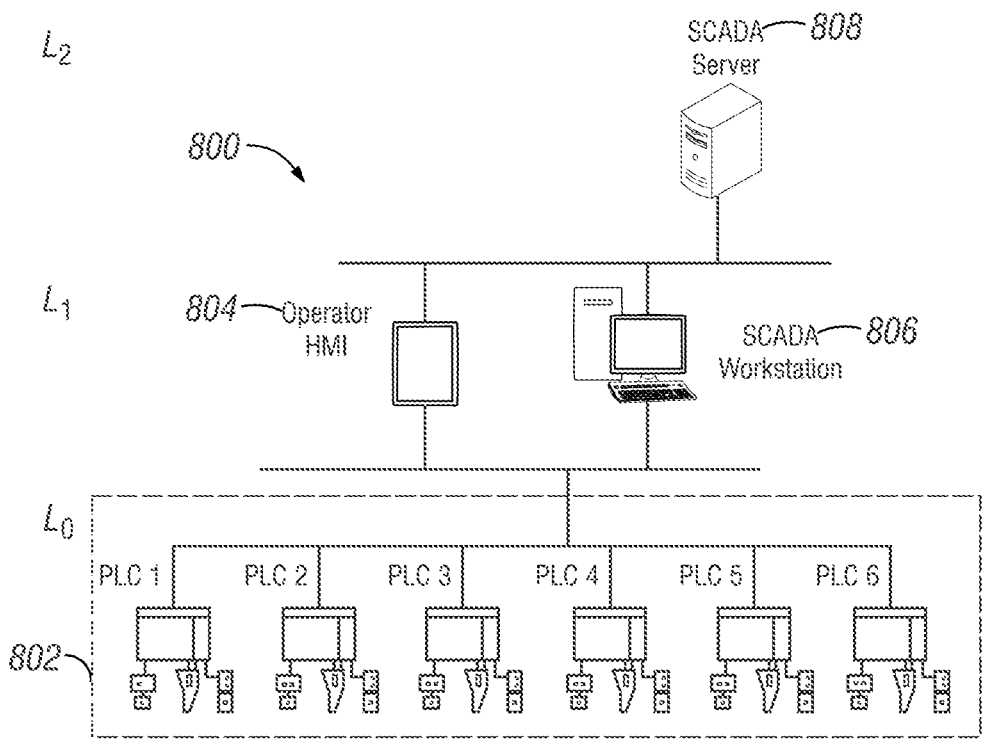
FIG. 8 depicts networked devices and a control hierarchy for a water treatment SCADA system, according to the device recognition framework of FIG. 3.

To demonstrate the applicability of Algorithm 1 to a real-world cyber-physical system (CPS), a water treatment system 800 is shown in FIG. 8. The system 800 is based on a fully-functional water treatment CPS testbed in a laboratory. The system consists of programmable logic controllers (PLCs) 802, human machine interfaces (HMIs) 804, a SCADA workstation 806, and a SCADA server 808. The six PLCs control the six stages of water treatment, while the HMI and the SCADA station monitor and coordinate between the PLCs. The SCADA station reports to and coordinates with the SCADA server. These devices and their control hierarchy are shown in FIG. 8.

In this example, the Secure Water Treatment testbed dataset comprises of data from seven days of continuous normal operation. For the device recognition purposes, only one full control cycle of data is needed, and so for purposes the network traffic for four hours of normal operation was sufficient and was analyzed. The information in ".pcap" captured files were extracted and stored in CSV files using an open-source packet analyzer, such as Tshark.

According to a non-limiting example, a preprocessing step 330 (FIG. 3) was initially applied to the collected packets 316 to obtain the Features$_1$ and Features$_2$ matrices, 324, 326. Algorithm 1 was started by enumerating the set of sources S and the destinations $D_s$ for each source s∈S. Nine members were found as sources. Next, s=192.168.1.10 was randomly selected, and its destination set was compared to the destinations of other devices. As a result, 192.168.1.10, 192.168.1.20, 192.168.1.30, 192.168.1.40, 192.168.1.50, and 192.168.1.60 were grouped in $G_1$. Next, s=192.168.1.100 was selected, and comparing its destinations to those of the other remaining devices resulted in $G_2$={192.168.1.200, 192.168.100}. Finally, s=192.168.1.201 was selected; it being the last source in S, it was finalized that $G_3$={192.168.1.201}. $G_1$ is the only group that does not contain the other groups as a subset, so $L_0 = G_1$. $G_2$ contains the destination for $G_1$ devices, so $L_1 = G_2$. Similarly, $G_3$ contains the destinations for $G_2$ devices, and so $L_2 = G_3$. At this point all sources in S have been mapped to a control level, so the algorithm terminated. The result from Python encoding of Algorithm 1 is shown below:

```
L0 groups
g1={'192.168.1.10', '192.168.1.20', '192.168.1.30',
'192.168.1.40', '192.168.1.50', '192.168.1.60'}
L0 = g1
L1+ groups
L1 = {'192.168.1.100', '192.168.1.200'}
L2 = {'192.168.1.201'}
```

Based on the control hierarchy identification outcomes, the level-0 (bottom level) devices, 192.168.1.10, 192.168.1.20, 192.168.1.30, 192.168.1.40, 192.168.1.50, and 192.168.1.60 can be identified to be PLCs 802. The level-1 (mid-level) devices, 192.168.1.100 and 192.168.1.201 can either be a SCADA station 806 or an HMI device 804. Finally, the level-2 (top level) device, 192.168.1.200 is identified as a SCADA station 806. Subsequently, the vendor ID was used to distinguish between the HMI 804 and the SCADA station 806: the vendor ID for both 192.168.1.201 and 192.168.1.200 were Microsoft, while the vendor ID for 192.168.1.100 was Rockwell Automation. Based on this, 192.168.1.201 and 192.168.1.200 were identified to be SCADA servers 808, while 192.168.1.100 was identified as an Allen Bradly HMI 804. The device fingerprinting step constructed a fingerprint for each PLC 802 in the form of Feature$_2$ matrix 326, which was then compared against Table 1 to identify their manufacturer and model 328 (FIG. 3). This step then revealed that the PLCs 802 are the Allen Bradly Logix 1765 PLC. A log of these results can be seen below:

```
---192.168.1.10 is Allen Bradly Logix 1765 PLC---
---192.168.1.20 is Allen Bradly Logix 1765 PLC---
---192.168.1.30 is Allen Bradly Logix 1765 PLC---
---192.168.1.40 is Allen Bradly Logix 1765 PLC---
---192.168.1.50 is Allen Bradly Logix 1765 PLC---
---192.168.1.60 is Allen Bradly Logix 1765 PLC---
----------192.168.1.100 is Allen Bradly HMI----------
----------192.168.1.200 is SCADA Station----------
----------192.168.1.201 is SCADA Station----------
```

The experimental results from Algorithm 1 show that it can successfully identify the SCADA system devices type, manufacturer, and model 328. In addition, its ability to map SCADA devices to their levels in a control hierarchy 400 helps improve the passive fingerprinting accuracy, since this limits the search for an unknown device to only those devices that are eligible to that level of hierarchy 400.

The computational complexity of the algorithm is determined by the number of nodes in the network (N) and has a worst-case running time of $O(N^3)$. Which is the maximum time required to construct the system control hierarchy (list all nodes (N), identifying their destination list $D_s$, and comparing $D_s$ for all nodes). On a standard computer, with a core i5/2.2 GHz/4 GB RAM running Windows 10, Algorithm 1 took approximately fifteen seconds to identify the devices for the above water treatment SCADA system.

Figure 9:
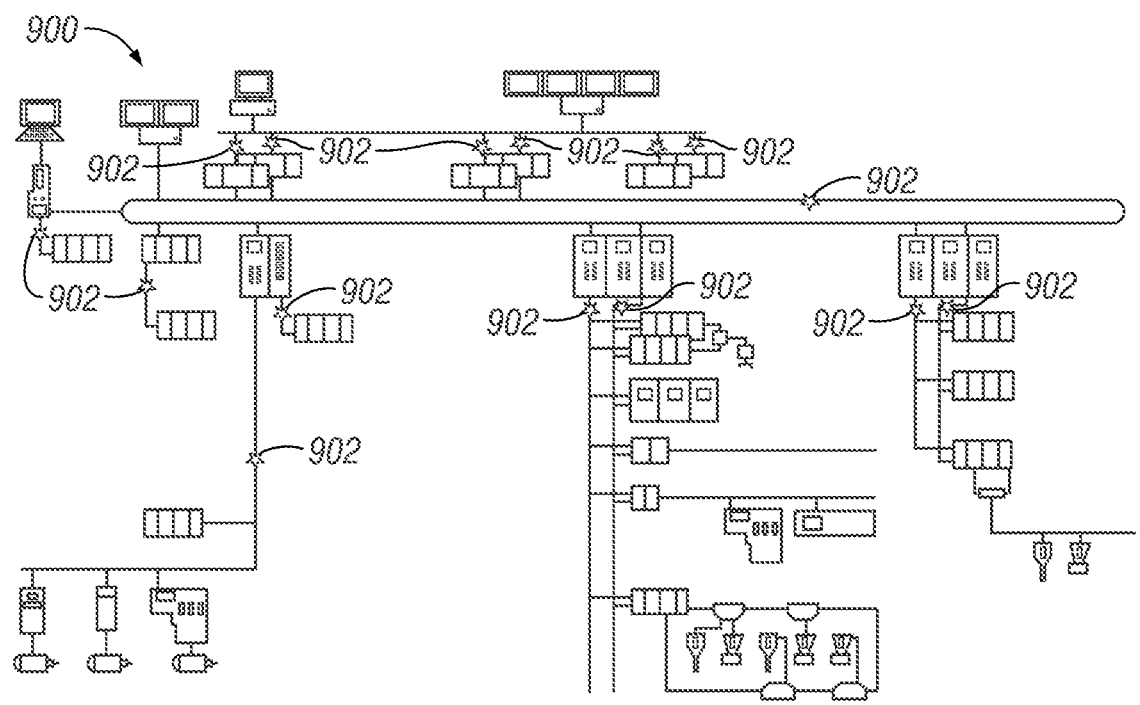
FIG. 9 shows a SCADA system network based on ring topology that does not require any routers, according to the device recognition framework of FIG. 3.
Figure 10:
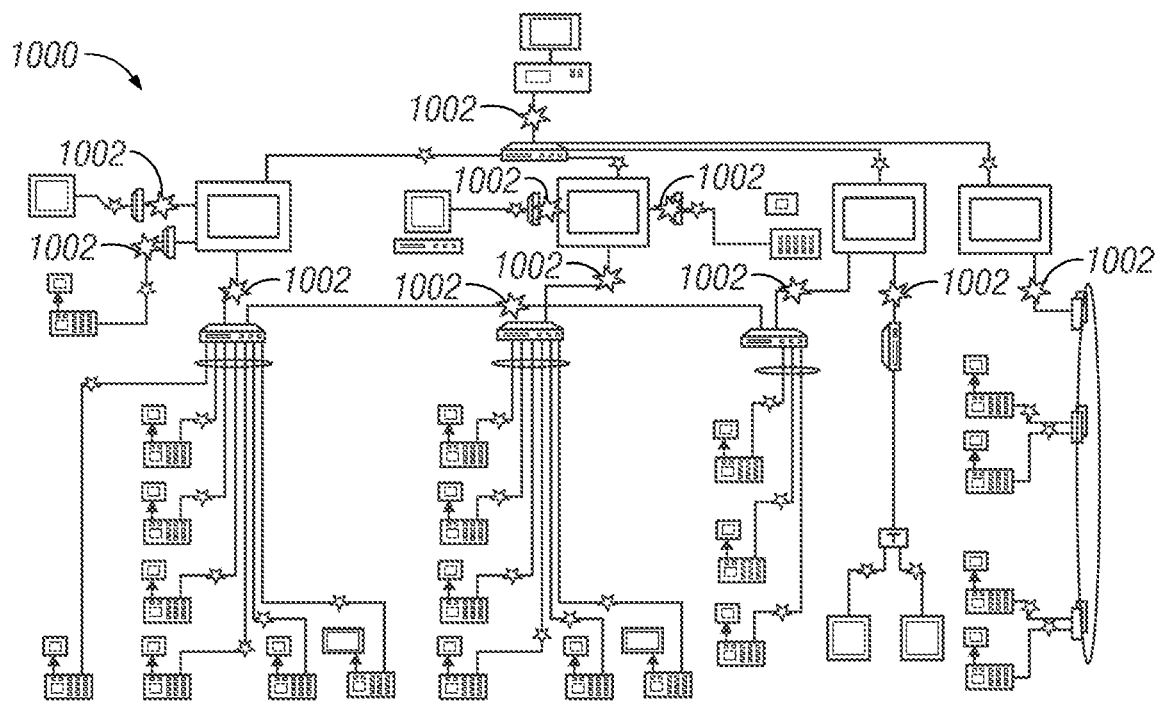
FIG. 10 shows a PLC based system that controls an animal food manufacturing factory, and uses routers, according to the device recognition framework of FIG. 3.

As noted earlier, since the packets generated by the SCADA devices do not travel beyond their parent node level, the data collection needs to be done between the parent/child hierarchy level of each device. To understand the implication of this fact, consider the two SCADA systems 900, 1000 of FIGS. 9 and 10. The one shown in FIG. 9 is a Siemens PLCs based system that controls a water treatment facility. Here the SCADA system network is based on ring topology that does not require any routers. FIG. 10 is a Mitsubishi PLCs based system that controls an animal food manufacturing factory and uses routers. Note both systems are existing working systems in use.

Examining the two systems reveals that the minimum number of data-collection points 902 needed in the ring topology to identify the system components (shown in FIG. 9) is much less than in a router-based system (total 15 vs. 31). Yet the latter type system (with routers) is more common being cheaper (ring topology requires extra connections). Motivated by this observation, a passive fingerprinting approach exploits the features of Modbus protocol, extensively used in SCADA systems/ICS networks for communication among its devices, and thereby minimizes the number of data collection points, by collecting data at the routers (rather than at the devices). In FIG. 10, the minimum number of data-collection points 1002 (FIG. 10) needed to identify the devices (total 31 as opposed to 11). The Modbus-data analysis based approach ensures that only the part of the data that is not affected by router actions is examined for device fingerprinting (and so data can be collected at routers as opposed to directly at devices).

Figure 11:
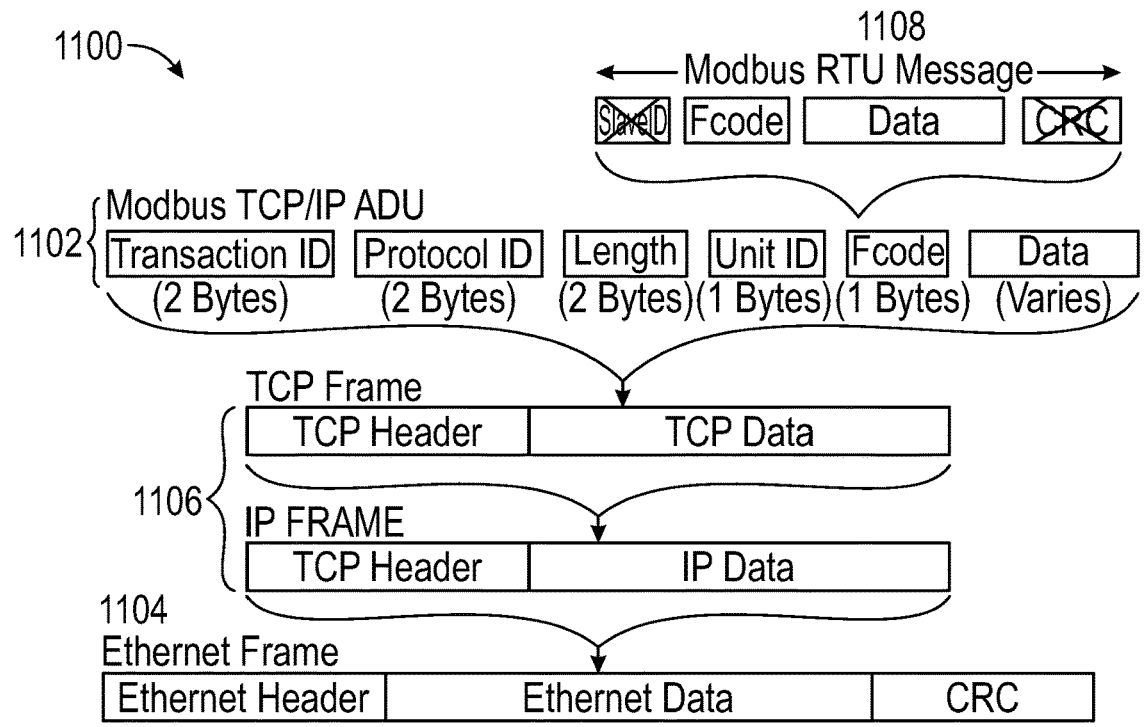
FIG. 11 demonstrates a Modbus message embedded within a TCP/IP message, according to the device recognition framework of FIG. 3.

With reference to FIG. 11, Modbus TCP/IP 1102 (also known as Modbus-TCP) is a Modbus RTU protocol operating on Ethernet 1104 with a TCP interface, i.e., the Modbus RTU message is transmitted with a TCP/IP wrapper 1106 and sent over a network (rather over serial lines). FIG. 11 demonstrates how a Modbus message 1108 is embedded within a TCP/IP message.

Knowledge of how the Modbus messages are organized helps in analyzing their content. For example, if the captured packet Modbus TCP IPADU=0001 0000 0006 11 03 006B 0003, then: Transaction ID=0001, Protocol ID=0000, Message Length=0006 (6 bytes to follow), Unit ID=11, Function Code=03, Unit ID=11, Data Address of the first register requested=006B, and total number of registers requested=0003. Such knowledge helps identify the aspects of the Modbus-data that are not altered by router actions, for the purposes of device fingerprinting.

Figure 12:
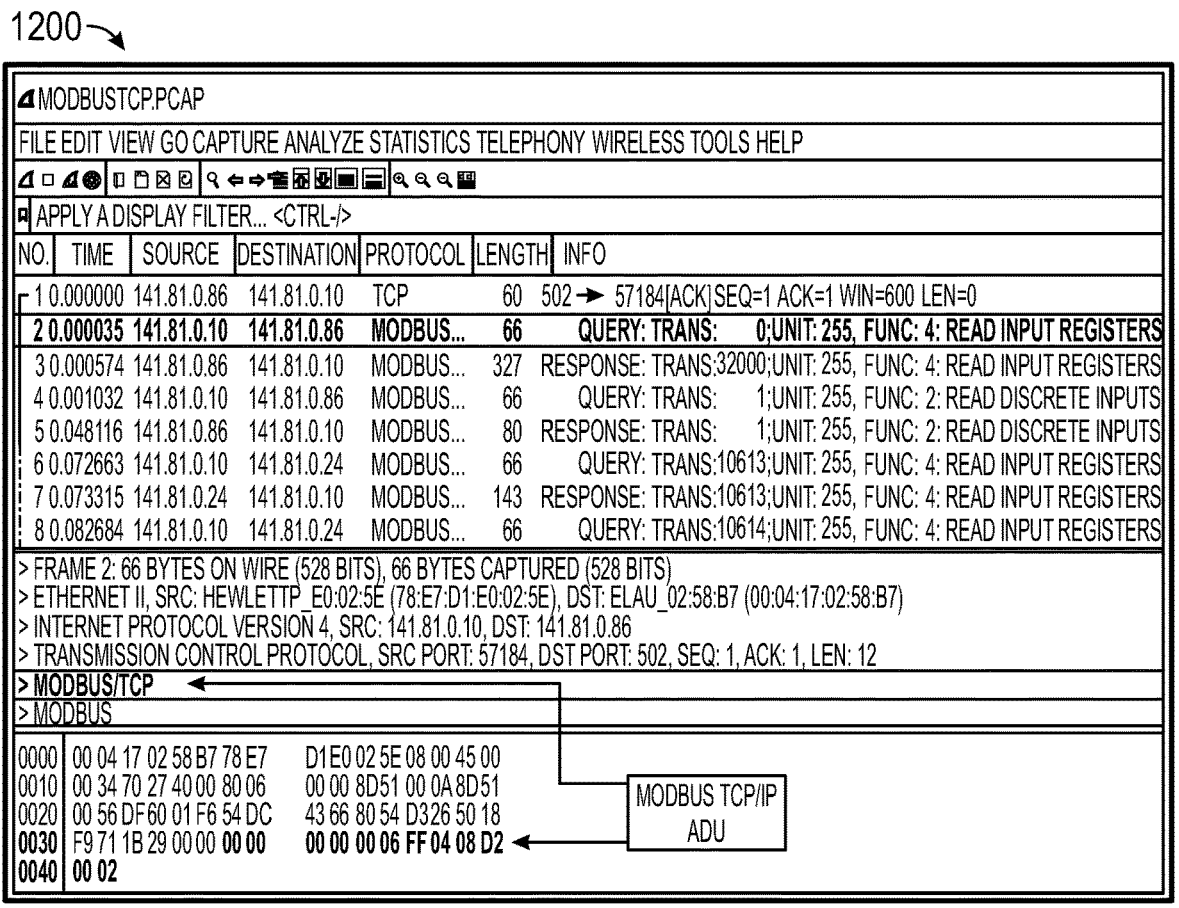
FIG. 12 captures a Modbus TCP/IP packet example, according to the device recognition framework of FIG. 3.

A first step is to extract the Modbus TCP IP ADU from a TCP/IP packet. Since it is known how the Modbus packet is embedded inside a TCP/IP packet, once a packet has been captured, say using Wireshark, the Modbus packet can be located and extracted. FIG. 12 shows a captured Modbus TCP/IP packet example 1200.

Following the Modbus-packet extraction, a next step is to identify the features withing it to be able to use towards device fingerprinting. With respect to the Modbus protocol, while the range of registers that the protocol can read from or write to is predefined in the protocol standards, upon studying and analyzing the Modbus-TCP datasheets from different SCADA system/ICS vendors such as Siemens, Schneider, GE, ABB, Wago, MegaTec, and Eaton Corporation it was found that the register addresses that are read/written by Modbus are different for different manufacturers. In practice, each I/O PLC module is mapped to a predefined specific range of registers (by the manufacturer), e.g., GE Genius analog output registers are mapped from 401501 to 401900, and Schneider ION7500/ION7600 analog output registers are mapped from 40011 to 40277. In Siemens S7 PLCs the user can optionally select a start and an end address, and the programming portal configures the devices to fit those selected addresses to registers between 40001 and 49999 (note the user selected addresses will not be the same as the addresses of the actual registers). Since the programming portal automatically links the SCADA devices to the Modbus registers, it adds an offset between two consecutive devices, e.g., if the first device mapping begins at 40001 and ends at 40100, the second device mapping will start at 40150 and ends at 40250. Since each device behaves differently and uniquely based on its manufacturer's setting, a device fingerprint can be created for the unknown SCADA devices by monitoring the registers used by Modbus protocol, then comparing those to devices' reference database. This principle is utilized in fingerprinting of devices connected to SCADA/ICS networks employing Modbus-protocol.

Figure 13:
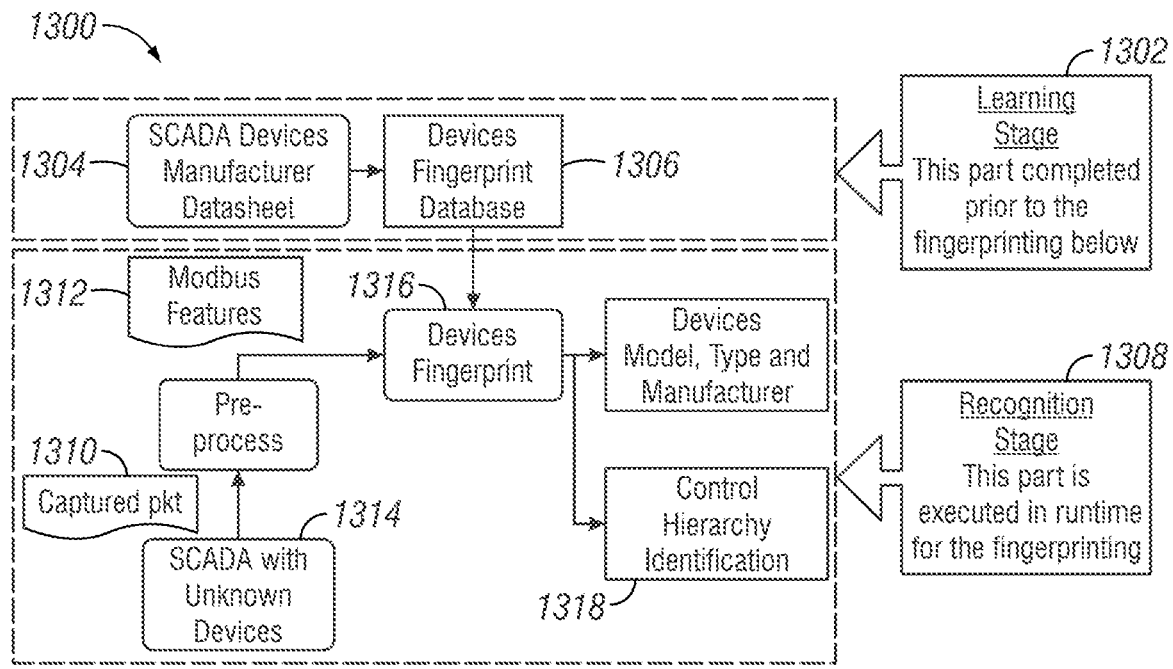
FIG. 13 depicts a Modbus-data analysis based device fingerprinting approach, consisting of two stages, according to the device recognition framework of FIG. 3.

FIG. 13 depicts the Modbus-data type analysis based device fingerprinting approach 1300, consisting of two stages: The first is an offline learning stage 1302 in which information from SCADA devices manufacturer datasheets 1304 are used to create a reference fingerprint database 1306. The second stage is the online recognition stage 1308 that captures communication packets 1310 from the network at each of the routers, extracts the relevant Modbus registers information 1312 to create the fingerprints 1316 for the unknown devices 1314, and finally compares the created fingerprints to the fingerprints' reference database 1306, obtained during the learning stage 1302, to identify at 1318 the devices 1314.

The above analysis can be augmented with control hierarchy information for a further refinement/confirmation of fingerprinting. The Modbus protocol is a master-slave protocol in which the master device sends requests to slave devices, and it is to be appreciated other suitable master-slave protocols can be employed by the present invention. Master-slave protocols exchanged messages incorporate this information by specifying whether a device is a master or a slave. Thereby, monitoring such a feature allows for the identification of control hierarchy. For example, considering FIG. 7 and monitoring the Modbus messages, indicates that $\{s_1, s_2, s_3\}$ are slave PLCs for both $s_6$ and $s_7$, $\{s_6, s_7, s_8\}$ are slave PLCs for $s_9$, and $\{s_4, s_5\}$ are slave PLCs for $s_8$. Using this information, the devices can be mapped into their control hierarchy in an efficient manner.

Figure 14:
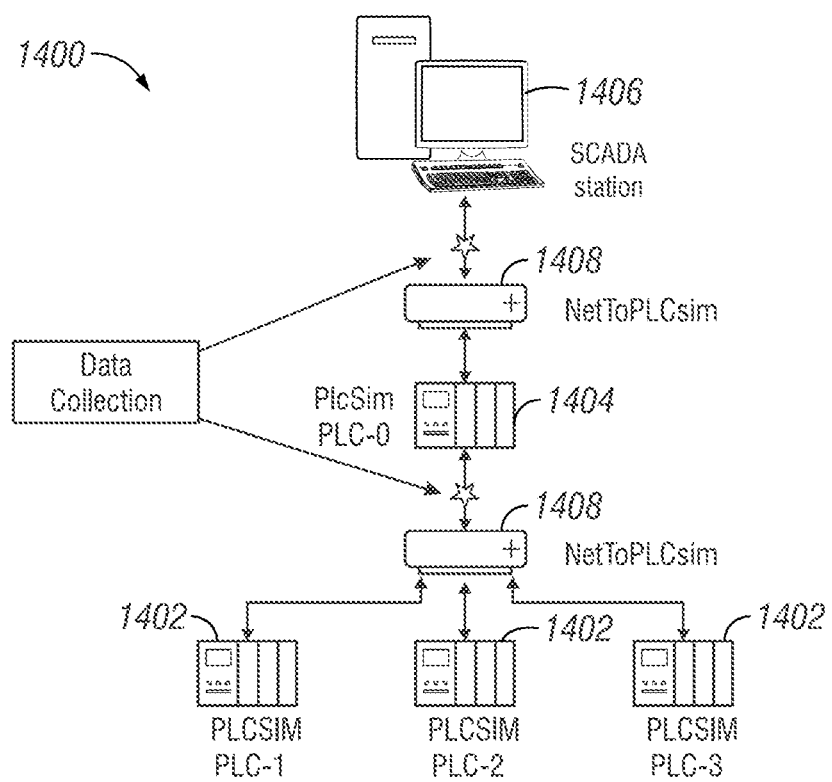
FIG. 14 mimics routers simulating a network and further simulates an exemplary system with a control architecture comprising four s7-300 PLCs, one master PLC, three slave PLCs, and one control room station, according to the device recognition framework of FIG. 3.

Another exemplary architecture shows simulated Siemens S7-300 SCADA system 1400 in FIG. 14. To guarantee that the simulated system matches a real world one, FIG. 14 shows a "SIMATIC S7-PLCSIM" that allows users to create virtual Siemens PLCs to perform a comprehensive simulation (that is used by developers to validate their design prior to commissioning). S7-PLCSIM simulates a single PLC at a time. "NetToPLCsim" that allows network communication with the S7-PLCSIM based virtual PLC, using the network interface of the PC on which the S7-PLCSIM is running. Using these tools, allowed creation of a realistic simulated control system that generates real data. A simulated system 1400 with the control architecture shown in FIG. 14, that consists of four s7-300 PLCs, three slave PLCs 1402, one master PLC 1404, and one control room station 1406. "NetToPLCsim" 1408 mimics routers to simulate the network.

Implemented in this example is this Modbus-data analysis based fingerprinting approach in a Python tool and tested it on the collected data. The tool successfully identified the PLCs as Siemens S7-300 PLCs, and also successfully identified the system control hierarchy. The collection points were placed at the routers (as opposed to at devices), validating that the Modbus-data analysis based fingerprinting approach worked with a minimal number of data collection points (two as opposed to four).

The experimental results of the Modbus-data analysis based device recognition confirmed that it could successfully identify the SCADA system control hierarchy and system devices type, manufacturer, and model. On a standard computer, with a core i5/2.2 GHz/4 GB RAM running Windows 10, Algorithm 1 took approximately twelve seconds to identify the devices of this example.

The Modbus-data analysis based fingerprinting approach 1300 is not affected by router actions on data, reduced the number of data collection points needed to identify unknown devices. For example, in the simulated water treatment SCADA system, only two collection points were needed, while four data collection points exists at the four devices. While the Modbus-protocol is one of the most commonly used protocols in SCADA systems, there are real-world examples, like in the water treatment CPS mentioned above, that do not employ Modbus. In those cases, the earlier hybrid approach 1300 works, however in such embodiments it can be beneficial if additional data collection is done at all of the devices (as opposed to at all the routers).

Figure 15:
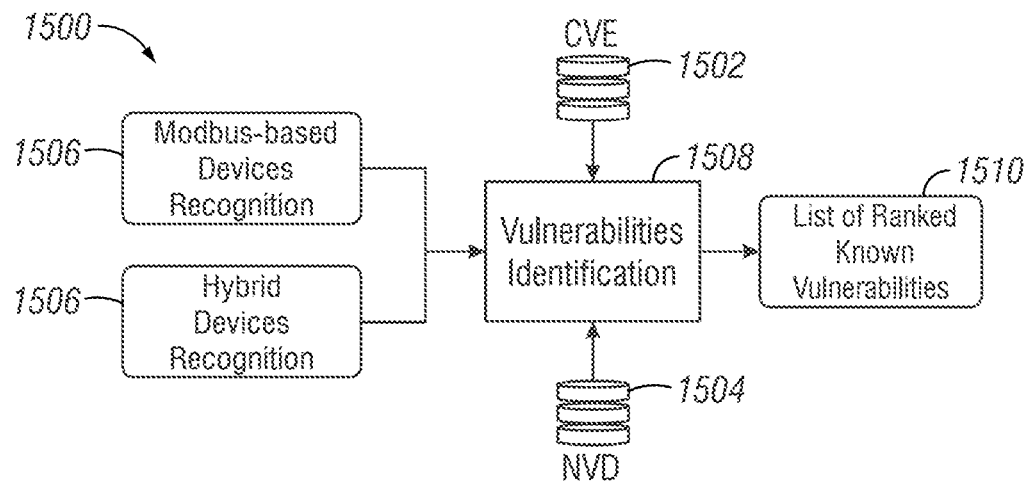
FIG. 15 illustrates a framework for an ANDVI tool, according to some aspects of the present disclosure, according to the device recognition framework of FIG. 3.

Once the SCADA/ICS devices have been identified, their potential known vulnerabilities 1510 can also be automatically mapped out by a look-up to trusted and up-to-date databases using the architecture 1500 shown in FIG. 15. The two most trusted vulnerabilities databases are the common vulnerabilities and exposures (CVE) database 1502 and the national vulnerability database (NVD) 1504. CVE 1502 is a database of known security threats, sponsored by the United States Department of Homeland Security. NVD 1504 is a U.S. government repository of standards-based vulnerabilities that include databases of security checklist references, security-related software flaws, misconfigurations, product names, and impact metrics. The information provided by these two databases 1502, 1504 can be integrated with devices recognition algorithms 1506 to automatically identify 1506 the system devices and their associated known vulnerabilities 1508. To do this end, the ANDVI tool (its architecture 1500 shown in FIG. 15) takes the output from either of the two device identification approaches and matches the discovered devices to their known vulnerabilities listed in the CVE database 1502, and then uses the NVD database 1504 to rank those vulnerabilities 1510 according to their NVD threat index values.

Figure 16:
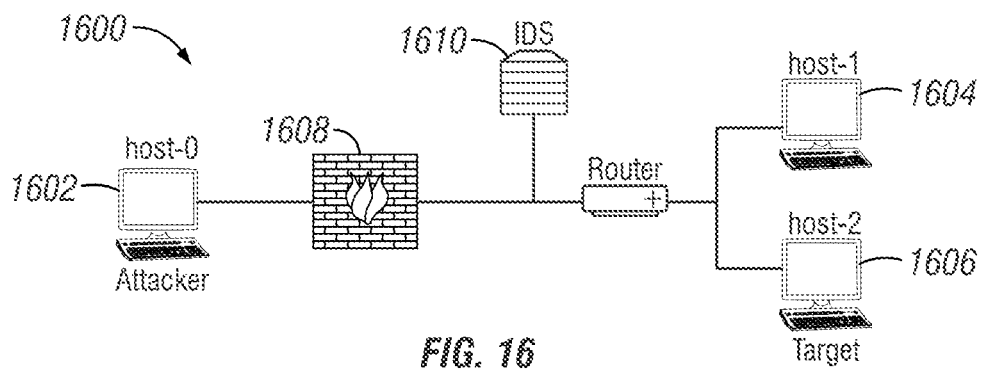
FIG. 16 adapts as an example a 3-host networked-system.

As a concrete example to illustrate the problem of attack-graph generation, an understanding of the networked-system example shown in FIG. 16. The network is a three-host system 1600: host-0 1602 is where the attacker is located, whereas host-1 1604 and host-2 1606 are the two target hosts. Host-1 1604 runs ftp and sshd, while host-2 1606 is running database and ftp. Also, there exists a firewall 1608 separating the targets from the rest of the internet. An intrusion detection system (IDS) 1610 supervises the network traffic between the network hosts and the outside sources. The firewall 1608 does not place any access control restrictions on the flow of network traffic, rather lets the IDS 1610 monitor the traffic flow between (host-0 1602; host-1 1604) and (host-0 1602; host-2 1606), but not generally between (host-1 1602; host-2 1604). For an atomic attack that is detectable, the IDS 1610 triggers an alarm upon its detection, while a stealthy attack remains undetected. Owing to the aforementioned services running on the two hosts, there can non-limitingly exist these three vulnerabilities:

1. wdir: a writable ftp home directory; this vulnerability is exploitable by an ftp rhosts attack on host-1 and host-2, running the ftp service.
2. fshell: an executable command shell assigned to the ftp username; this vulnerability is also exploitable by an ftp rhosts attack on host-1 and host-2, running the ftp service.
3. xterm: the xterm is vulnerable to a buffer overflow attack on host-1 running the ftp and sshd services, and host-2 running ftp service.

The aforementioned vulnerabilities can be exploited resulting in the following non-limiting atomic attacks:

1. sshd buffer overflow (sbo): This attack exploits the xterm vulnerability, giving the attacker root access to the victim host. This attack can be either stealthy or detectable by the IDS.
2. ftp rhosts (f tpr): This attack uses wdir vulnerability or the fshell vulnerability where the attacker establishes a remote login trust by creating a .rhosts file in the ftp home directory. This is a stealthy attack that the IDS is unable to detect.
3. remote login (rlog): This attack uses an existing trust relationship between two hosts gained by executing ftpr attack. The attacker logs into one host from another and gets user access even without a password. This attack is detectable by the IDS.
4. local buffer overflow (lbo): This attack also exploits the xterm vulnerability to gain access to the setuid root file to give the attacker root access to a local host. This attack is stealthy, and not detectable by the IDS.

Figure 17:
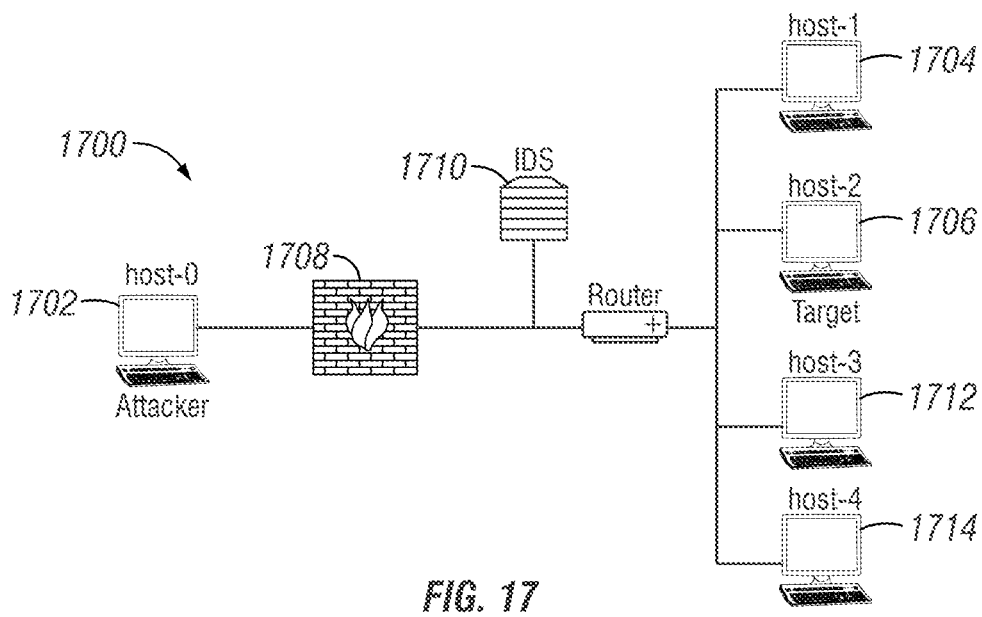
FIG. 17 expands the example of FIG. 16 to a 5-host networked system.

To illustrate the capability of the approach 1300 in generating attack-graphs for complex and general security properties such as AG(p→AFq), the three-host system 1600 of FIG. 16 is expanded to a five-host system 1700 of FIG. 17. Here host-3 1712 and host-4 1714 are additional target hosts. These two hosts 1712, 1714 are running ftp and sshd services as in the case of host-1 1704, and hence have the same vulnerabilities as host-1 1704. As a result, this system then has eight possible atomic attacks. As before, the firewall 1708 does not place any access control restrictions on the flow of network traffic rather only on monitoring: the traffic flows between (host-0 1702; host-1 1704), (host-0 1702; host-2 1704), (host-0 1702; host-3 1712), and (host-0 1702; host-4 1714) are monitored by the IDS 1710, while those among (host-1 1704; host-2 1706; host-3 1712; host-4 1714) are not monitored.

The following presents a non-limiting formal technical description of the three-host system 1600 of FIG. 16:

1. Set of hosts H=0, 1, 2; variable i∈{0, 1, 2}(static parameters).
2. System connectivity, C⊆H×H; Boolean $c_{ij}$=1 iff host i connected to host j (static parameters).
3. System services S; Boolean $s_i$=1 iff service s∈{ftp, sshd, data} is running on host i (dynamic variables).
4. System vulnerabilities V; Boolean $v_i$=1 iff vulnerability v∈{dir, f shell, xtermg} exists on host i (static parameters).
5. Attack instances $A_1$⊆A×H×H; labeled $a_{ij}$ ≡attack a from source i to target j, a∈{sbo, ftpr, rlog, lbog}, sbo: =sshd buffer overflow, ftpr: =–ftp rhosts, rlog: =remote login, lbo: =local buffer overflow (static parameters).
6. Trust relation T⊆H×H; Boolean $t_{ij}$=1 iff i is trusted by j (dynamic variables).
7. Attacker level of privilege L on host i; variable $l_i$∈{none, user, root}(dynamic variables).
8. Intrusion detection system IDS: A×H×H→{0, 1}; Boolean ids($a_{ij}$)=1 iff attack a from source i to target j is detectable (static parameters).
9. A global Boolean $d_g$ tracks whether an IDS alarm has been triggered for any previously executed atomic attack (dynamic variable).
10. Attack pre-conditions:

$Pre_{(sbo_{ij})} \equiv c_{ij}=1 \land (l_i \text{ user}) \land (l_j<\text{root}) \land (sshd_j=1)$ $Pre_{(ftpr_{ij})} \equiv c_{ij}1 \land (l_i \text{ user}) \land (\exists k \in H: t_{kj}=0) \land (ftp_j=1) \land (wdir_j=1 \lor fshell_j=1)$ $Pre_{(rlog_{ij})} \equiv c_{ij}=1 \land (l_i \text{ user}) \land (l_j=\text{none}) \land (t_{ij}=1)$ $Pre_{(lbo_{ij})} \equiv c_{ij}=1 \land (l_j=\text{user}) \land (xterm_j=1)$ 11. Attack post-conditions:

$$post_{(sbo_{ij})} \equiv (l_j=root) \land (sshd_j=0) \land ((i=d_g=0) \Rightarrow (d_g=0) (d_g=1))$$

$$post_{(ftp_{ij})} \equiv (\forall k \in H : t_{kj}=1)$$

$$post_{(rlog_{ij})} \equiv (l_j=user) \land (i=0 \Rightarrow d=1)$$

$$post_{(lbo_{ij})} \equiv (l_j=root)$$

12. Initial states: $l_0=root \land (l_1=l_2=none) \land (\forall ij \in H \times H : t_{ij}=0) \land (ftp_1=ftp_2=sshd_1=data_2=1) \land d_g=0$
    (Initially, the attacker has root privilege on host-0 and no privilege on other hosts, none of the hosts trust each other, ftp is running on host-1 1604 and host-2 1606, sshd on host-1 1604, database on host-2 1606, and IDS 1610 has not detected security violation.)

13. The security property ϕ is violated if the attacker has privilege level below root on host-2 1606 and it remains undetected by the IDS 1610. This can then be described by a computational tree logic (CTL) formula:

$$\neg \phi \equiv AG(l_2=root \land d_g=0).$$

Here "AG" stands for "All paths Globally at all states". The property reads as, "for all paths, globally at all states, either attacker's privilege level on host-2 1606 is below root, or this gets detected". The formal description of the five-host system 1700 can simply be an expansion of the formal description for the three-host system 1600; host-1 1704, host-3 1712, and host-4 1714 are equivalent to host-1 1604 in the three-host system 1600, so they retain similar formal descriptions. Host-0 1702, host-2 1706, and the IDS 1710 can maintain the same functionality as the three-host system 1600, so they can retain the same formal description as in the three-host system 1600. Therefore, the above formal description, with the slight modification to include host-3 1712 and host-4 1714, can apply to the five-host system 1700 or any other system having a distinct number of hosts. For the five-host system 1700, the security property is violated if the attacker is able to get root access on host-2 1706 only after compromising host-3 1708, and while remaining undetected, i.e., $$\neg \phi \equiv AG((l_3 \geq 1) \rightarrow AF(l_2=root \land d_g=0)).$$

Here "AG" stands for "All paths Globally at all states" and "AF" stands for "All paths in a Future state". The property reads as, "for all paths, globally at all states, if attacker's privilege level on host-3 1712 is root, then for all paths (originating from that state) in a future state, attacker privilege level on host-2 1706 is root, and this remains undetected".

The model-based approach to attack graph generation requires a formal security model of the overall system, and a system-level security property of interest. Using these, the associated attack-paths and the attack-graph is obtained in automated fashion using the Algorithm 2. To begin, one can define a system security model, an attack path, and an attack graph as follows.

Definition 1 a System Security Model (M=(S, E, s$_0$)) is a State-Transition Diagram Whose Locations S, with s$_0 \in$S Denoting an Initial Location, Capture the Security Status of the System (e.g., which Host is Running which Service, What the Attacker's Access Privilege Level is at Each Host, What the Trust Level is Among Each Pair of Hosts, and What the Detection Status is of Security Violation), and Whose Transitions E Describe how the Atomic Attack Actions Cause an Update in the System Security Status. In General, the Transitions are Guarded by Pre-Conditions on State-Variables, and their Execution Entails Certain Post-Conditions on the Same State-Variables.

To construct the system security model of this example, one needs a complete system description; its components and connectivity; their assets, services, and vulnerabilities; the atomic attack actions that exploit those vulnerabilities; their pre- and post-conditions; and also their detectability by an IDS. The execution of a sequence of state transitions (namely, atomic attacks) in M can result in the violation of a security property ϕ, expressed in a suitable temporal logic.

Definition 2 Given a Security Model M and a Security Property ϕ of Interest, an Attack Path (AP) is a Finite Acyclic Path of a Sequence of States in M, AP=(s$_0$, s$_1$ . . . s$_f$), where so is an Initial State in M, while any Two Adjacent States in the Path Belong to the Transition Set E, Such that the Execution of AP Leads to the Violation of ϕ.

Definition 3 an Attack-Graph (AG) is a Data Structure Representing a Union of all Attack Paths $$AG=\{AP_i | AP_i \text{ is an attack path in } M\}.$$

The following A2G2V approach used in this example is based on extension of model-checking. Model-checking is a tool for verifying if a system model M fulfills a certain temporal logic property ϕ of interest. If the property is not satisfied by some runs of M, then a model-checker reports an offending run as a counterexample.

Algorithm 2 Example of A2G2V: Automated Attack Graph Generator and Visualizer

Input: AADL+AGREE model (M)
Output: Attack Graph (AG)
procedure
    Translate AADL Model (M) to Lustre Model (Ml) % Using AGREE ; set ϕ$_0$ = ϕ
    Generate attack path AP % Using JKind find the counterexample that violate ϕ
    loop 1
    if AP is Cyclic then
        K = K − 1
        generate AP
        goto loop 1
    if AP is Acyclic then
        K = |AP| % | · | computes the length of its argument
        loop 2
        generate AP$_i$
        if new attack-path then % if all APs of length ≤ K are not yet enumerated
            ϕ$_{i+1}$ = ϕ$_i$ ⋁ AP$_i$
            Add AP$_i$ to AG
            goto loop 2

| Algorithm 2 Example of A2G2V: Automated Attack Graph Generator and Visualizer |
|---|
| else % if all APs of length ≤ K have been enumerated<br>   K = K + 1<br>   generate AP<br>   if AP is Acyclic then<br>      goto loop 2<br>   else<br>      return AG<br>generate graphical AG using Graphviz |

The system description of components and their interfaces and connections of the present example can first be captured using architecture description language such as Architecture Analysis and Design Language (AADL), within an open-source environment, such as OSATE2. OSATE2 is an upgraded Eclipse-based platform, an open-source integrated development environment (IDE). OSATE2 extends the Eclipse platform with textual and graphical editors for AADL and supports extensible markup language (XML) based interchange format for AADL, based on its meta-model specification. Within an AADL architecture level model, the system components can be added graphically, and also extensions can be introduced through annexes, that can offer new categories of model elements such as behaviors and properties of the components. The AGREE annex developed by Rockwell Collins (Cedar Rapids, IA USA) can, as an example, specify the component models, and system-level security properties.

Figure 18:
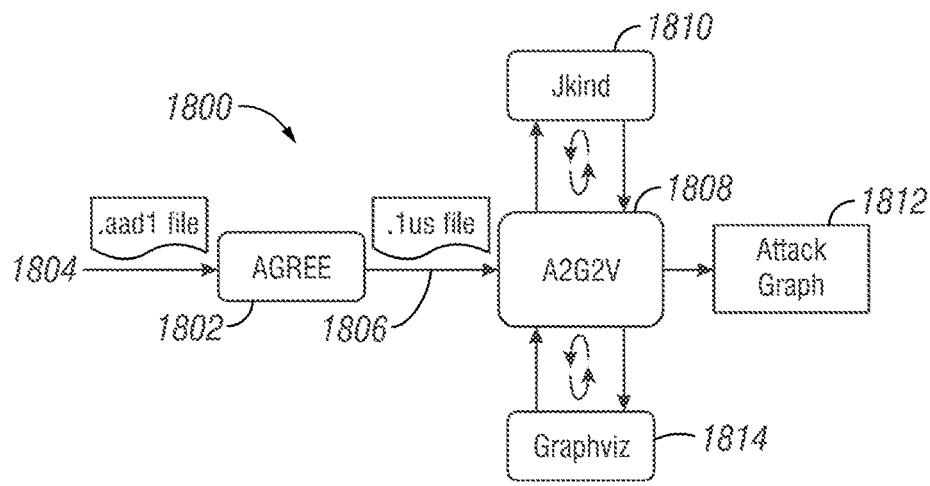
FIG. 18 depicts one example of an A2G2V algorithm architecture.

The annex can translate the architecture description language and annex models and properties to a parallel distributed file system, such as Lustre, and interact with a model-checker, such as JKind (a model-checker specifically for Lustre models), for correctness verification. AGREE can only be run from the OSATE2 GUI and does not support command line instructions and cannot be called iteratively for the generation of more than one counterexample, without possibly redesigning the AGREE's source code. A C-based implementation such as the one described herein, A2G2V, can take the Lustre output from AGREE and iteratively interacts with JKind to generate the attack-sequences one after another. FIG. 18 shows the algorithm architecture 1800.

The approach behind Algorithm 2 as illustrated in FIG. 15 follows. The user inputs the system description in AADL+Annex at 1802 using the AGREE front end at 1804. This is translated into Lustre at 1806 by AGREE 1802 and fed to A2G2V 1808 in form of a security model M and system-level security property $\phi$. If M complies with the given security property $\phi$, JKind 1810 reports that $\phi$ is satisfied. If M violates $\phi$, then JKind 1810 reports a counterexample representing a state transition path of concatenated atomic attacks (namely, the transitions in E) that the system follows to violate $\phi$. Note once an attacker has compromised the system through a sequence of atomic attacks, it need not launch additional atomic attacks. Thus, without loss of generality, all attack-paths are acyclic. The length of an attack-path is thus upper-bounded by the "depth" (i.e., the length of the maximum acyclic path) of system model M.

This upper-bound however is not known a priori, and so requires an iterative exploration. JKind 1810 uses bounded model checking (BMC) for verification. JKind 1810 searches for counterexamples of length bounded to a search-depth, with a default initial value of K=200. Note this default value does not affect the end result: If a smaller length counterexample exists or the system is shown to be safe using the default induction depth of K=200, then K=200 is already a workable choice. If K=200 induction-depth is inconclusive, then JKind 1810 automatically increases K incrementally until it finds a counterexample or concludes that the system is safe.

From the first run of JKind 1810, if no counterexample is found, then the attack-graph 1812 is simply an empty graph. On the other hand, if the first reported AP is cyclic, then A2G2V 1808 decreases K by 1 and re-runs the model-checker JKind 1810. A2G2V 1808 repeats this step until finding an acyclic AP. Note this task of finding an acyclic path by iteratively decrementing the search-depth can be skipped if an acyclic path is found in the first iteration. At this point, A2G2V 1808 sets K to be the length of that AP before enumerating all the attack-paths of length K by iteratively disjuncting the reported APt to the security property as follows: $\phi_0$: =$\phi$; $\phi_{i+1}$: $\phi_i \vee AP_i$, and then reruns the model-checker JKind 1810. After enumerating all attack-paths of length≤K, JKind 1810 increments the search-depth K by 1 and rerun the algorithm. This process is repeated until reaching a K that reports a cyclic AP, meaning that the model-depth has been exceeded. Note this task of finding a cyclic path by iteratively incrementing the search-depth can be skipped if a cyclic path is found in the first iteration. The next step is to pass the union of the reported acyclic attack-paths to Graphviz 1814 to generate a graphical visualization of the corresponding attack-graph 1812.

Note the soundness of Algorithm 1 follows from the fact that the algorithm generates only the counterexamples, whereas its completeness follows from the fact that it generates all the acyclic counterexamples, which is a finite set since the model itself has a finite state-space, with finite number of dynamic state-variables, each taking finitely many values. Also, as a result, the termination is guaranteed since the search is only over the acyclic paths, which is a finite set. Implementing the A2G2V tool required building three main functions: a counterexample parsing function, a cyclic testing function, and a Luster model editing function. The counterexample parsing function extracts the generated counterexamples from the JKind output. The cyclic testing function tests if the generated counterexample is cyclic or acyclic. The model editing function transfers the counterexample into its luster representation, by first encoding it in the Luster syntax, and next disjuncting the encoded counterexample with the property being model-checked. The main program coordinates among the three functions to execute Algorithm 2.

The number of pre-/post-conditions is linear in the number of atomic attacks and the dynamic state-variables. Also, in general, the computation complexity is determined by the size of the model and the length of the property. For the class of so-called computational tree logic (CTL) properties, the complexity is known to be polynomial in the size of the model and the length of the security property. The model-checking has gained tremendous industrial adoption for safety critical applications, owing to its applicability to practical sized-systems.

The architecture description language and annex formally capture the architectural description of the computer networked systems, their components, and their connectivity. The information about their behaviors: their dynamic state variables, the pre- and post-conditions of the atomic attacks, and the security properties of interest were encoded in the annex. These were translated to a parallel distributed file system using the assume guarantee environment to obtain the system security model M, which was then fed to the A2G2V tool for the attack-graph generation and visualization.

For the three-host system 1600 of FIG. 16, the model M consists of a total of 57×106 states and 3.2×1015 transitions, whereas the five-host system 1700 of FIG. 17, there are 1.4×1017 states and 1.8×1034 transitions in its model M. For the three-host system 1600, the goal of the attacker is likely to gain access to the database on host-2 1606, for which the attacker needs to gain root access to host-2 1606 without being detected by the IDS 1610. Hence, the property φ that should not be violated is that either the attacker never gains root access to host-2 1606 or it gets be detected by the IDS 1610.

Table 2 summarizes the A2G2V algorithm search results for enumerating the attack-paths, and the search depth (or path-length), denoted K, in the example of a three-host network 1600. In the first iteration, the A2G2V set K to 200, and found an acyclic four steps attack-path. A2G2V used K=4 and iterated until no new four-steps attack-path could be found, resulting in ten different attack-paths. Next, K was incremented to 5 and all attack-paths of length 5 were generated (57 new attack-paths were found). Finally, A2G2V incremented K to 6, but that resulted in a cyclic attack-path. A2G2V then terminated the attack-path search.

TABLE 2

Example of 3-hosts Network Attack Graph Search Summary

| K | Generated paths information | Next K |
|---|---|---|
| 200 (default) | 4-step acyclic attack-path | K = 4 |
| 4 | 10 acyclic attack-paths | K = 5 |
| 5 | 57 acyclic attack-paths | K = 6 |
| 6 | cyclic attack-path generated | Terminate A2G2V |

Figure 19:
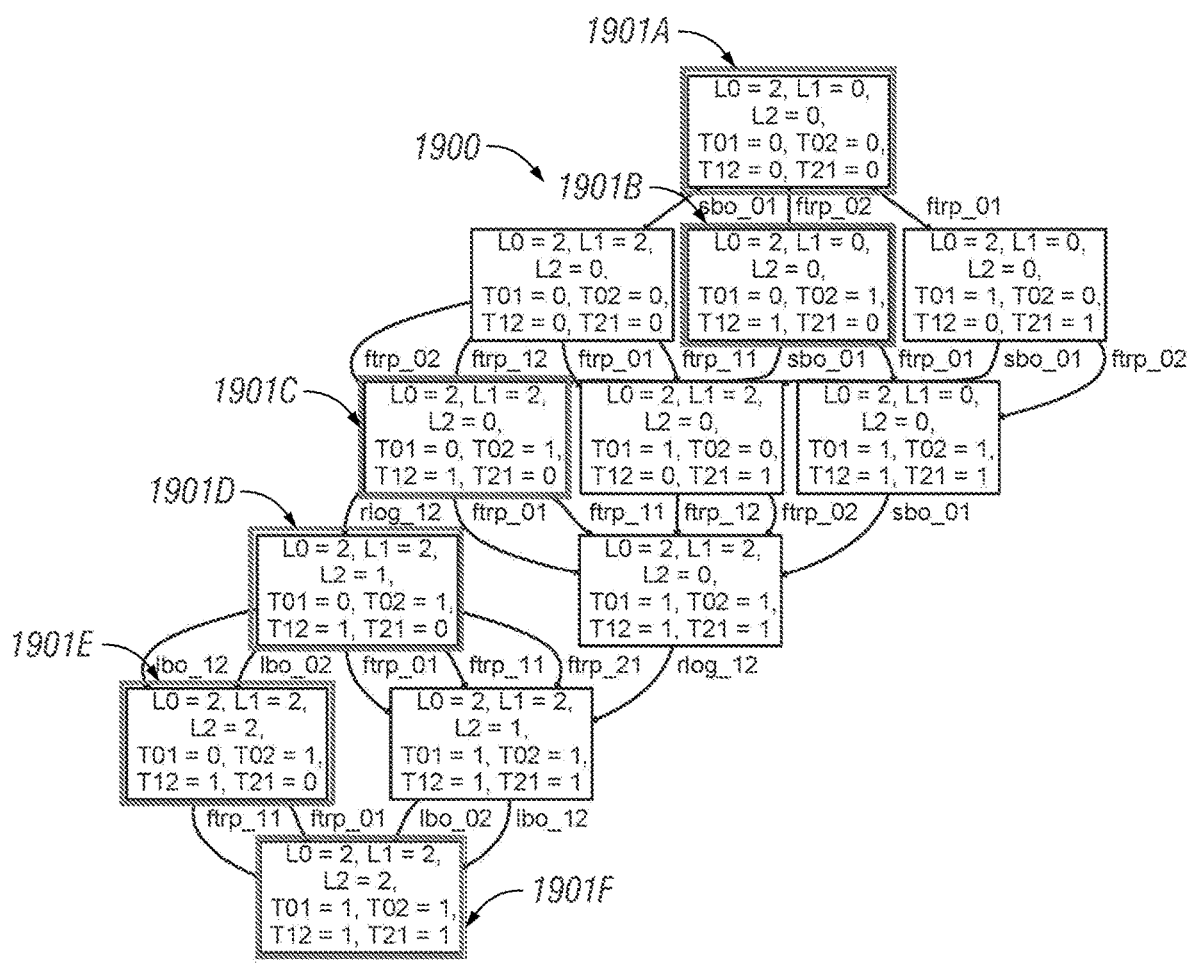
FIG. 19 generates an attack-graph for the 3-host networked system of FIG. 16.
Figure 23:
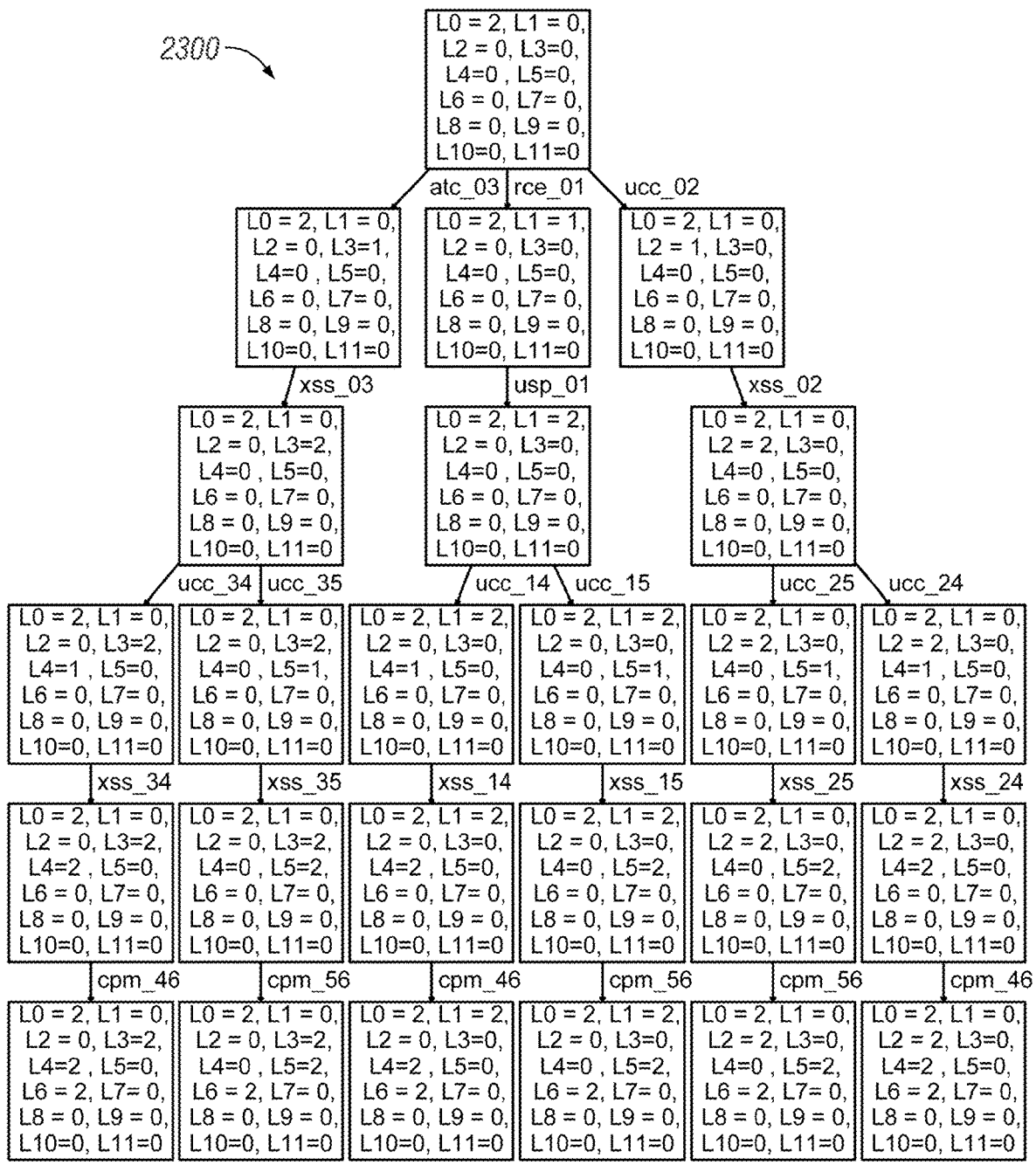
FIG. 23 generates, using A2G2V, an attack-graph for the water treatment SCADA system of FIG. 22.

Note due to a feature of the model-checker when searching for a counterexample of a certain length, the lower length counterexamples are also explored, and this causes the model-checker to duplicate the counterexamples (so for example when searching for K=5, a K=4 counterexample is generated for a second time). Table 2 reports all such results. However, the graph visualizer 1814 parses all attack-paths and automatically removes the duplicates. This can be seen from the example generated attack graphs 1812 in FIGS. 19, 21, and 23. FIG. 19 depicts the attack-graph 1900 generated by Algorithm 2 for this property. Each node describes the attacker privileges and the trust relationships between the network hosts at that step. Each transition represents an atomic-attack.

Any path from the initial node to the final node represents a sequence of atomic-attacks that the attacker can use to attain its goal without being detected. For example, the attack path 1901 emphasized in bold is comprised of nodes 1901A-1901F and all of the transitions therebetween. The attack path 1901 has the following atomic-attacks: ftp-02 establishes trust between host-0 1602 and host-2 1606, sbo-01 gives the attacker root access to host-1 1604, rlog-12 gives the attacker user access to host-2 1606, lbo-02 gives the attacker root access to host-2 1606, and finally ftp-01 establishes trust between host-1 1604 and host-2 1606. FIG. 20 shows the JKind 1810 reported counterexample 2000 for this path, and how the Algorithm 2 encodes the reported counterexample 2000 and disjuncts it with the security property within the Lustre file automatically.

A2G2V 1808 was applied to the five-hosts system 1700, with a more general security property:

$$\neg\phi = AG((l_3 \geq 1) \rightarrow AF(l_2 = \text{root} \land d_g = 0)).$$

This property represents all attack scenarios that an attacker may take to compromise host-3 1712 first, and later compromise host-2 1706, without being detected. Algorithm 2 started at default K value of 200. The first iteration generated an acyclic 4 steps attack-path. So K was set to 4 and A2G2V generated all attack-paths of length 4, a total of 59 different attack-paths. K was then incremented to 5, generating 150 different attack-paths. A2G2V then incremented K to 6, but that generated a cyclic attack-path, terminating the search for the attack-paths. Table 3 summarizes this process, while the set 2100 of all attack-paths is depicted in graphical form in FIG. 21. This graphical depiction is also automatically obtained using A2G2V.

TABLE 3

Example of 5-hosts Network Attack Graph Search Summary

| K | Generated paths information | Next K |
|---|---|---|
| 200 (default) | 4-step acyclic attack-path | K = 4 |
| 4 | 59 acyclic attack-paths | K = 5 |
| 5 | 150 acyclic attack-paths | K = 6 |
| 6 | cyclic attack-path generated | Terminate A2G2V |

Figure 21:
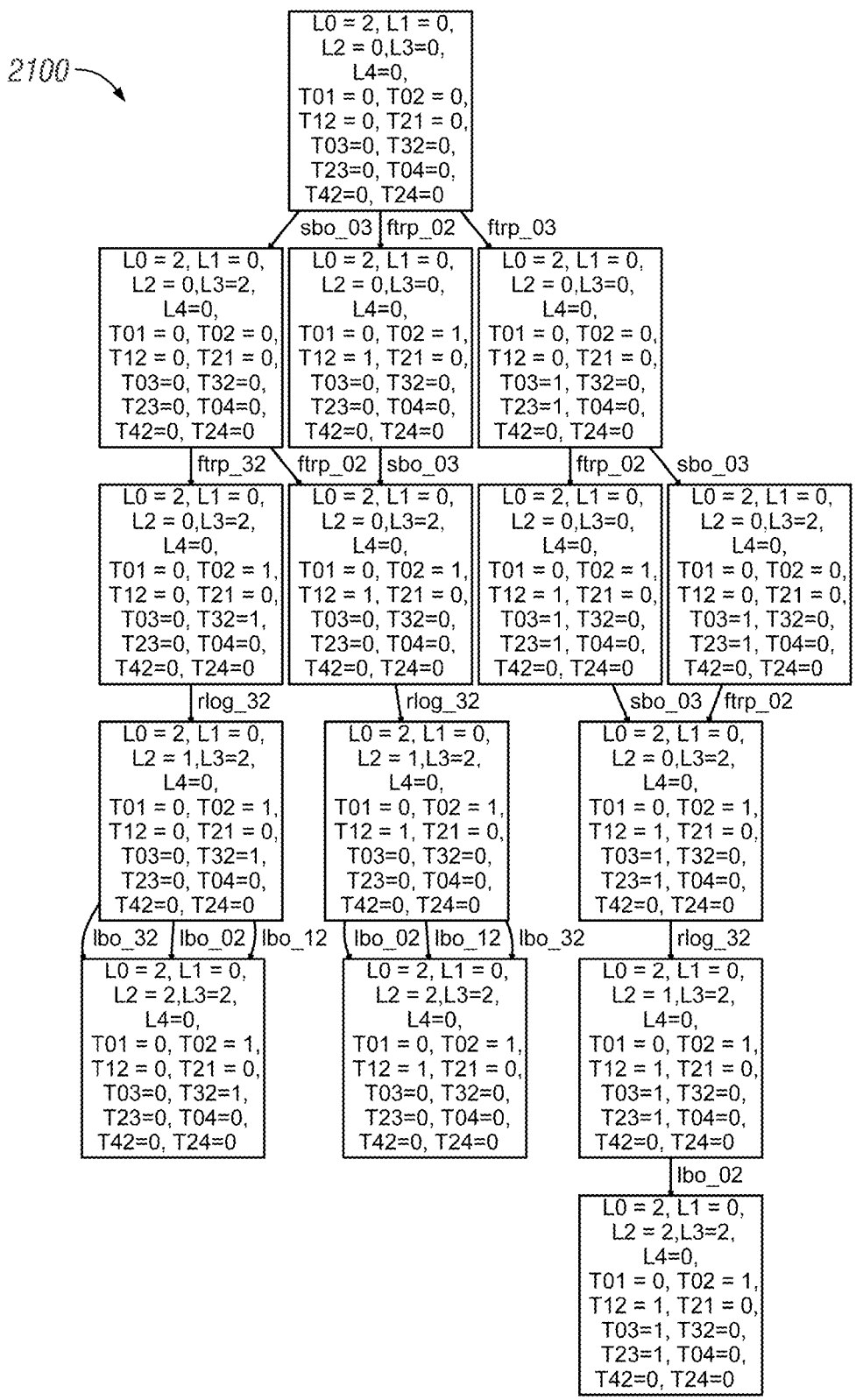
FIG. 21 generates an attack-graph for the 3-host networked system of FIG. 17.

Experimental results for Algorithm 2 show that it can successfully generated attack-graphs 1812 in an automated fashion for computer networks. Such an attack-graph 1812 can be used to analyze the security of the system. For example, it can be seen from FIG. 19 that rlog-12 attack is common to most of the attack paths, so if the resources can be used to mitigate this attack, then the security of the networked-system will hugely improve. FIG. 21 shows how an attacker can compromise the system through host-3 1712. Such analysis can be helpful in the design-phase where the systems administrators can introduce appropriate security measures to improve the system-level security.

On a standard computer, e.g., a computer having a core i5/2.2 GHz/4 GB RAM running Windows 10, Algorithm 2 took approximately two hours and fifteen minutes to construct an attack-graph 2100 for the five-host network 1700 with safety type security property (that is violated by reachability of certain locations). For the more general "temporal" security property, that is violated by the reachability of certain paths (rather locations), Algorithm 2 generated the attack-graph in approximately fifteen minutes for the five-host network 1700. While the attack-graph 2100 can be generated for a safety property, the attack-graph 2100 does not have the capability to generate the attack-graph for the more general temporal security properties. Algorithm 2 is the first to do so, as those algorithms known in the art merely generate a single attack-path.

Figure 22:
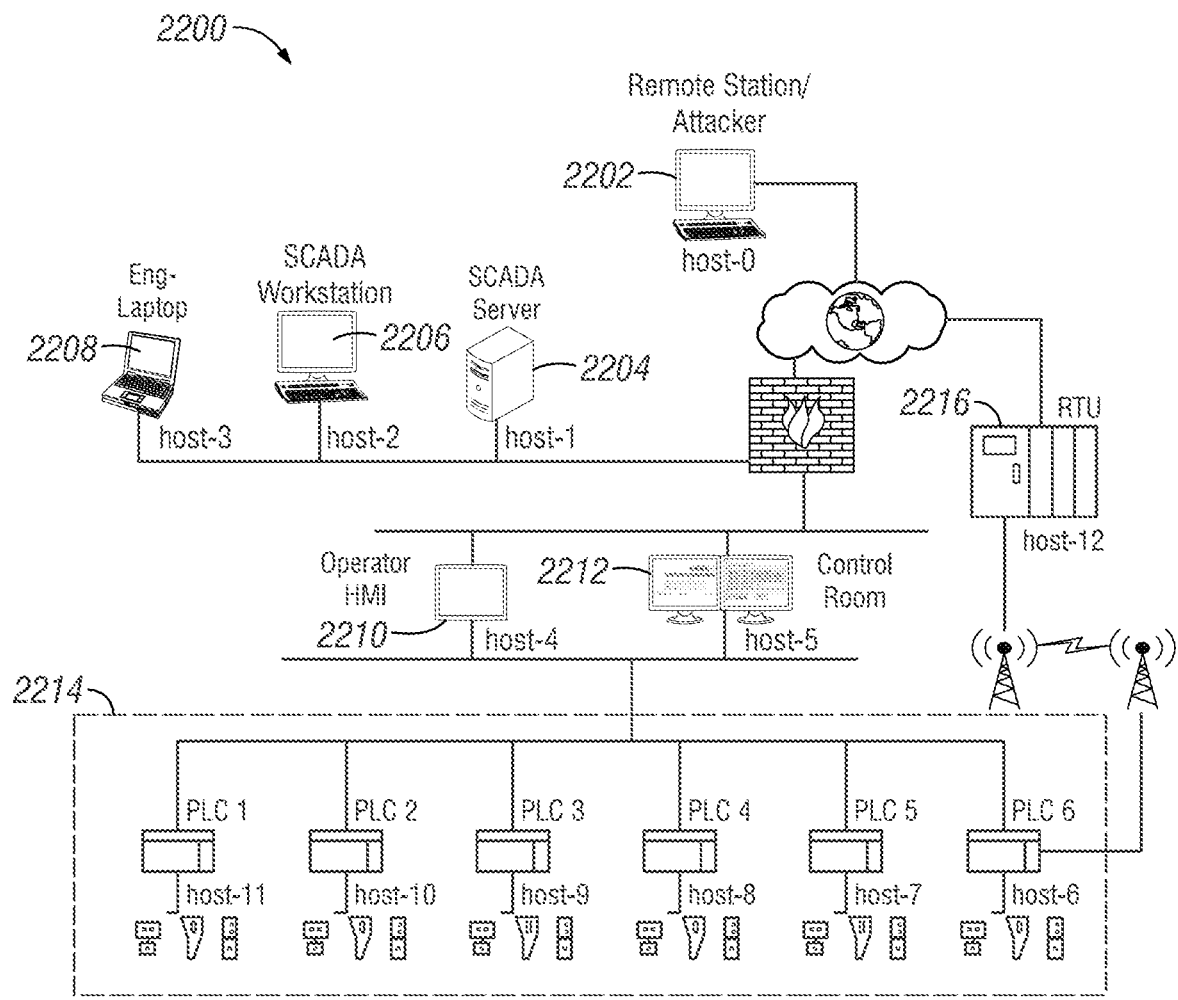
FIG. 22 depicts an exemplary SCADA architecture for a water treatment system.

To demonstrate the applicability of Algorithm 2 to real-world cyber-physical system, a water treatment system 2200 is shown in FIG. 22. The system 2200 is based on a fully functional water treatment CPS testbed in a laboratory. The system 2200 consists of twelve hosts: Host-0 2202 is the remote station; host-1 2204 is the SCADA server; host-2 2206 is the SCADA workstation; host-3 2208 is the engineer's laptop; host-4 2210 is the operator Human Machine Interface (HMI); host-5 2212 is the control room; host-6 to host-11 (collectively at 2214) are the Programmable Logic Controllers (PLC) that control the physical process through sensors and actuators. If the attacker has secured access to the remote station (host-0) 2202, likely the PLCs (hosts 6-11) 2214 are the attacker's main target. There exists a firewall separating host-0 2202, host-1 2204, host-2 2206, host-3 2208 and the rest of the system. The firewall restricts the access from the remote station 2202 to host-1 2204, host-2 2206, and host-3 2208. Also, it allows access from host-1 2204, host-2 2206, and host-3 2208 to the rest of the system. The communication with the PLCs 2214 goes through host-5 2212 and the PLC 2214 of host-6. The PLCs 2214 of host-7 through host-11 communicate with host-5 2212 and host-6 but not with each other.

Where all of the SCADA components are predominantly Siemens components, online databases may have the following vulnerabilities, which is assumed to be the case for an illustration of the approach:

1. The SCADA server 2204 is a SINEMA server, in which
   (a) iws: The integrated web servers at Port 4999/TCP and Port 80/TCP may allow unauthenticated remote code execution if an attacker has a network access to the server.
   (b) lmw: Local Microsoft Windows operating system users can escalate their privileges if the affected products are not installed under their default path (\C:\\ProgramFiles\\*" or the localized equivalent).
2. The SCADA workstation 2206 is a SIMATIC Wincc flexible runtime, in which
   (a) rmm: The remote management module of SIMATIC Wincc flexible panel transmits weakly protected credentials over the network. Attackers capturing network traffic of the remote management module can reconstruct the credentials.
   (b) inws: Siemens Wince flexible allows remote attackers with user access to inject arbitrary web script or HTML via unspecified vectors.
3. The engineering Laptop 2208 runs a Wincc TIA portal, in which
   (a) bac: When a user logs in, the application sets predictable authentication to-ken/cookie values. This can allow an attacker to bypass authentication checks.
   (b) inws: Wincc TIA portal allows remote attackers to inject arbitrary web script or HTML via unspecified vectors.
4. The HMI 2210 runs a Wincc runtime advanced, in which
   (a) rmm: The remote management module of Wincc runtime advanced transmits weakly protected credentials over the network. Attackers capturing network traffic of the remote management module can reconstruct the credentials.
   (b) inws: Siemens Wincc runtime advanced allows remote attackers to inject arbitrary web script or HTML via unspecified vectors.
5. The control center 2212 runs a Wincc runtime professional, in which
   (a) rmm: The remote management module of SIMATIC Wincc runtime professional transmits weakly protected credentials over the network. Attackers capturing network traffic of the remote management module can reconstruct the credentials.
   (b) inws: Siemens Wincc flexible allows remote attackers to inject arbitrary web script or HTML via unspecified vectors.
6. The PLCs 2214 are Siemens SIMATIC S7-1500 CPU PLC devices, in which rng: The random-number generator on Siemens SIMATIC S7-1500 CPU PLC devices does not have sufficient entropy, which makes it easier for remote at-tackers to defeat cryptographic protection mechanisms and hijack sessions via unspecified vectors.

The above listed SCADA system atomic vulnerabilities can be exploited resulting in the following atomic attacks:

1. Remote code execution (rce): This attack exploits the vulnerability in SINEMA integrated web servers at Port 4999/TCP and Port 80/TCP if an attacker has network access to the server. This attack gives the attacker user access to the attacked host.
2. Unquoted service paths (usp): This attack exploits the vulnerability in SINEMA server windows operating system which allows a local user to escalate their privileges to gain root access to the attacked host.
3. User credentials construction (ucc): This attack exploits the weakly protected credentials in SIMATIC Wincc flexible, SIMATIC Wincc advanced, and SIMATIC Wincc professional. This attack gives the attacker user access to the attacked host.
4. Cross-site scripting (xss): This attack exploits the web script and HTML code injection vulnerability in Wincc TIA portal, SIMATIC Wincc flexible, SIMATIC Wincc advanced, and SIMATIC Wincc professional. This attack gives the attacker root access to the attacked host.
5. Authentication token/cookie (atc): This attack exploits the predictable authentication token/cookie values in a Wincc TIA portal. This attack gives the attacker root access to the attacked host.
6. Cryptographic protection mechanisms (cpm): This attack exploits the vulnerability in SIMATIC S7-1500 CPU random-number generator if the attacker has network access to the PLCs. This attack gives the attacker root access to the attacked host.

The water treatment system 2200 can be formally specified as follows:

1. Set of hosts H=0, 1, 2, ..., 11; variable $i \in \{0, 1, 2, \ldots, 11\}$ (static parameters).
2. System connectivity, $C \subseteq H \times H$; Boolean; $c_{ij}=1$ iff host i connected to host j (static parameters).
3. System services S; Boolean; $s_i=1$ iff service $s \in \{$SCADA server is SINEMA, SIMATIC Wincc runtime flexible, Wincc runtime advanced, Wincc runtime professional, Wincc TIA portal, SIMATIC S7-1500 CPU$\}$ is running on host i (dynamic variables).
4. System vulnerabilities V; Boolean; $v_i=1$ iff vulnerability $v \in \{$iws, lmw, rmm, inws, bac, rng$\}$ exists on host i (static parameters).
5. Attack instances $AI \subseteq A \times H \times H$; labeled $a_{ij} \equiv$ attack a from source i to target j, $a \in \{$rce, usp, ucc, xss, atc$\}$, rce:=remote code execution, usp:=unquoted service paths, ucc:=user credentials construction, xss:=cross-site scripting atc:=authentication token/cookie (static parameters).

6. Trust relation T⊆H×H; Boolean; $t_{ij}=1$ iff i is trusted by j (dynamic variables).
7. Attacker level of privilege L on host i; variable $l_i \in$ {none, user, root}(dynamic variables).
8. Attack pre-conditions:

$Pre_{(rce_{ij})} \equiv c_{ij}=1 \wedge (l_i \text{ user}) \wedge (l_j=\text{none}) \wedge iws=1$ $Pre_{(usp_{ij})} \equiv c_{ij}=1 \wedge (l_i \text{ user}) \wedge (l_j=\text{root}) \wedge lmw=1$ $Pre_{(ucc_{ij})} \equiv c_{ij}=1 \wedge (l_i \text{ user}) \wedge (l_j=\text{none}) \wedge rmm=1$ $Pre_{(xss_{ij})} \equiv c_{ij}=1 \wedge (l_i \text{ user}) \wedge (l_j=\text{root}) \wedge inws=1$ $Pre_{(atc_{ij})} \equiv c_{ij}=1 \wedge (l_i \text{ user}) \wedge (l_j=\text{none}) \wedge bac=1$ $Pre_{(cpm_{ij})} \equiv c_{ij}=1 \wedge (l_i \text{ user}) \wedge (l_j=\text{none}) \wedge rng=1$ 9. Attack post-conditions:

$post_{(rce_{ij})} \equiv (l_i=\text{user}) \wedge (iws=0)$ $post_{(usp_{ij})} \equiv (l_j=\text{root}) \wedge (lmw=0)$ $post_{(ucc_{ij})} \equiv (l_i=\text{user}) \wedge (rmm=0)$ $post_{(xss_{ij})} = (l_i=\text{user}) \wedge (inws=0)$ $post_{(atc_{ij})} \equiv (l_i=\text{user}) \wedge (bac=0)$ $post_{(cpm_{ij})} \equiv (l_i=\text{user}) \wedge (rng=0)$ 10. Initial states: $l_0=\text{root} \wedge (l_1=l_2= \ldots =l_{11}=\text{none}) \wedge (\forall ij \in H \times H: t_{ij}=0) \wedge (iws=lmw=rmm=inws=bac=rng=1)$ (Initially, the attacker has root privilege on host-0 2202 and no privilege on other hosts, none of the hosts trust each other, and iws, lmw, rmm, inws, bac, and rng are running on the SCADA system components.)
11. The security property φ of interest is violated if the attacker has the root privilege level on host-6 2214. This can then be described by a computational tree logic (CTL).

$\neg \phi \equiv AG(l_6=\text{root})$.

An AADL+AGREE description that captures the formal description of the above system 2200, its components, connectivity, dynamic state variables, atomic attacks, and security property of interest can be encoded in an embodiment of the present invention. The constructed system model M consists of a total of 1.9×10^14 states and 3.6×10^28 transitions and was fed as input to the A2G2V tool.

The security of the water treatment system can be analyzed using A2G2V for $\phi=AG(l_6 \geq 1)$). This property represents all attack scenarios that an attacker may take to compromise host-6 2214. Algorithm 2 successfully generated the attack-graph 2300 for this property as demonstrated in FIG. 23.

Algorithm 2 started by setting default search depth for attack-paths to K=200. The first iteration generated an acyclic five steps attack-path, and so K was set to 5. A2G2V 1808 generated all attack-paths of length 5, generating 100 different attack-paths. Then K was incremented to 6. This generated a cyclic attack-path, which then terminated the search for the attack-paths. Table 4 summarizes this process:

TABLE 4

Example of Water Treatment SCADA CPS Attack Graph Search Summary

| K | Generated paths information | Next K |
|---|---|---|
| 200 (default) | 5-step acyclic attack-path | K = 5 |
| 5 | 100 acyclic attack-paths | K = 6 |
| 6 | cyclic attack-path generated | Terminate A2G2V |

On a standard computer, e.g., with a core i5/2.2 GHz/4 GB RAM running Windows 10, Algorithm 2 took approximately 40 minutes to generate attack-graph 2300. The results of FIG. 23 demonstrate the usefulness of Algorithm 2 showing that Algorithm 2 successfully generated attack-graph 2300 in an automated fashion for realistic applications such as the SCADA case study. The generated attack-graph 2300 helps the system administrators to utilize the resources to maximize the security while minimize the cost of consequences. An inspection reveals that the ucc and the xss are the most common attacks. Also, the generated attack-graph demonstrates that an xss attack can never be applied successfully without successfully executing a ucc attack first. So, by way stopping the ucc attacks, the system administrators can also eliminate the xss attacks, which would greatly improve the system security.

Figure 24:
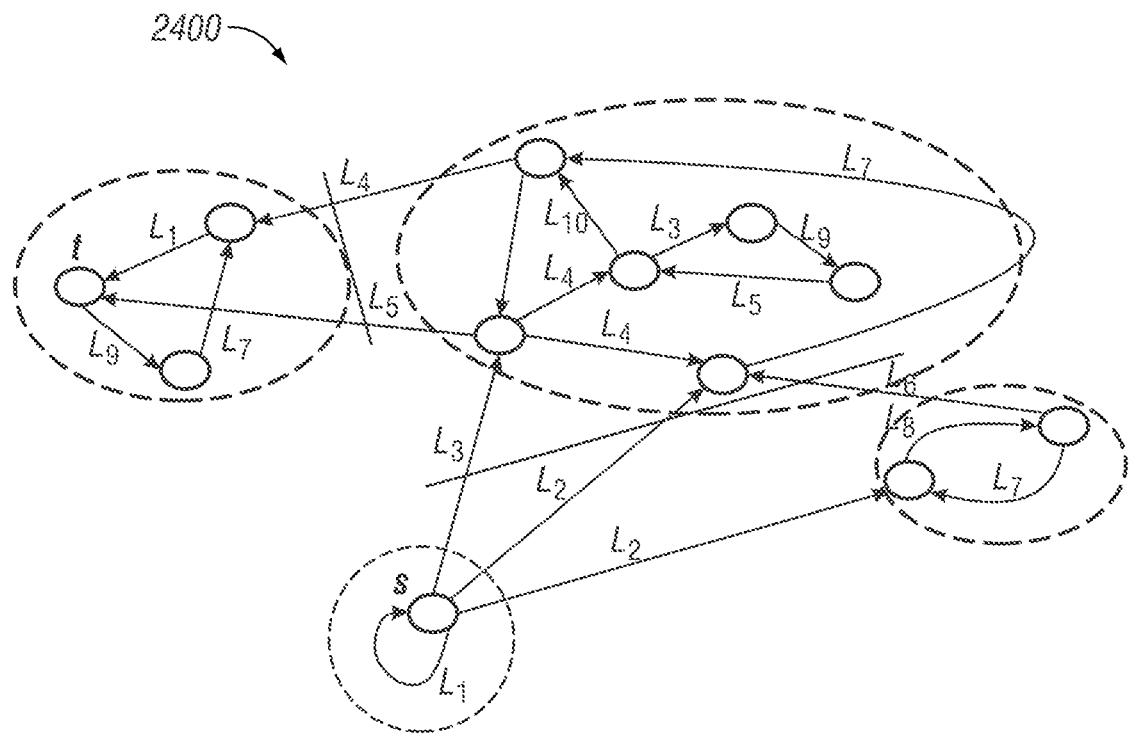
FIG. 24 exemplifies an attack-graph in which each sequence of edges, starting from the source vertex s and ending at the terminal vertex t, represents an attack sequence that can compromise a system under attack.

FIG. 24 shows a representation 2400 of an attack-graph G=(V, E, s, t, L, C), where V is the set of vertexes, E⊆V×V is the set of edges that connect a vertex to another, s is the source vertex, t is the terminal vertex, L is a set of labels where each label represents an atomic attack, and C: E→L is an edge-labeling function. Each sequence of edges, starting from the source vertex s and ending at the terminal vertex t, represents an attack sequence that can compromise a system under attack.

Atomic-attack actions can be mitigated by eliminating their root-cause vulnerabilities (e.g., by way of providing available software patches for them), which is equivalent to removing corresponding labeled edges from the attack graph. To make the overall system secure so that a desired system-level security property of interest cannot be violated through a sequence of atomic attack actions, a set of atomic attacks can be mitigated, so that the removal of the corresponding labeled edges from the attack-graph renders it disconnected, making the terminal vertex unreachable from the source vertex.

Such a set of atomic attacks can then be viewed as inducing a labeled cut of the attack-graph, where a labeled cut is simply a set of labels L'⊆L such that the removal of edges carrying those labels disconnects the source and terminal vertices. An attack set that can disconnect a given attack-graph is called a critical-attacks set. A desirable goal then is to find a minimal critical-attacks set, finding which can be viewed as an instance of the MLC problem, whose goal is to identify the smallest set L'⊆L of labels, such that s and t become disconnected when the edges carrying the labels in L' are deleted from the attack-graph.

MLC is known to be an NP-complete problem. In order to find a "near-minimal critical-attacks set" CA⊆L in a polynomial complexity manner, the notion of a SCCiMLC is introduced to approximate a minimal critical-attacks set. An exact MLC algorithm can be obtained and compared to the SCCiMLC algorithm.

Algorithm 3 approximates a solution to the MLC problem, identifying a critical-attacks set in linear time in the following manner. It first creates an abstracted tree version (i.e., an acyclic graph) of the given attack-graph 2402, defined over the vertex set of its SCCs, and next uses a backward search starting from the terminal node to iteratively identify a set of nodes that can reach the terminal node in k or less steps (k≥1), and also identifies the associated cuts in form of the outgoing edges of the k-step backward reachable nodes. The cut with the smallest number of labels yields a SCCiMLC.

---

Algorithm 3 Example of SCCiMLC Algorithm

---

1: Input: G = (V, E, s, t, L, $\ell$ )
2: Output: A critical-attacks set, CA ⊆ L
3: main
4: Compute SCCs of G as in Definition 1
5: Generate the tree over the SCCs, ($\mathcal{V}$, $\varepsilon$, $C_s$, $C_t$, L, $\ell$ ) as in Definition 2
6: k = 0, $\mathcal{V}_k$ = {C+}, $\varepsilon_k$ = ∅, $L_k$ := $\ell$ ($\varepsilon_k$);
7: For k = 1 to k ≤ |$\mathcal{V}$| − 1:
8: $\mathcal{V}_{k+1}$ = {C ∈ $\mathcal{V}$|∃C' ∈ $\cup_{i \leq k} \mathcal{V}_i$ s.t. (C, C') ∈ $\varepsilon$};
9: $\varepsilon_{k+1}$ = {(C, C') ∈ $\varepsilon$|C ∈ $\mathcal{V}_{k+1}$, C' ∈ $\cup_{i \leq k} \mathcal{V}_i$};
10: $L_{k+1}$ := C($\varepsilon_{k+1}$);
11: k* := arg min |$L_k$| ;
12: CA := $L_{k*}$.
13: end

---

Where all the edges in an attack-graph from source s to terminal t are forward edges, i.e., the given attack-graph has no cycles (is a tree), and so each node is its own SCC. Starting from t and reaching backwards one hop at a time, one can iteratively identify the set of nodes that reach t in 1 or less, 2 or less, 3 or less, etc. steps. For each such set of nodes that can reach t in k or less steps (k≥1), there is a set of outgoing edges, cutting which induces a cut. Among those cuts, the one with the minimum number of labels is the SCCiMLC. This same idea can be applied to the tree graph over the SCCs of the given attack-graph, backward searching over that tree to yield SCCs that are k or less steps away from the terminal node and identifying the labels of their outgoing edges as the label-cuts.

Definition 4 for a Graph (V, E), C⊆V is a Strongly Connected Component (SCC) if for all u, v∈C, Exists a Sequence of Edges, (u, $v_1$)($v_1$, $v_2$) . . . ($v_i$, $v_{i+1}$)($v_{i+1}$, $v_{i+2}$) . . . ($v_n$, v), Connecting u to v, Such that $v_1$ . . . $v_n$∈C. The Edge Set $E_C$ of the SCC C is Simply Defined to be, $E_C$: E∩(C×C).

Definition 5 the Attack-Graph ($\mathcal{V}$, $\varepsilon$, s, t, L, $\ell$ ) is an Abstracted Graph Over its Set of SCCs, ($\mathcal{V}$, $\varepsilon$, Cs, Ct, L, $\ell$ ), where $\mathcal{V}$ is the Set of SCCs of (V, E); $\varepsilon$:={(C, C') ∈ $\mathcal{V}$ × $\mathcal{V}$ |∃u∈C, v∈C', (u, v) ∈$\varepsilon$} is the Set of Edges Connecting any Two SSCs; Cs, Ct∈ $\mathcal{V}$ are the SCCs containing s, t Respectively (i.e., s∈$C_s$, t∈$C_t$); and for any Edge (C, C')∈$\varepsilon$, C((C, C'))={l∈L|∃u∈C, v∈C', l=$\ell$(u, v)}, i.e., it is the Union of all Labels of the Edges Connecting C to C'.

Once the abstracted graph (a tree over the SCCs) has been generated, an iterative backward reach is used over the tree, one hop at an iteration, starting from its terminal SCC Ct to identify the set of SCCs $\mathcal{V}_k$⊆$\mathcal{V}$ that can reach the terminal one in k≥0 iterations, with initial value $\mathcal{V}_0$=$C_t$. The outgoing edges $\varepsilon_k$⊆$\varepsilon$ E of $\mathcal{V}_k$ and their labels $L_k$ ⊆L, with the initial values $\varepsilon_0$=$L_0$=∅, are set. The following iterative computation over 0≤k≤|$\mathcal{V}$|−1 performs these steps.

Initialize:

$k=0; \mathcal{V}_k=\{C_t\}; \varepsilon_k=L_k=\emptyset;$

Iterate:

$\mathcal{V}_{k+1}:=\{C \in \mathcal{V} | \exists C' \in \cup_{i \geq k} \mathcal{V}_i \text{ such that } (C, C') \in \varepsilon\};$
$\varepsilon_{k+1}=\{(C, C') \in \varepsilon | C \in \mathcal{V}_{k+1}, C' \in \cup_{i \geq k} \mathcal{V}_i\};$
$L_{k+1}:= \ell (\varepsilon_{k+1});$ Terminate:

If $\cup_{0 \leq i \leq k+1} \mathcal{V}_i = \mathcal{V}$, then set $$k* := \arg \min_{1 \leq i \leq k+1} |L_i|, L* := L_{i*}$$

and stop; else, set k=k+1 and goto Iterate.

The algorithm picks i* to be the index with the smallest number of labels $$(i *= \arg \min_{1 \leq i} |L_i|.$$

Then $L_{i*}$ is a desired SCCiMVLC that approximates the MLC. The SCCiMLC steps were formalized via Algorithm 3, supra.

In Algorithm 3, the generation of the SCCs, the construction of the tree over the SCCs, and also the backward reachability over that tree to find a SCCiMLC, can all be performed in complexity that is linear in the size of the given attack-graph, meaning the Algorithm 3 of finding SCCiMLC is of linear complexity. The above algorithm for finding a SCCiMLC can for example be encoded in the C language. It receives the output from the A2G2V algorithm (Algorithm 2), which in turn receives input from the ANDVI algorithm (Algorithm 1) that processes network traffic to identify (i) the network devices and maps those against the existing databases to identify their vulnerabilities and the corresponding atomic attack actions, and (ii) the network connectivity.

To validate the SCCiMLC implementation, attack-graphs of two computer network examples and the SCADA network used for the control of a water treatment testbed were tested at in the laboratory. The results compared the results to an exact MLC algorithm and to another approximation algorithm known in the art as described below.

In an attempt to provide a polynomial complexity algorithm for computing an exact MLC for a special case, the MLC was first shown to be NP-hard if the maximum length of any s-t path is longer than two, or if the maximum label frequency (the maximum number of times that a label appears in a graph) $f_{max}$>2. When restricted to disjoint-path undirected graphs, MLC can be solved in polynomial time if $f_{max}$=2. For the sake of comparison with the SCCiMLC, algorithms known in the art can be improved to a general directed attack-graph. Note that the time complexity of the extended algorithm is no longer polynomial.

With reference to FIG. 24, algorithms have been initialized by picking a path and all its edge-labels, $L_0$⊆L, those edge-labels from a candidate set of labels to be removed as part of a label-cut. If $L_k$ is the set of labels at kth iteration (from past k selected paths), cutting edges with labels $L_k$ does not induce a cut. There must thus exist a s-t path whose none of the labels are included in $L_k$. In the iterative step, such a path is found, and all its labels are added to $L_k$ to obtain $L_k$+1. The iteration terminates when a set of labels $L_k$ that induces a label-cut is found. The size of this label-cut can be further reduced by searching over all subsets of $L_k$ to find a minimal subset CA⊆$L_k$ that also induces a cut. The exact algorithmic steps are formalized below in Algorithm 4, which can, but is not required to be, encoded in C.

---
Algorithm 4 Example of MLC Exact Algorithm
---
1: Input: G = (V, E, s, t, L,$\ell$ )
2: Output: A critical-attacks set, CA $\subseteq$ L
3: main
4: Let $L_k = \varphi$
5: while $L_k$ does not induce a cut
6: Pick any path p $\in$ G such that ((p) $\cap$ $L_k$ = $\emptyset$
7: $L_{k+1} = L_k \cup \ell$ (p)
8: Identify all subsets $\mathcal{A}$ := {A $\subseteq$ $L_k$}
9: Pick a minimal subset A $\in$ $\mathcal{A}$ that induces a cut
10: CA := A
11: end Few prior studies have proposed algorithms for approximating a solution to the MLC problem, and among those, a few do not directly apply to a general attack-graph and hence not suitable for comparison. For example, one known algorithm in the art requires an atomic attack to appear only once on an s-t path, which is generally not the case for many applications.

Finding an MLC is an instance of a hitting set problem. Given a set of labels, one for each s-t path, namely, $\mathcal{L}$ {$L_p \subseteq L$|p a s-t path in G}, a hitting-set is a minimal subset CA$\subseteq$L that intersects with each $L_p$, i.e., $\forall$p$\in$ G: $L_p \cap$CA=$\emptyset$. Others have proposed finding an approximation to the MLC solution by optimizing over a 0/1-polytope which corresponds to a hitting set for the set for $\mathcal{L}$.

Definition 6 a 0/1-Polytope in d-Dimensional Space is the Convex Hull of a Set of d-Dimensional Endpoints Q$\subseteq$\{0, 1\}$^d$ Whose Vertices have 0/1-Coordinates Only (i.e., it is a Convex Subset of the Hypercube $\{0,1\}^d$ with Constraint on its Coordinates being 0/1).

The above mentioned hitting-set problem can be solved via a 0/1-polytope optimization problem as follows. $p_G$ is used to denote the set of all s-t paths in G. Define set of end points in the |L|-dimensional unit-cube by:

$$Q := \{x \in \{0,1\}^{|L|} | \forall p \in P_G, \exists k \in \ell(p): x(k)=1\},$$

where $l_k$ denotes the kth label in the set L. In other words, each x $$\min_{x \in \hat{Q}} \sum_{k \in \{1,...,|L|\}} x(k).$$

Let $x^* \in \hat{Q}$ be the minimizer. Then a label-cut is found as follows:

$$L' := \{l_k \in L \mid x^*(k) \geq \frac{1}{|V|^{\frac{2}{3}}}\},$$

E':={e$\in$E| $\ell$(e)$\subset$$L_1$},

L":=a MLC for G'=(V,E',s,t,L,$\ell$ ),

CA:=L'$\cup$L".

For implementing the above hitting-set solution based computation of an approximation to MLC, the "separation oracle" function can be modified to match the separation hyperplane algorithm.

As mentioned above, a concrete example illustrating the problem of critical-attacks set identification, the networked-system 1600 of FIG. 16 was used, with FIG. 19 showing the automatically generated attack-graph 1900 using A2G2V 1808 of said system 1600. Another concrete example extended the three-hosts networked-system 1600 to the five-hosts networked-system 1700 of FIG. 17, with FIG. 21 showing the automatically generated attack-graph 2100 using A2G2V 1808 of said system 1700. FIG. 22 shows the architecture of the system 2200 based on the fully functional water treatment CPS testbed in the iTrust laboratory in Singapore.

This example differs from the one discussed earlier in that the remote station (host-0) 2202 communicates with an RTU (host-12) 2216. the RTU (host-12) 2216 communicates with PLC-6 2214, resulting in a difference in atomic vulnerabilities as follows:

1. The SCADA server 2204 is a SINEMA server, in which
   (a) iws: The built-in web servers at Port 4999/TCP and Port 80/TCP may allow remote execution of unauthenticated code if the server is accessed by an attacker.
   (b) lmw: If the impacted products are not mounted under their default route (\C:\\ProgramFiles\\*", local Microsoft Windows operating system users may increase their privileges.
2. The SCADA workstation 2206 is a SIMATIC Wince flexible runtime, in which
   (a) rmm: The SIMATIC Wincc flexible panel remote management module transmits weakly protected credentials across the network. The credentials can be reconstructed by attackers capturing remote management module network traffic.
   (b) inws: Siemens Wincc flexible allows remote attackers with user access to inject arbitrary web script or HTML via unspecified vectors.
3. The engineering Laptop 2208 runs a Wincc TIA portal, in which
   (a) bac: The application establishes predictable token/cookie authentication values when a user logs in. This can enable an attacker to bypass checks on authentication.
   (b) inws: Wincc TIA portal enables remote attackers to use unknown vectors to inject arbitrary web script or HTML.
4. The HMI 2210 runs a Wincc runtime advanced, in which
   (a) rmm: The SIMATIC Wincc flexible panel remote management module transmits weakly protected credentials across the network. The credentials can be reconstructed by attackers capturing remote management module network traffic.
   (b) inws: Siemens Wincc runtime advanced allows remote attackers to inject arbitrary web script or HTML via unspecified vectors.
5. The control center 2212 runs a Wincc runtime professional, in which
   (a) rmm: The SIMATIC Wincc flexible panel remote management module transmits weakly protected credentials across the network. The credentials can be reconstructed by attackers capturing remote management module network traffic.
   (b) inws: Siemens Wincc flexible allows remote attackers to inject arbitrary web script or HTML via unspecified vectors.
6. The PLCs 2214 are Siemens SIMATIC S7-1500 CPU PLC devices, in which
   (a) rng: There is insufficient entropy in the random number generator on Siemens SIMATIC 57-1500 CPU PLC systems, making it simpler for remote attackers to defeat cryptographic protection mechanisms and hijack sessions via unknown vectors.
7. The RTU 2216 (SICAM RTUs SM-2556 COM Modules)
   (a) osdi: The impacted devices' embedded internet server (port 80/tcp) could allow remote attackers to acquire sensitive device data over the network.
   (b) uxac: The integrated web server (port 80/tcp) of the affected devices could allow unauthenticated remote attackers to execute arbitrary code on the affected device.

The above listed SCADA system 2200 atomic vulnerabilities can be exploited resulting in the following non-limiting list of atomic attacks:
1. Remote code execution (rce): This attack exploits the vulnerability in Port 4999/TCP and Port 80/TCP embedded SINEMA web servers if the server is accessed by an intruder. This attack provides user access to the attacked host.
2. Unquoted service paths (usp): This attack exploits the vulnerability in the operating system of SINEMA server windows that enables a local user to increase their privileges in order to obtain root access to the host being attacked.
3. User credentials construction (ucc): This attack exploits SIMATIC Wincc flexible, SIMATIC Wincc advanced, and SIMATIC Wincc professional's weakly protected credentials. This attack provides user access to the attacked host.
4. Cross-site scripting (xss): In Wincc TIA portal, SIMATIC Wincc flexible, SIMATIC Wincc advanced, and SIMATIC Wincc professional, this attack exploits the vulnerability of the web script and HTML code injection. This attack provides root access to the host attacked by the attacker.
5. Authentication token/cookie (atc): This attack takes advantage of a Wincc TIA portal's predictable authentication token/cookie values. This attack provides root access to the host attacked by the attacker.
6. Cryptographic protection mechanisms (cpm): This attack takes advantage of the weakness in the random number generator of the SIMATIC S7-1500 CPU if the attacker has access to the PLCs. This attack provides root access to the host attacked by the attacker.
7. Unauthorized remote sniffing (urs): This attack exploits the vulnerability of embedded web servers of SICAM RTUs SM-2556 at Port 80/TCP if the server is accessed by an adversary. This attack provides user access to the attacked host.
8. Unauthorized remote execution (urx): This attack exploits the vulnerability of embedded web servers of SICAM RTUs SM-2556 at Port 80/TCP if the server is accessed by an adversary. This attack provides root access to the attacked host to the attacker.

The water treatment system can be formally specified as follows:
1. Set of hosts H=0, 1, 2, ..., 12; variable $i \in \{0, 1, 2, ..., 12\}$ (static parameters).
2. System connectivity, $C \subseteq H \times H$; Boolean; $c_{ij}=1$ iff host i connected to host j (static parameters).
3. System services S; Boolean; $s_i=1$ iff service $s \in \{$SCADA server is SINEMA, SIMATIC Wincc runtime flexible, Wincc runtime advanced, Wincc TIA portal, SIMATIC S7-1500 CPU, SICAM RTUs SM-2556$\}$ is running on host i (dynamic variables).
4. System vulnerabilities V; Boolean; $v_i=1$ iff vulnerability $v \in \{$iws, lmw, rmm, inws, bac, rng, osdi, uxac$\}$ exists on host i (static parameters).
5. Attack instances $AI \subseteq A \times H \times H$; labeled $a_{ij}$=attack a from source i to target j, $a \in \{$rce,usp,ucc,xss, atc, cpm, urs, urx$\}$, (static parameters).
6. Trust relation $T \subseteq H \times H$; Boolean; $t_{ij}=1$ iff i is trusted by j (dynamic variables).
7. Attacker level of privilege L on host i; variable $l_i \in \{$none, user, root$\}$ (dynamic variables).
8. Attack pre-conditions:

$Pre_{(rce_{ij})} \equiv c_{ij}=1 \wedge (l_i \text{ user}) \wedge (l_j=\text{none}) \wedge iws=1$ $Pre_{(usp_{ij})} \equiv c_{ij}=1 \wedge (l_i \text{ user}) \wedge (l_j<\text{root}) \wedge lmw=1$ $Pre_{(ucc_{ij})} \equiv c_{ij}=1 \wedge (l_i \text{ user}) \wedge (lj=\text{none}) \wedge rmm=1$ $Pre_{(xss_{ij})} \equiv c_{ij}=1 \wedge (l_i \text{ user}) \wedge (l_j<\text{root}) \wedge inws=1$ $Pre_{(atc_{ij})} \equiv c_{ij}=1 \wedge (l_i \text{ user}) \wedge (l_j=\text{none}) \wedge bac=1$ $Pre_{(cpm_{ij})} \equiv c_{ij}=1 \wedge (l_i \text{ user}) \wedge (l_j=\text{none}) \wedge rng=1$ $Pre_{(atc_{ij})} \equiv c_{ij}=1 \wedge (l_i \text{ user}) \wedge (l_j<\text{none}) \wedge osdi=1$ $Pre_{(cpm_{ij})} \equiv c_{ij}=1 \wedge (l_i \text{ user}) \wedge (l_j<\text{none}) \wedge uxac=1$ 9. Attack post-conditions:

$post_{(rce_{ij})} \equiv (l_j=\text{user}) \wedge (iws=0)$ $post_{(usp_{ij})} \equiv (l_j=\text{root}) \wedge (lmw=0)$ $post_{(ucc_{ij})} \equiv (l_j=\text{user}) \wedge (rmm=0)$ $post_{(xss_{ij})} \equiv (l_j=\text{user}) \wedge (inws=0)$ $post_{(atc_{ij})} \equiv (l_j=\text{user}) \wedge (bac=0)$ $post_{(cpm_{ij})} \equiv (l_j=\text{user}) \wedge (rng=0)$ $post_{(atc_{ij})} \equiv (l_j=\text{user}) \wedge (osdi=0)$ $post_{(cpm_{ij})} \equiv (l_j=\text{user}) \wedge (uxac=0)$ 10. Initial states: $l_0=\text{root} \wedge (l_1=l_2= ... =l_{12}=\text{none}) \wedge (\forall ij \in H \times H: t_{ij}=0) \wedge$ (iws=lmw=rmm=inws=bac=rng=osdi=uxac=1)
    (Initially, the attacker has root privilege on host-0 and no privilege on other hosts, none of the hosts trust each other, and iws, lmw, rmm, inws, bac, rng, osdi, and uxac are running on the SCADA system components.)
11. The security property $\phi$ of interest is violated if the attacker has the root privilege level on host-4 2210, host-5 2212, or host-6 2214. This can then be described by a computational tree logic (CTL).

$\neg \phi \equiv AG(l_4=\text{root}) \vee (l_5=\text{root}) \vee (l_6=\text{root})$.

Figure 26:
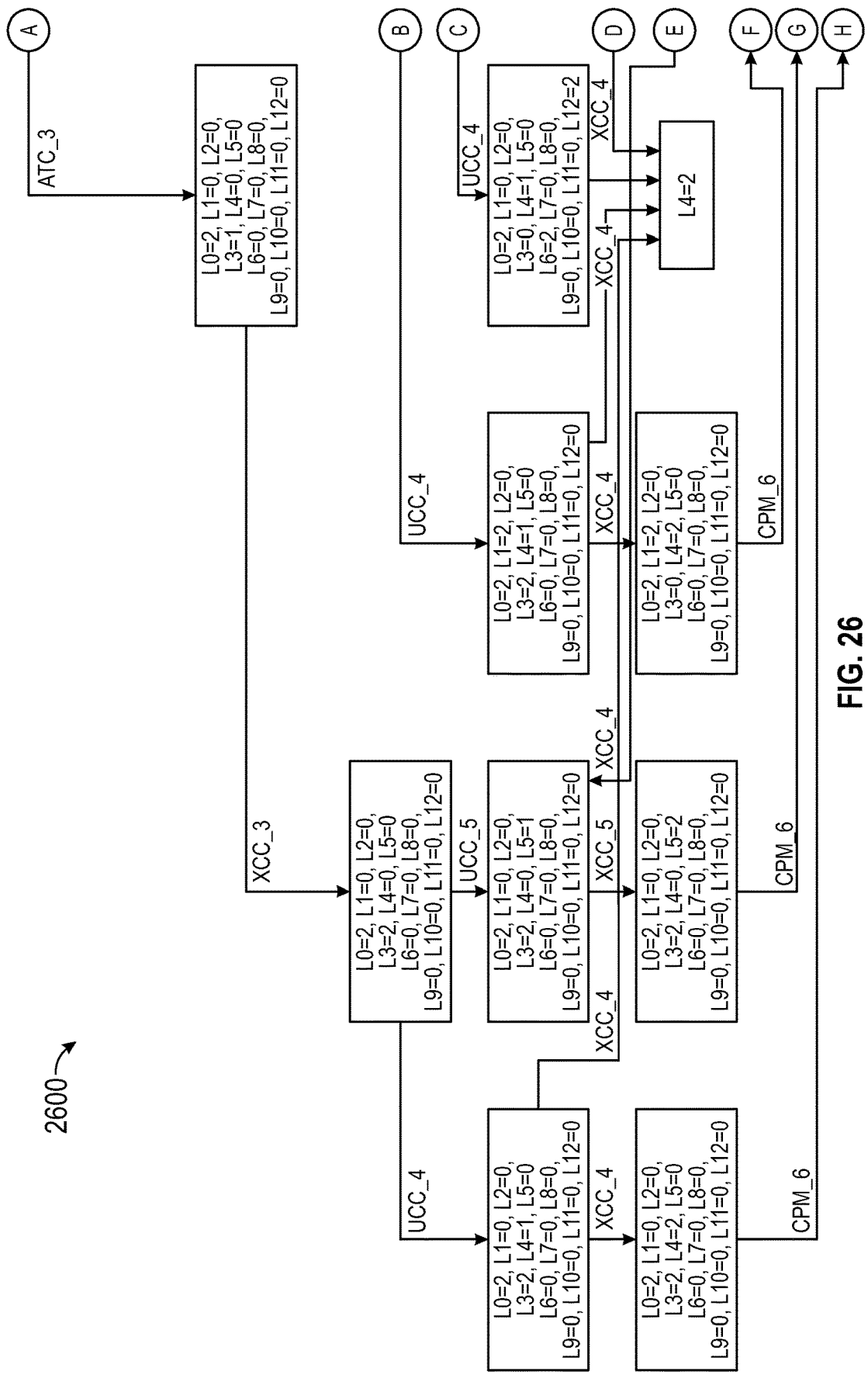
FIG. 26 generates, using A2G2V, an attack-graph for a water treatment SCADA system for compromising the security property $\phi$.
Figure 26:
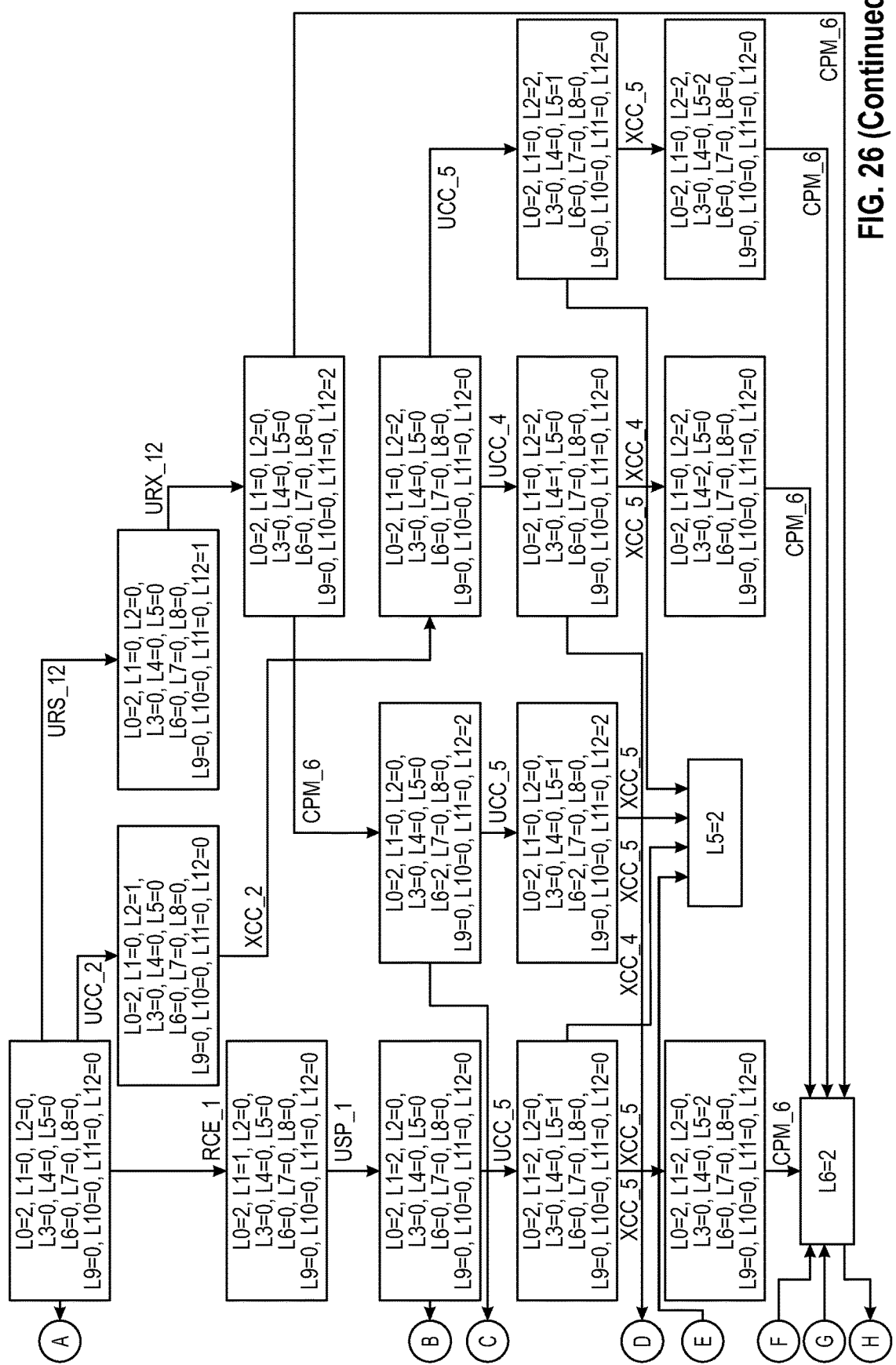

The above mentioned A2G2V tool (e.g., 1808 of FIG. 18) was used to generate the attack-graph 2600 for compromising this property, as shown in FIG. 26. The input to A2G2V consisted of the network topology, specified in AADL (Architecture Analysis & Development Language), as well as the atomic attack actions associated with each of the network devices (and their pre- and post-conditions), specified in the AGREE Annex of AADL. Note that, the water treatment SCADA system 2200 has twelve devices with twenty-three number of connections among them.

The devices are exposed to seven different types of vulnerability and subject to eight different types of atomic attacks per host (listed above). An atomic attack can be mounted on a device to escalate attacker's privilege level on a connected device, under certain pre-conditions.

The attack-graph 2600 then tracks the dynamically evolving privilege level of the attacker on all the twelve devices, as the atomic attacks occur by exploiting the vulnerabilities of the connected devices. These atomic attacks can be nested to form one-hundred fifty different attack-sequences that an attacker may execute to violate the system-level security property (namely, gain root access on host-4 2210, host-5 2212, or host-6 2214), all of which were automatically computed using the A2G2V tool, and that is also graphically displayed automatically.

Figure 25:
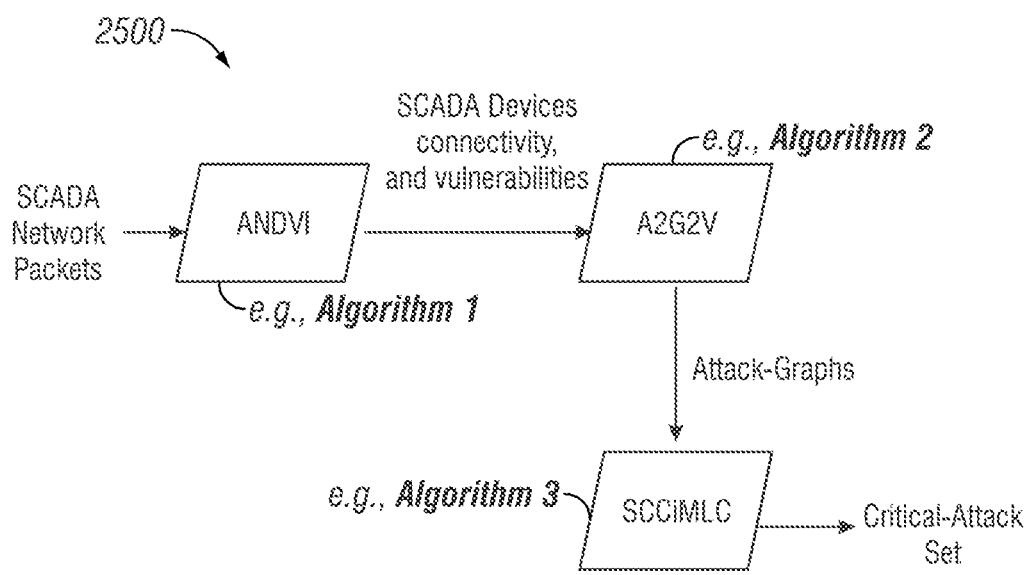
FIG. 25 depicts an SCCiMLC algorithm that approximates a solution to the MLC problem, identifying a critical-attacks set in linear time.

The above implementation of the SCCiMLC (e.g., 2506 of FIG. 25) computed the critical-attacks set as, CA={rlog 12} for the three-hosts system 1600, and CA={rlog 32} for the five-hosts system 1700, and CA={cpm 6, xcc 5, xcc 4} for the water treatment SCADA CPS 2200, meaning that applying security measures to prevent an attacker from exploiting these attacks, can guarantee the desired system-level security property of interest. It turns out that, a quick analysis confirms that removing any smaller set of atomic attacks, i.e., a proper subset of CA does not render the attack-graph disconnected. Thus, the SCCiMLC algorithm was able to find a minimal critical attacks set for the above applications we analyzed, which is quite encouraging.

It can be seen that identifying the critical-attacks set can significantly reduce the effort required to secure the system; in the three-hosts system 1600 securing one atomic attack (rlog 12) out of 4×2=8 atomic attack actions is required to secure the system; in the 5-hosts system 1700 securing one atomic attack (rlog 32) out of 4×4=16 atomic attack actions is required to secure the system; in the water treatment SCADA system 2200 securing 3 atomic attack (cpm 6, xcc 5, xcc 4) out of 8×12=96 atomic attack actions is required to secure the system.

To compare the performance of the SCCiMLC, the critical-attacks set was computed using an exact algorithm (Algorithm 4) and a state-of-art approximation algorithm. The exact algorithm identifies the critical-attacks set as CA={rlog 12} for the three-hosts system 1600, CA={rlog 32} for the five-hosts system 1700, and CA={cpm 6, ucc 5, ucc 4} for the water treatment SCADA CPS 2200. The approximation algorithm identifies the critical-attacks set as CA={sbo 01, ftrp 02, ftrp-01}—for—the three-hosts system 1600, CA={sbo 03, ftrp 02, ftrp 03} for the five-hosts system 1700, and CA={atc 3, rce 1, xcc 2, urx 12} for the water treatment SCADA CPS 2200. Algorithm 4 matches the exact one in the size of the MLCs (although the solutions in the case of water treatment SCADA 2200 differ), whereas it supersedes the approximation algorithm known in the art, which computed label-cuts of larger size in all three cases, compared to the SCCiMVLC algorithm, Algorithm 3.

On a standard computer, with a core i5/2.2 GHz/4 GB RAM running Windows 10, Algorithm 3 took approximately nine seconds to compute the minimal critical-attacks set for the three-hosts system attack-graph 1900, approximately nine seconds to compute the minimal critical-attacks set for the five-hosts system attack-graph 2100, and approximately fifteen seconds to compute the minimal critical-attacks set from the water treatment SCADA system attack-graph 2300. In contrast, Algorithm 4 took ten min to compute the minimal critical-attacks set 1900 for the three-hosts system as well as five-hosts attack-graph 2100, and eighteen minutes to compute the minimal critical-attacks set from the water treatment SCADA system attack-graph 2300.

It can be noted that the SCCiMLC algorithm produced very promising results; the size of the cuts it computed matched the size of the solution computed using the exact algorithm. In the computer network case studies, the SCCiMLC algorithm solution matched that computed using the exact algorithm. For the water treatment system 2200, the identified labels differ, while the size of the label-cut reported was still three as in the case of the exact algorithm (Algorithm 4). However, the speed of SCCiMLC is more than sixty-five times faster.

From the foregoing, it can be seen that the present invention accomplishes at least all of the stated objectives.

It should be further appreciated discovering the devices included in SCADA systems/ICS can improve overall cybersecurity. Implementing the approach along with systems security analysis and mitigation tools can enhance their overall security and defense strategies against potential cyberattacks.

It should be even further appreciated the availability of the system model can be extremely important to the generation of the attack-graphs. In general, a certain one-time modeling effort can be necessary to obtain the system description for components, connectivity, services, and their vulnerabilities. The present invention thus contemplates it is likely possible to automate this by providing a graphical support (where a user will draw the architecture and specify the atomic attacks for each of the components, along with their pre- and post-conditions, and the overall security property). Thus, a graphical model capturing tool can be developed based on the concepts of the disclosed embodiments.

The attack-graph generation algorithm, e.g., Algorithm 2, was originally written in C-code, built to interact with the model-checker JKind for the generation of the attack-paths one at a time, and with another tool Graphviz for visual display of the attack-graph. It should however be understood other configurations and alternatives can be used to implement the novel and unobvious teachings of this disclosure. Much time was consumed in interaction among the tools, in reading the outputs, parsing and processing, and feeding back as inputs. If all tools are integrated into a single code, the computation will become more efficient.

It should be even further appreciated identifying the critical-attacks set in SCADA/ICS/Computer-networks systems can be an essential first step toward improving their overall cybersecurity in helping system administrators optimally allocate their resources for enhancing security defenses. Integrating the approach with a runtime security defense-patch implementation tool can achieve an optimized resource based and defense implementation for enhancing the overall defense strategies and security against potential cyberattacks.

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/of" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

IEC 62264-3:2016 defines activity models of manufacturing operations management that enable enterprise system to control system integration.

IEC 61131 is an IEC standard for programmable controllers. IEC 61131-3 is the first vendor independent standardized programming language for industrial automation.

In communications and computing, a computer readable medium is a medium capable of storing data in a format readable by a mechanical device. The term "non-transitory" is used herein to refer to computer readable media (CRM) that store data for short periods or in the presence of power such as a memory device.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

A processing unit, also called a processor, is an electronic circuit which performs operations on some external data source, usually memory or some other data stream. Non-limiting examples of processors include a microprocessor, a microcontroller, an arithmetic logic unit (ALU), and most notably, a central processing unit (CPU). A CPU, also called a central processor or main processor, is the electronic circuitry within a computer that carries out the instructions of a computer program by performing the basic arithmetic, logic, controlling, and input/output (I/O) operations specified by the instructions. Processing units are common in tablets, telephones, handheld devices, laptops, user displays, smart devices (TV, speaker, watch, etc.), and other computing devices.

Memory typically includes a program storage area and/or data storage area. The memory can comprise read-only memory (ROM, an example of non-volatile memory, meaning it does not lose data when it is not connected to a power source) or random-access memory (RAM, an example of volatile memory, meaning it will lose its data when not connected to a power source). Examples of volatile memory include static RAM (SRAM), dynamic RAM (DRAM), synchronous DRAM (SDRAM), etc. Examples of non-volatile memory include electrically erasable programmable read only memory (EEPROM), flash memory, hard disks, SD cards, etc.

Generally, non-transitory CRM operates under control of an operating system stored in the memory. The non-transitory CRM implements a compiler which allows a software application written in a programming language such as COBOL, C/C++, FORTRAN, or any other known programming language to be translated into code readable by the central processing unit. After completion, the central processing unit accesses and manipulates data stored in the memory of the non-transitory CRM using the relationships and logic dictated by the software application and generated using the compiler.

Software application(s) and/or compiler(s) can be tangibly embodied in CRM. When the instructions are read and executed by the non-transitory CRM, the non-transitory CRM performs the steps necessary to implement and/or use the present invention. A software application, operating instructions, and/or firmware (semi-permanent software programmed into read-only memory) may also be tangibly embodied in the memory and/or data communication devices, thereby making any software application(s) a product or article of manufacture according to the present invention.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A method of providing security in a control system that communicates between a plurality of devices connected to a non-isolated network utilizing a communications protocol, said communications protocol implemented at least in part with data packets each having a header and user data, the method comprising:
    a. automatically identifying said devices and security vulnerabilities by:
        i. analyzing a communication pattern in the non-isolated network to identify control hierarchy in the network to infer device type of one or more of the plurality of devices;
        ii. generating a passive fingerprint for the devices in the non-isolated network by capturing network traffic and analyzing transmitted data packet headers in the network traffic to discriminate between the devices for device recognition by type, manufacturer, and model;
        iii. comparing passive fingerprints of unknown devices to a database storing fingerprints of devices with known identities;
        iv. using the generated passive fingerprints to identify placement of the devices in the non-isolated network to further discriminate between the devices; and
        v. scanning individual devices for said security vulnerabilities based upon an identified type, manufacturer, and/or model of the individual devices.

2. The method of claim 1 further comprising:
    b. automatically scanning the control system for global vulnerabilities by:
        i. constructing an attack-graph by:
            1. utilizing an architecture description language capable of describing:
                a. said devices,
                b. connectivity of said devices,
                c. digital aspects of the control system, and
                d. device-level atomic attacks;

2. generating attack-paths in the form of counterexamples;
3. iteratively searching the generated attack-paths to enumerate all acyclic counterexamples; and
4. generating the attack-graph with each attack-path from source to terminal;
 ii. identifying with the attack-graph a set of all sequences of atomic attacks exploiting device vulnerability that may compromise the control system.

3. The method of claim 2 further comprising:
c. automatically generating a global vulnerability resolution by analyzing the attack-graphs to identify a minimal number of critical atomic attacks that need to be prevented by:
 i. creating an abstract version of the attack-graphs from strongly-connected components (SCCs) of the attack-graphs; and
 ii. performing an iterative backward search of the abstract version to find backward-accessible SCCs along with the outgoing edge.

4. The method of claim 1 wherein the communications protocol is Transmission Control Protocol/Internet Protocol (TCP/IP) and the analyzing of the communication pattern comprises extraction of data from a TCP/IP packet.

5. The method of claim 1 wherein the packets have one or more features and the step of analyzing of a communication pattern comprises monitoring the packets for the one or more features, wherein the one or more features allows for identification of the control hierarchy.

6. The method of claim 5 wherein the one or more features of the packets include an indication of a unique device based on its manufacturer's settings, and the step of analyzing comprises comparing the one or more features to a device reference database.

7. The computerized method of claim 1 wherein the passive fingerprints are stored in a feature matrix which is compared to a database of manufacturers and models of devices.

8. The method of claim 7 wherein the communications protocol comprises communication packets for SCADA/ISC and the features matrix includes one or more features comprising
  time to live (TTL),
  difference in IP.IDs of two consecutive packets ($IP.ID_{diff}$), and
  vendor MAC ID ($Vendor_{MAC}$).

9. The method of claim 1 wherein the fingerprinting comprises an offline learning stage in which information from device manufacturer datasheets are used to create a reference fingerprint database, and an online recognition stage that captures communication packets from the network, extracts information to create passive fingerprints for unknown devices, and compares the created passive fingerprints to the fingerprints' reference database obtained during the learning stage to identify the devices.

10. The method of claim 1 wherein the fingerprints are augmented with control hierarchy information for refinement/confirmation of the passive fingerprinting.

11. The method of claim 1 wherein the devices are SCADA devices where packets do not travel beyond parent node level and data collection is between a parent/child hierarchy level of each device, and passive fingerprinting minimizes the number of data collection points by collection data at routers rather than at devices.

12. The method of claim 1 wherein the method proceeds in a bottom up fashion by identifying bottom-most devices of the control hierarchy.

13. A computerized method comprising:
a. automatically identifying devices in a non-isolated network by:
 i. analyzing a communication pattern in the non-isolated network to identify control hierarchy in the network to infer device type of one or more of the plurality of devices;
 ii. generating a passive fingerprint for the devices in the non-isolated network by capturing network traffic and analyzing transmitted data packet headers in the network traffic to discriminate between the devices;
 iii. comparing passive fingerprints of unknown devices to a database storing fingerprints of devices with known identities; and
 iv. using the generated passive fingerprints to identify placement of the devices in the non-isolated network to further discriminate between the devices and to determine an identified type, manufacturer, and/or model of the unknown devices.

14. The computerized method of claim 13 further comprising automatically scanning the devices for global vulnerabilities based upon the identified type, manufacturer, and/or model.

15. The computerized method of claim 13 further comprising resolving said global vulnerabilities to secure the network and the devices.

16. A computerized method comprising:
a. first identifying type, manufacturer, and/or model of devices in a non-isolated network by:
 i. analyzing a communication pattern in the non-isolated network to identify control hierarchy in the network to infer device type of one or more of the devices; and
b. discriminating and/or comparing
 i. passive fingerprints generated for unknown devices and fingerprints stored in a database relating to known devices.

17. The computerized method of claim 16 further comprising resolving said global vulnerabilities to secure the network and the devices.

18. A computerized method comprising:
automatically generating a global vulnerability resolution by analyzing attack-graphs to identify a minimal number of critical atomic attacks that need to be prevented by:
 i. creating an abstract version of the attack-graphs from strongly connected components (SCCs) of the attack-graphs having a set of vertexes and a set of edges that connect a vertex to another; and
 ii. performing an iterative backward search of the abstract version to find backward-accessible SCCs along with an outgoing edge of the set of edges.

19. The computerized method of claim 18 further comprising first identifying a type, manufacturer, and/or model of the devices by analyzing a communication pattern in the non-isolated network and discriminating and/or comparing between passive fingerprints generated for unknown devices and fingerprints stored in a database relating to known devices.

20. The computerized method of claim 19 further comprising scanning the devices for global vulnerabilities based upon the identified type, manufacturer, and/or model.

* * * * *